(12) United States Patent
Furukawa

(10) Patent No.: US 11,282,653 B2
(45) Date of Patent: Mar. 22, 2022

(54) SOLID ELECTROLYTIC CAPACITOR AND METHOD FOR MANUFACTURING THE SAME

(71) Applicant: Murata Manufacturing Co., Ltd., Nagaokakyo (JP)

(72) Inventor: Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 315 days.

(21) Appl. No.: 16/535,560

(22) Filed: Aug. 8, 2019

(65) Prior Publication Data
US 2019/0362904 A1 Nov. 28, 2019

Related U.S. Application Data

(63) Continuation of application No. PCT/JP2018/003350, filed on Feb. 1, 2018.

(30) Foreign Application Priority Data

Feb. 17, 2017 (JP) .............................. JP2017-027980
Mar. 2, 2017 (JP) .............................. JP2017-039611
Mar. 2, 2017 (JP) .............................. JP2017-039612

(51) Int. Cl.
*H01G 9/15* (2006.01)
*H01G 9/025* (2006.01)
(Continued)

(52) U.S. Cl.
CPC ............. *H01G 9/15* (2013.01); *H01G 9/025* (2013.01); *H01G 9/04* (2013.01); *H01G 9/07* (2013.01); *H01G 9/12* (2013.01)

(58) Field of Classification Search
CPC .. H01G 9/10; H01G 9/15; H01G 9/12; H01G 9/07; H01G 9/04; H01G 9/025
(Continued)

(56) References Cited

U.S. PATENT DOCUMENTS 5,559,668 A * 9/1996 Kuriyama ................ H01G 9/15
361/533
6,785,147 B2 8/2004 Miki et al.
(Continued)

FOREIGN PATENT DOCUMENTS

CN 105590872 A 5/2016
JP 2003045762 A 2/2003
(Continued)

OTHER PUBLICATIONS

International Search Report issued in PCT/JP2018/003350, dated Apr. 17, 2018.
(Continued)

*Primary Examiner* — Arun Ramaswamy
(74) *Attorney, Agent, or Firm* — Arent Fox LLP

(57) ABSTRACT

A solid electrolytic capacitor is provided that includes a capacitor element having a valve action metal base with a porous portion on a first main surface of a core portion, a dielectric layer disposed on a surface of the porous portion, a solid electrolyte layer disposed on the dielectric layer, and a conductor layer disposed on the solid electrolyte layer. Moreover, the capacitor includes a sealing layer that seals a first main surface of the capacitor element, a cathode outer electrode electrically connected to the conductor layer, and an anode outer electrode electrically connected to the valve action metal base. The sealing layer and the cathode outer electrode are disposed on the conductor layer and a cathode through-electrode extends through the sealing layer on the conductor layer. The conductor layer and the cathode outer electrode are connected to each other with the cathode through-electrode interposed therebetween.

26 Claims, 30 Drawing Sheets

(51) Int. Cl.
*H01G 9/04* (2006.01)
*H01G 9/07* (2006.01)
*H01G 9/12* (2006.01)

(58) Field of Classification Search
USPC ............... 361/523, 528, 532, 538, 535, 525
See application file for complete search history.

(56) References Cited

U.S. PATENT DOCUMENTS

| | | | |
|---|---|---|---|
| 7,054,141 | B2 | 5/2006 | Sakaguchi et al. |
| 7,304,833 | B1 | 12/2007 | Kobayashi |
| 7,745,281 | B2 | 6/2010 | Prymak et al. |
| 10,128,129 | B2 | 11/2018 | Akiba et al. |
| 2004/0095710 | A1 | 5/2004 | Miki et al. |
| 2005/0280978 | A1 | 12/2005 | Sakaguchi et al. |
| 2006/0256507 | A1* | 11/2006 | Yoshida ............ H01G 9/042 361/540 |
| 2007/0230093 | A1 | 10/2007 | Kobayashi |
| 2008/0216296 | A1 | 9/2008 | Prymak et al. |
| 2010/0103634 | A1 | 4/2010 | Funaya et al. |
| 2015/0194269 | A1* | 7/2015 | Fujii ............ B32B 37/04 361/528 |
| 2017/0278722 | A1 | 9/2017 | Akiba et al. |
| 2017/0278727 | A1 | 9/2017 | Mouri et al. |

FOREIGN PATENT DOCUMENTS

| | | |
|---|---|---|
| JP | 2006005233 A | 1/2006 |
| JP | 2007266247 A | 10/2007 |
| JP | 2008135427 A | 6/2008 |
| JP | 2009188219 A | 8/2009 |
| JP | 2010520647 A | 6/2010 |
| JP | 2012009560 A | 1/2012 |
| JP | 2016092305 A | 5/2016 |
| WO | 2008120755 A1 | 10/2008 |

OTHER PUBLICATIONS

Written Opinion of the International Searching Authority issued in PCT/JP2018/003350, dated Apr. 17, 2018.

* cited by examiner

SOLID ELECTROLYTIC CAPACITOR AND METHOD FOR MANUFACTURING THE SAME

CROSS REFERENCE TO RELATED APPLICATIONS

The present application is a continuation of PCT/JP2018/003350 filed Feb. 1, 2018, which claims priority to each of Japanese Patent Application No. 2017-027980, filed Feb. 17, 2017, Japanese Patent Application No. 2017-039611, filed Mar. 2, 2017, and Japanese Patent Application No. 2017-039612, filed Mar. 2, 2017, the entire contents of each of which are incorporated herein by reference.

TECHNICAL FIELD

The present invention relates to a solid electrolytic capacitor and a method for manufacturing the solid electrolytic capacitor.

BACKGROUND

In general a solid electrolytic capacitor includes a valve action metal base including a porous layer on a surface of a base composed of a valve action metal such as aluminum, a dielectric layer that is formed on a surface of the porous layer, a solid electrolyte layer that is disposed on the dielectric layer, and a capacitor element that includes a conductor layer that is disposed on the solid electrolyte layer.

As disclosed in Patent Document 1 (identified below), an existing method of resin sealing is performed in a manner in which capacitor elements are stacked, the stacked capacitor elements are electrically connected to a lead frame, and transfer molding or another method is subsequently performed. In some cases, the capacitor elements are electrically connected to a mounting substrate such as a printed circuit board instead of the lead frame before resin sealing.

Patent Document 2 (also identified below) discloses a solid electrolytic capacitor that includes a capacitor element that has an anode and a cathode, and a substrate on which the capacitor element is mounted. In the solid electrolytic capacitor disclosed in Patent Document 2, an anode pattern that is connected to the anode and a cathode pattern that is connected to the cathode are formed on a capacitor-element-mounting surface of the substrate, and pairs of anode terminals and cathode terminals are formed on a back surface of the substrate opposite the capacitor-element-mounting surface. The anode terminals are connected to the anode of the capacitor element with a conduction path that is formed in the substrate and the anode pattern that is formed on the capacitor-element-mounting surface interposed therebetween. Moreover, the cathode terminals are connected to the cathode of the capacitor element with a conduction path that is formed in the substrate and the cathode pattern that is formed on the capacitor-element-mounting surface interposed therebetween.

For this reason, the solid electrolytic capacitor disclosed in Patent Document 2 functions as a solid electrolytic capacitor that includes pairs of terminals when the solid electrolytic capacitor is mounted on the mounting substrate from the back surface, and a predetermined voltage is applied to the pairs of the anode terminals and the cathode terminals that are formed on the back surface. That is, the solid electrolytic capacitor disclosed in Patent Document 2 is a solid electrolytic capacitor that includes pairs of terminals in which a two-terminal capacitor element is used.

Patent Document 1: Japanese Unexamined Patent Application Publication No. 2008-135427.

Patent Document 2: Japanese Unexamined Patent Application Publication No. 2007-266247.

In the solid electrolytic capacitor, a capacitance generation portion, which is conducive to electrostatic capacity, is a porous portion such as an etching layer in which a dielectric layer is formed. It is effective to decrease the distance from the capacitance generation portion to an outer electrode such as the lead frame from which an electric current flows, in order to decrease an equivalent series resistance (ESR), and an equivalent series inductance (ESL).

However, an existing structure in Patent Document 1 where a terminal extends from the capacitor element to an outer electrode in a plane direction is disadvantageous to a design for decreasing the ESR and the ESL because the distance to the outer electrode is long. With the existing structure, it is difficult to achieve a design for increasing a ratio of the volume of the capacitance generation portion to the volume of the entire capacitor. With the structure disclosed in Patent Document 1, it is thus difficult to design a thin solid electrolytic capacitor having a low ESR and a low ESL.

In addition, in the solid electrolytic capacitor in Patent Document 2, in which the capacitor element is mounted on the mounting surface of the substrate and the anode terminals and the cathode terminals that are formed on the back surface of the substrate are outer electrodes, the substrate is interposed. Accordingly, it is difficult to design a thin solid electrolytic capacitor having a low ESR and a low ESL.

SUMMARY OF THE INVENTION

The exemplary embodiments of the present invention solve the above-noted problems of the prior art. Accordingly, it is an object of the present invention to provide a solid electrolytic capacitor that has a low ESR and a low ESL and that can be designed to be thin, and to provide a method for manufacturing the solid electrolytic capacitor.

In a first exemplary aspect, a solid electrolytic capacitor is provided that includes a capacitor element that includes a valve action metal base including a porous portion at least on a first main surface of a core portion, a dielectric layer that is disposed on a surface of the porous portion, a solid electrolyte layer that is disposed on the dielectric layer, and a conductor layer that is disposed on the solid electrolyte layer. Moreover, the capacitor includes a sealing layer that seals a first main surface of the capacitor element, a cathode outer electrode that is electrically connected to the conductor layer, and an anode outer electrode that is electrically connected to the valve action metal base. The conductor layer contains metal foil. The sealing layer and the cathode outer electrode are disposed in this order on the conductor layer. A cathode through-electrode that extends through the sealing layer is disposed in the sealing layer on the conductor layer. The conductor layer and the cathode outer electrode are connected to each other with the cathode through-electrode interposed therebetween.

A solid electrolytic capacitor according to a second aspect includes a capacitor element that includes a valve action metal base including a porous portion at least on a first main surface of a core portion, a dielectric layer that is disposed on a surface of the porous portion, a solid electrolyte layer that is disposed on the dielectric layer, and a conductor layer that is disposed on the solid electrolyte layer, with the capacitor element including an exposed portion of the core portion along the first main surface of the valve action metal base. Moreover, the capacitor includes an insulating layer that is disposed on the exposed portion of the core portion of the capacitor element, a first sealing layer that is disposed on the insulating layer and the conductor layer of the capacitor element such that the first sealing layer covers the first main surface of the capacitor element, a first anode through-electrode that is disposed in the first sealing layer and the insulating layer such that the first anode through-electrode extends through the first sealing layer and the insulating layer on the exposed portion of the core portion of the capacitor element, and that is connected to the core portion of the capacitor element, a first cathode through-electrode that is disposed in the first sealing layer such that the first cathode through-electrode extends through the first sealing layer on the conductor layer of the capacitor element and that is connected to the conductor layer of the capacitor element, a first anode inner electrode that is disposed on the first sealing layer and that is connected to the first anode through-electrode that is exposed from a surface of the first sealing layer, a first cathode inner electrode that is disposed on the first sealing layer and that is connected to the first cathode through-electrode that is exposed from the surface of the first sealing layer, a second sealing layer that is directly or indirectly disposed above the first sealing layer such that the second sealing layer covers the first anode inner electrode and the first cathode inner electrode, a second anode through-electrode that is disposed in the second sealing layer such that the second anode through-electrode extends through the second sealing layer and that is directly or indirectly connected to the first anode inner electrode, a second cathode through-electrode that is disposed in the second sealing layer such that the second cathode through-electrode extends through the second sealing layer and that is directly or indirectly connected to the first cathode inner electrode, an anode outer electrode that is disposed on the second sealing layer and that is connected to the second anode through-electrode that is exposed from a surface of the second sealing layer, and a cathode outer electrode that is disposed on the second sealing layer and that is connected to the second cathode through-electrode that is exposed from the surface of the second sealing layer.

A solid electrolytic capacitor according to a third aspect includes a capacitor element that includes a valve action metal base including a porous portion at least on a first main surface of a core portion, a dielectric layer that is disposed on a surface of the porous portion, a solid electrolyte layer that is disposed on the dielectric layer, and a conductor layer that is disposed on the solid electrolyte layer, with the capacitor element including an exposed portion of the core portion along the first main surface of the valve action metal base. Moreover, the capacitor includes a first sealing layer that is disposed on the conductor layer and the exposed portion of the core portion of the capacitor element such that the first sealing layer covers the first main surface of the capacitor element, a first anode through-electrode that is disposed in the first sealing layer such that the first anode through-electrode extends through the first sealing layer on the exposed portion of the core portion of the capacitor element and that is connected to the core portion of the capacitor element, a first cathode through-electrode that is disposed in the first sealing layer such that the first cathode through-electrode extends through the first sealing layer on the conductor layer of the capacitor element and that is connected to the conductor layer of the capacitor element, a first anode inner electrode that is disposed on the first sealing layer and that is connected to the first anode through-electrode that is exposed from a surface of the first sealing layer, a first cathode inner electrode that is disposed on the first sealing layer and that is connected to the first cathode through-electrode that is exposed from the surface of the first sealing layer, a second sealing layer that is directly or indirectly disposed above the first sealing layer such that the second sealing layer covers the first anode inner electrode and the first cathode inner electrode, a second anode through-electrode that is disposed in the second sealing layer such that the second anode through-electrode extends through the second sealing layer and that is directly or indirectly connected to the first anode inner electrode, a second cathode through-electrode that is disposed in the second sealing layer such that the second cathode through-electrode extends through the second sealing layer and that is directly or indirectly connected to the first cathode inner electrode, an anode outer electrode that is disposed on the second sealing layer and that is connected to the second anode through-electrode that is exposed from a surface of the second sealing layer, and a cathode outer electrode that is disposed on the second sealing layer and that is connected to the second cathode through-electrode that is exposed from the surface of the second sealing layer.

A method according to an exemplary aspect is provided for manufacturing a solid electrolytic capacitor and includes a step of preparing a capacitor element that includes a valve action metal base including a porous portion at least on a first main surface of a core portion, a dielectric layer that is disposed on a surface of the porous portion, a solid electrolyte layer that is disposed on the dielectric layer, and a conductor layer that is disposed on the solid electrolyte layer, with the capacitor element including an exposed portion of the core portion along the first main surface of the valve action metal base with an insulating layer formed on the exposed portion of the core portion. Moreover, the method includes a step of forming a sealing layer on the insulating layer and the conductor layer of the capacitor element such that the sealing layer covers the first main surface of the capacitor element with the insulating layer formed, a step of forming an anode through-electrode that is disposed in the sealing layer and the insulating layer such that the anode through-electrode extends through the sealing layer and the insulating layer on the exposed portion of the core portion of the capacitor element and that is connected to the core portion of the capacitor element, a step of forming a cathode through-electrode that is disposed in the sealing layer such that the cathode through-electrode extends through the sealing layer on the conductor layer of the capacitor element and that is connected to the conductor layer of the capacitor element, a step of forming, on the sealing layer, an anode outer electrode that is connected to the anode through-electrode that is exposed from a surface of the sealing layer, and a step of forming, on the sealing layer, a cathode outer electrode that is connected to the cathode through-electrode that is exposed from the surface of the sealing layer.

A method according to another exemplary aspect is provided for manufacturing a solid electrolytic capacitor that includes a step of preparing a capacitor element that includes a valve action metal base including a porous portion at least on a first main surface of a core portion, a dielectric layer that is disposed on a surface of the porous portion, a solid electrolyte layer that is disposed on the dielectric layer, and a conductor layer that is disposed on the solid electrolyte layer, with the capacitor element including an exposed portion of the core portion along the first main surface of the valve action metal base. Moreover, the method includes a step of forming a sealing layer on the conductor layer and the exposed portion of the core portion of the capacitor element such that the sealing layer covers the first main surface of the capacitor element, a step of forming an anode through-electrode that is disposed in the sealing layer such that the anode through-electrode extends through the sealing layer on the exposed portion of the core portion of the capacitor element and that is connected to the core portion of the capacitor element, a step of forming a cathode through-electrode that is disposed in the sealing layer such that the cathode through-electrode extends through the sealing layer on the conductor layer of the capacitor element and that is connected to the conductor layer of the capacitor element, a step of forming, on the sealing layer, an anode outer electrode that is connected to the anode through-electrode that is exposed from a surface of the sealing layer, and a step of forming, on the sealing layer, a cathode outer electrode that is connected to the cathode through-electrode that is exposed from the surface of the sealing layer.

The present disclosure provides a solid electrolytic capacitor that has a low ESR and a low ESL and that can be designed to be thin.

BRIEF DESCRIPTION OF DRAWINGS

FIG. 1(*b*) schematically illustrates a sectional view of an example of a capacitor element that is included in the solid electrolytic capacitor illustrated in FIG. 1(*a*). FIG. 1(*c*) schematically illustrates a perspective view of the example of the capacitor element that is included in the solid electrolytic capacitor illustrated in FIG. 1(*a*).

FIG. 4(*b*) schematically illustrates a perspective view of another example of the valve action metal base that includes the stress-relaxing layer.

FIG. 7(*b*) schematically illustrates a sectional view of an example of a capacitor element that is included in the solid electrolytic capacitor illustrated in FIG. 7(*a*). FIG. 7(*c*) schematically illustrates a perspective view of the example of the capacitor element that is included in the solid electrolytic capacitor illustrated in FIG. 7(*a*).

FIG. 9(*b*) schematically illustrates a sectional view of an example of a capacitor element that is included in the solid electrolytic capacitor illustrated in FIG. 9(*a*). FIG. 9(*c*) schematically illustrates a perspective view of the example of the capacitor element that is included in the solid electrolytic capacitor illustrated in FIG. 9(*a*).

FIG. 14(*b*) schematically illustrates a sectional view of an example of a capacitor element that is included in the solid electrolytic capacitor illustrated in FIG. 14(*a*). FIG. 14(*c*) schematically illustrates a perspective view of the example of the capacitor element that is included in the solid electrolytic capacitor illustrated in FIG. 14(*a*).

FIG. 18(*b*) is a sectional view of the solid electrolytic capacitor illustrated in FIG. 17 taken along line IIB-IIB. FIG. 18(*c*) schematically illustrates a sectional view of an example of a capacitor element that is included in the solid electrolytic capacitor illustrated in FIG. 17.

FIG. 19(*b*) schematically illustrates a sectional view of an example of a capacitor element that is included in the solid electrolytic capacitor illustrated in FIG. 19(*a*).

FIG. 23(*b*) schematically illustrates a sectional view of an example of a capacitor element that is included in the solid electrolytic capacitor illustrated in FIG. 23(*a*).

DETAILED DESCRIPTION OF EXEMPLARY EMBODIMENTS

Figure 1A:
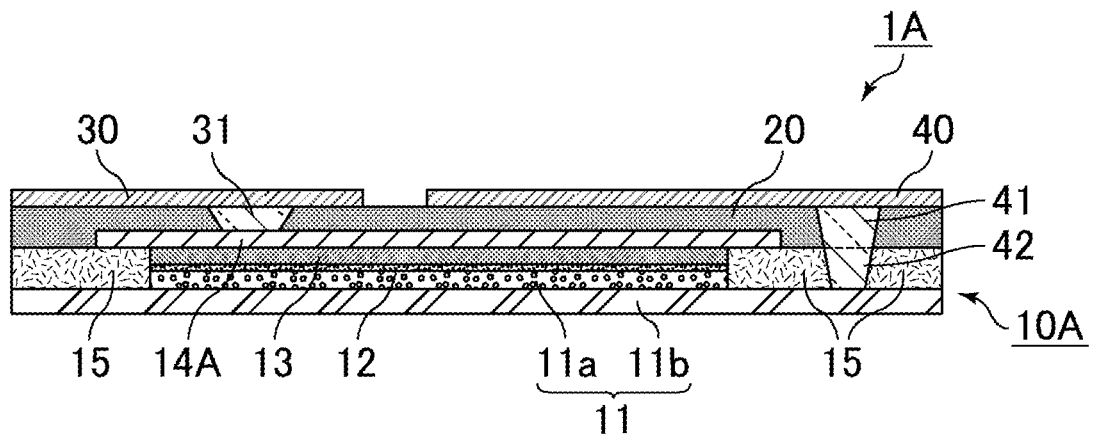
FIG. 1(*a*) schematically illustrates a sectional view of an example of a solid electrolytic capacitor according to a first embodiment.

A solid electrolytic capacitor according to the present invention and a method for manufacturing the solid electrolytic capacitor will hereinafter be described.

It is noted that the present invention is not limited to the structures described below and can be appropriately modified and carried out without departing from the spirit of the present invention. The present invention can also include a combination of two or more preferable features of the present invention described below.

Moreover, the exemplary embodiments are described below by way of example and that features described according to different embodiments can be partially replaced or combined. In second and later embodiments, a description of subject matters common to those according to a first embodiment is omitted, and only different matters will be described. In particular, the same effects achieved by the same structure are not described in all of the embodiments. The number of a capacitor element of a single solid electrolytic capacitor is not limited to one and may be two or more.

It is noted that where the specifically embodiments are not particularly distinguished, phrases such as a "solid electrolytic capacitor" and a "method for manufacturing a solid electrolytic capacitor" are simply used below.

First Embodiment

In a solid electrolytic capacitor according to the first embodiment, a sealing layer and a cathode outer electrode are disposed in this order on a conductor layer, a cathode through-electrode is disposed in the sealing layer on the conductor layer, and the conductor layer is extended to a surface of the sealing layer with the cathode through-electrode interposed therebetween. Accordingly, functions are integrated onto a surface of a valve action metal base, functional layers other than a capacitance generation portion (portion that is conducive to electrostatic capacity) are minimized, and the ratio of the volume of the capacitance generation portion to the volume of the entire capacitor can be increased. Consequently, the volumetric efficiency of the capacitance generation portion can be increased, and the solid electrolytic capacitor can be designed to be thin. For example, the thickness of the solid electrolytic capacitor is no less than 0.1 mm and no more than 0.4 mm and is preferably no less than 0.1 mm and no more than 0.15 mm. The electrostatic capacity is preferably 1.0 µF or more.

With the above structure, an ESR can be inhibited from increasing even when the number of cathode through-electrodes is decreased, and the structure of an outer electrode can be freely designed.

In the solid electrolytic capacitor according to the first embodiment, the conductor layer contains metal foil. Moreover, the conductor layer is extended to the surface of the sealing layer by using the metal foil having a low surface resistance. This decreases the distance of extension from the conductor layer that is disposed in a cathode to the cathode outer electrode and enables the ESR and the ESL to be designed to be low.

The use of the metal foil as the conductor layer enables the cathode through-electrode to be formed by plating after a through-hole is formed in the sealing layer as with an anode through-electrode. Accordingly, the ESR of the cathode through-electrode can be decreased. Examples of metal that is used for plating include Cu and Ni.

In particular, when the conductor layer is from of the metal foil, it is not necessary to provide a conductor layer that contains a high-conductivity filler such as silver, and problems that can be caused by the filler, such as a short circuit and an electric current leak can be prevented.

The solid electrolytic capacitor according to the first embodiment enables processes of forming the cathode through-electrode and the anode through-electrode to be integrated and enables the use of an expensive material such as silver to be reduced. Accordingly, manufacturing cost can be decreased.

According to the first embodiment, an insulating layer is disposed between a core portion and the sealing layer. The insulating layer, the sealing layer, and an anode outer electrode are disposed in this order on the core portion. A first anode through-electrode is disposed in the sealing layer on the insulating layer, and a second anode through-electrode is disposed in the insulating layer on the core portion. The core portion is extended to the surface of the sealing layer with the second anode through-electrode and the first anode through-electrode interposed therebetween. An advantage in design according to the first embodiment is that the material of the insulating layer in direct contact with a porous portion and the material of the sealing layer can be designed separately. The cathode near a first main surface of a capacitor element is covered by the sealing layer and the cathode outer electrode. Accordingly, airtightness is substantially high, and the insulating layer and the interface of each layer can be main paths through which liquid enters from the outside. In this case, selecting the material of the insulating layer from highly adhesive, waterproof materials achieves highly reliable design. In addition, the anode outer electrode can be disposed on the same side as the cathode outer electrode, and the solid electrolytic capacitor can be designed to be thin.

Figure 1B:
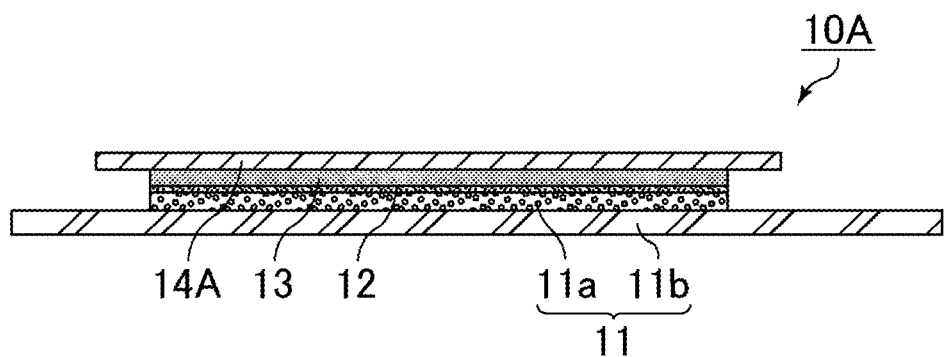
Figure 1C:
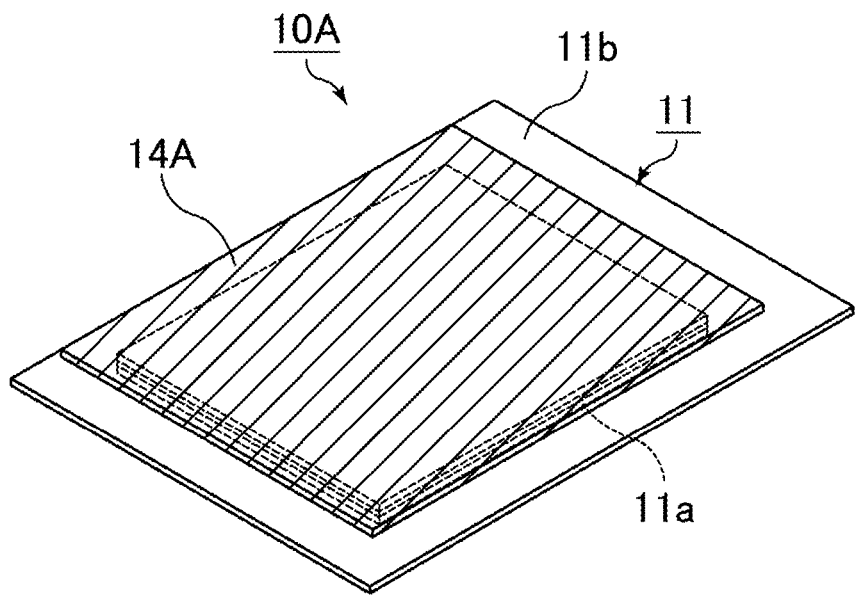

FIG. 1(a) schematically illustrates a sectional view of an example of the solid electrolytic capacitor according to the first embodiment. FIG. 1(b) schematically illustrates a sectional view of an example of the capacitor element that is included in the solid electrolytic capacitor illustrated in FIG. 1(a). FIG. 1(c) schematically illustrates a perspective view of the example of the capacitor element that is included in the solid electrolytic capacitor illustrated in FIG. 1(a).

FIG. 1(a) is a sectional view of a solid electrolytic capacitor 1A. The solid electrolytic capacitor 1A illustrated in FIG. 1(a) includes a capacitor element 10A, a sealing layer 20, a cathode outer electrode 30, and an anode outer electrode 40. As illustrated in FIG. 1(a) and FIG. 1(b), the capacitor element 10A includes a valve action metal base 11 that includes a porous portion 11a on a first main surface of a core portion 11b, a dielectric layer 12 formed on a surface of the porous portion 11a, a solid electrolyte layer 13 disposed on the dielectric layer 12, and a conductor layer 14A disposed on the solid electrolyte layer 13, and includes an exposed portion of the core portion 11b along a first main surface of the valve action metal base 11. In the solid electrolytic capacitor 1A illustrated in FIG. 1(a), the conductor layer 14A preferably comprises the metal foil. As illustrated in FIG. 1(a), an insulating layer 15 that insulates the conductor layer 14A and the valve action metal base 11 from each other is disposed between the sealing layer 20 and a part of the core portion 11b on which the porous portion 11a is not disposed.

In the solid electrolytic capacitor 1A illustrated in FIG. 1(a), regarding the first main surface of the valve action metal base 11, the position of a part of a surface of the core portion 11b on which the porous portion 11a is not formed is lower than that of a part of the porous portion 11a nearest to the solid electrolyte layer 13 when the solid electrolytic capacitor 1A is viewed in the thickness direction. The part of the surface of the core portion 11b on which the porous portion 11a is not formed may be flush with a part of the porous portion 11a near the solid electrolyte layer 13 or located at a position higher than that. As illustrated in FIG. 1(b) and FIG. 1(c), it is preferable that the porous portion 11a be located at a central portion of the valve action metal base 11, and that the part of the core portion 11b on which the porous portion 11a is not formed be located within an edge portion of the valve action metal base 11.

Moreover, the sealing layer 20 covers a first main surface of the capacitor element 10A. In the solid electrolytic capacitor 1A illustrated in FIG. 1(a), the sealing layer 20 is disposed on the conductor layer 14A and is disposed also on the insulating layer 15 so as to cover the first main surface of the capacitor element 10A.

In addition, the cathode outer electrode 30 is electrically connected to the conductor layer 14A. In the solid electrolytic capacitor 1A illustrated in FIG. 1(a), the sealing layer 20 and the cathode outer electrode 30 are disposed in this order on the conductor layer 14A. A cathode through-electrode 31 that extends through the sealing layer 20 is disposed in the sealing layer 20 on the conductor layer 14A. The conductor layer 14A and the cathode outer electrode 30 are connected to each other with the cathode through-electrode 31 that is extended to a surface of the sealing layer 20 interposed therebetween.

The form of the cathode through-electrode 31 is not particularly limited, and examples thereof include a plating electrode and a paste electrode. The plating electrode means an electrode composed of a plating film such as an electroplating film or an electro-less plating film. The paste electrode means an electrode composed of a conductive paste solidification and specifically means an electrode composed of conductive particles and a thermosetting resin.

In an example illustrated in FIG. 1(a), a sectional shape of the cathode through-electrode 31 is a reversely tapered shape in which the area of a part near the cathode outer electrode 30 is larger than that of a part near the conductor layer 14A. When the cathode through-electrode 31 is a plating electrode, the sectional shape of the cathode through-electrode 31 is preferably a reversely tapered shape. In this case, the size of the capacitance generation portion can be increased. In the case of a reversely tapered shape, a filling efficiency of plating is good.

The cathode through-electrode 31 may be a columnar metal pin. When the cathode through-electrode 31 is a metal pin, the sectional shape of the cathode through-electrode 31 is preferably a rectangular shape in which the area of the part near the cathode outer electrode 30 is substantially the same as the area of the part near the conductor layer 14A. An example of the shape of the metal pin is a cylindrical shape. The shape of the cathode through-electrode is not limited to a columnar shape such as a cylindrical shape and may be a wall shape described later. In this case, an extended area can be increased more than the case of a columnar shape only, and the ESR can be further decreased.

In FIG. 1(a), the single cathode through-electrode 31 is formed, and at least one cathode through-electrode 31 suffices.

The height of the cathode through-electrode 31 is equal to the thickness of the sealing layer 20. The height of the cathode through-electrode 31 is not particularly limited but is preferably no less than 5 μm and no more than 200 μm.

The form of the cathode outer electrode 30 is not particularly limited, and examples thereof include a metal electrode and a paste electrode. The metal electrode means an electrode composed of a metal film. Examples of the metal film include a plating film, a sputtered film, and a deposited film.

When the cathode outer electrode 30 is a metal electrode, the anode outer electrode 40 is preferably a metal electrode as well but may be a paste electrode. Similarly, when the cathode outer electrode 30 is a paste electrode, the anode outer electrode 40 is preferably a paste electrode as well but may be a metal electrode. In the case of a plating film, resistivity can be decreased by direct growth on a metal surface of each through-electrode. In the case of a paste electrode, improvement in reliability due to increase in the strength of adhesion to the through-electrode can be expected.

The shape of the cathode outer electrode 30 is not particularly limited. However, it is preferable that the cathode outer electrode 30 cover the cathode through-electrode 31 when viewed in the direction of the normal of the first main surface of the capacitor element 10A, and that the area thereof be larger than the area of the cathode through-electrode 31 that is extended to the surface of the sealing layer 20.

The cathode outer electrode 30 may be a ball-shaped terminal that is disposed on the cathode through-electrode 31. An example of the ball-shaped terminal is a BGA (Ball Grid Array) terminal.

The anode outer electrode 40 is electrically connected to the core portion 11b. In the solid electrolytic capacitor 1A illustrated in FIG. 1(a), the insulating layer 15, the sealing layer 20, and the anode outer electrode 40 are disposed in this order on the part of the core portion 11b on which the porous portion 11a is not disposed. A first anode through-electrode 41 that extends through the sealing layer 20 is disposed in the sealing layer 20 on the insulating layer 15. A second anode through-electrode 42 that extends through the insulating layer 15 is disposed in the insulating layer 15 on the part of the core portion 11b on which the porous portion 11a is not disposed. The first anode through-electrode 41 and the part of the core portion 11b on which the porous portion 11a is not disposed are connected to each other with the second anode through-electrode 42 that is extended to the surface of the insulating layer 15 interposed therebetween. The second anode through-electrode 42 and the anode outer electrode 40 are connected to each other with the first anode through-electrode 41 that is extended to the surface of the sealing layer 20 interposed therebetween. In FIG. 1(a), the boundary between the first anode through-electrode 41 and the second anode through-electrode 42 is illustrated to distinguish these. However, the first anode through-electrode and the second anode through-electrode may be integrally formed.

The form of the first anode through-electrode 41 is not particularly limited, and examples thereof include a plating electrode and a paste electrode. The form of the second anode through-electrode 42 is not particularly limited as well, and examples thereof include a plating electrode and a paste electrode. When the first anode through-electrode 41 is a plating electrode, the second anode through-electrode 42 is preferably a plating electrode as well but may be a paste electrode. Similarly, when the first anode through-electrode 41 is a paste electrode, the second anode through-electrode 42 is preferably a paste electrode as well but may be a plating electrode.

In the example illustrated in FIG. 1(a), each of sectional shapes of the first anode through-electrode 41 and the second anode through-electrode 42 is a reversely tapered shape in which the area of a part near the anode outer electrode 40 is larger than that of a part near the core portion 11b. When the first anode through-electrode 41 and the second anode through-electrode 42 are plating electrodes, the sectional shape of the first anode through-electrode 41 and the sectional shape of the second anode through-electrode 42 are preferably reversely tapered shapes. In this case, the size of the capacitance generation portion can be increased. In the case of the reversely tapered shapes, the filling efficiency of plating is good.

The first anode through-electrode 41 and the second anode through-electrode 42 may be columnar metal pins. When the first anode through-electrode 41 and the second anode through-electrode 42 are metal pins, each of the sectional shapes of the first anode through-electrode 41 and the second anode through-electrode 42 is preferably a rectangular shape in which the area of the part near the anode outer electrode 40 is substantially the same as the area of the part near the core portion 11b. An example of the shape of the metal pins is a cylindrical shape. The shape of the first anode through-electrode and the second anode through-electrode is not limited to a columnar shape such as a cylindrical shape and may be a wall shape described later. The first anode through-electrode in a columnar shape and the second anode through-electrode in a wall shape may be combined, or reverse relationship may also be acceptable. In this case, the ESR can be decreased more than the case of a columnar shape only.

In FIG. 1(a), the single first anode through-electrode 41 and the single second anode through-electrode 42 are formed. However, there may be two or more first anode through-electrodes 41 and two or more second anode through-electrodes 42. In FIG. 1(a), the first anode through-electrode 41 and the second anode through-electrode 42 are formed on the right-hand side, but the first anode through-electrode 41 and the second anode through-electrode 42 may be formed on the left-hand side.

The form of the anode outer electrode 40 is not particularly limited, and examples thereof include a metal electrode and a paste electrode.

The shape of the anode outer electrode 40 is not particularly limited. However, it is preferable that the anode outer electrode 40 cover the first anode through-electrode 41 when viewed in the direction of the normal of the first main surface of the capacitor element 10A, and that the area thereof be larger than the area of the first anode through-electrode 41 that is extended to the surface of the sealing layer 20.

The anode outer electrode 40 may be a ball-shaped terminal that is disposed on the first anode through-electrode 41. An example of the ball-shaped terminal is a BGA (Ball Grid Array) terminal.

In FIG. 1(a), the cathode outer electrode 30 and the anode outer electrode 40 are not in contact with each other and are insulated from each other on the surface of the sealing layer 20.

From the perspective of protection of other surfaces, for example, surfaces other than the surfaces of the anode outer electrode 40 and the cathode outer electrode 30 may be covered by another insulating layer, although this is not illustrated in FIG. 1(a). From the perspective of protection of the capacitor element, for example, a stress-relaxing layer and a damp-proof film may be disposed between the capacitor element and the sealing layer.

In the solid electrolytic capacitor according to the present invention, the insulating layer is preferably composed of a resin. Examples of the resin of which the insulating layer is composed include a polyphenyl sulfone resin, a polyether sulfone resin, a cyanate ester resin, a fluorine resin (such as tetrafluoroethylene or tetrafluoroethylene-perfluoroalkyl vinyl ether copolymer), a polyimide resin, a polyamide imide resin, and an insulating resin such as a derivative or a precursor thereof. The insulating layer may be composed of the same resin as the sealing layer.

In the solid electrolytic capacitor according to the present invention, the sealing layer is preferably composed of a resin. Examples of the resin of which the sealing layer is composed include an epoxy resin and a phenolic resin.

In the solid electrolytic capacitor according to the present invention, the valve action metal base is composed of a valve action metal that exerts so-called valve action. Examples of the valve action metal include a single metal such as aluminum, tantalum, niobium, titanium, or zirconium, and an alloy containing these metals. Among these, aluminum or an aluminum alloy is preferable.

The shape of the valve action metal base is preferably a flat plate shape, more preferably a foil shape. It is only necessary for the valve action metal base to include the porous portion at least on the first main surface of the core portion. The valve action metal base, however, may include porous portions on both of the main surfaces of the core portion. The porous portion is preferably an etching layer that is formed on the surface of the core portion.

In particular, when the porous portion is formed on the surface of the core portion of the valve action metal base in a flat plate shape, a stress-relaxing portion that includes no porous portion is preferably disposed at and near a central portion of the surface of the core portion in a plan view of the core portion of the valve action metal base as described later. The stress-relaxing portion does not have a regular shape and may have a circular shape or a cross shape in which an intersection is at the central portion of the core portion. The area of the stress-relaxing portion is preferably no less than 5% and less than 20% of the area of the first main surface of the valve action metal base.

The stress-relaxing portion prevents the porous portion from being damaged and inhibits an electric current leak from occurring even when a stress is applied to the entire solid electrolytic capacitor. The stress-relaxing portion may be covered by the dielectric layer or may be covered by the cathode. The stress-relaxing portion may be covered by a resin or another insulating layer.

The thickness of the core portion of the valve action metal base is preferably no less than 5 μm and no more than 100 μm. The thickness of the porous portion except for the core portion is preferably no less than 5 μm and no more than 200 μm.

In the solid electrolytic capacitor according to the present invention, the dielectric layer is formed on the surface of the porous portion of the valve action metal base. A state of the surface of the porous portion is reflected on the dielectric layer that is formed on the surface of the porous portion, and the dielectric layer has a surface shape having fine irregularities. The dielectric layer is preferably composed of an oxide film of the valve action metal. For example, when aluminum foil is used as the valve action metal base, the dielectric layer composed of the oxide film can be formed by performing anode oxidation treatment (also referred to as chemical conversion treatment) on surfaces of the aluminum foil in a solution that contains, for example, ammonium adipate. The dielectric layer is preferably not formed on the surface of the core portion.

Examples of the material of the solid electrolyte layer in the solid electrolytic capacitor according to the present invention include a conductive polymer such as polypyrroles, polythiophenes, and polyanilines. Among these, polythiophenes are preferable, and poly (3,4-ethylenedioxythiophene) referred to as PEDOT is particularly preferable. The conductive polymer may contain a dopant such as polystyrene sulfonate (PSS). The solid electrolyte layer preferably includes an inner layer for filling fine holes of the dielectric layer and an outer layer for coating the dielectric layer.

In the solid electrolytic capacitor according to the first embodiment, the conductor layer contains the metal foil. As described at (a) to (d) below, various examples can be thought as preferred structures of the conductor layer. In the following description, the form thereof is listed. The form of the conductor layer illustrated in FIG. 1(a) corresponds to (d).

(a) The conductor layer that contains the metal foil is composed of a conductive resin layer and the metal foil. An example of the conductive resin layer is a carbon layer, which is a conductive adhesive layer that contains a conductive graphite filler and carbon black. A conductive adhesive that is used for the conductive adhesive layer is not limited to one containing the graphite filler and carbon black and may contain another conductive material.

In this case, the conductive resin layer such as the carbon layer is disposed on the solid electrolyte layer, and the metal foil is disposed on the conductive resin layer.

When the conductor layer is composed of the conductive resin layer such as the carbon layer and the metal foil, the need for a silver layer with which an existing solid electrolytic capacitor is provided can be eliminated. For this reason, a solid electrolytic capacitor having a simpler structure can be provided at a low cost.

(b) The conductor layer that contains the metal foil is composed of the conductive resin layer, a silver layer, and the metal foil.

In this case, the conductive resin layer is disposed on the solid electrolyte layer, the silver layer is disposed on the conductive resin layer, and the metal foil is disposed on the silver layer.

(c) The conductor layer that contains the metal foil is composed of the silver layer and the metal foil.

In this case, the silver layer is disposed on the solid electrolyte layer, and the metal foil is disposed on the silver layer.

When the conductor layer is composed of the silver layer and the metal foil, the need for the conductive adhesive layer with which the existing solid electrolytic capacitor is provided can be eliminated. For this reason, a solid electrolytic capacitor having a simpler structure can be provided at a low cost.

(d) The conductor layer that contains the metal foil is consist of the metal foil, and the metal foil is in direct contact with the solid electrolyte layer.

In this case, neither the silver layer nor the conductive adhesive layer are disposed on the solid electrolyte layer, and the metal foil is disposed on the solid electrolyte layer.

When the conductor layer is consist of the metal foil, the ESR can be greatly decreased, and the need for the silver layer and the conductive adhesive layer with which the existing solid electrolytic capacitor is provided can be eliminated. For this reason, a solid electrolytic capacitor having a simpler structure can be provided at a low cost.

When only the metal foil is used as the conductor layer, it is preferable that a surface of the metal foil be coated with carbon, and that the surface of the metal foil that is coated with the carbon be in direct contact with the solid electrolyte layer. A carbon coat layer that has a thickness of 1 µm or less is formed on the surface of the metal foil by, for example, vapor deposition. Even when only the metal foil is used, the use of the surface that is coated with the carbon achieves the same characteristics as in the case where the conductive adhesive layer is disposed on the solid electrolyte layer.

In the solid electrolytic capacitor according to the first embodiment, a surface of the metal foil that is contained in the conductor layer preferably includes a roughened surface.

The roughened surface that is included in the surface of the metal foil improves adhesion between the metal foil and another conductive adhesive layer, the silver layer, or the solid electrolyte layer, and the ESR can be decreased. It is noted that the method of forming the roughened surface is not particularly limited. The roughened surface may be formed by, for example, etching.

A coat layer composed of an anchor coat agent may be formed on the surface of the metal foil that is contained in the conductor layer.

The coat layer that is composed of an anchor coat agent and that is formed on the surface of the metal foil improves adhesion between the metal foil and another conductive adhesive layer, the silver layer, or the solid electrolyte layer, and the ESR can be decreased In the solid electrolytic capacitor according to the first embodiment, the thickness of the metal foil that is contained in the conductor layer is not particularly limited but is preferably no less than 5 µm and no more than 100 µm from the perspective that the ESR is decreased.

In the solid electrolytic capacitor according to the first embodiment, the metal foil that is contained in the conductor layer is preferably composed of at least a metal that is selected from the group consisting of aluminum, copper, silver, and an alloy the main component of which is any one of these metals.

The metal foil composed of the above metal enables the resistivity of the metal foil to be decreased and enables the ESR to be decreased. In particular, aluminum is preferable from the perspective of a laser process.

It is noted that in the present specification, the "main component" refers to an element component that has the maximum element abundance ratio (weight percent).

In the solid electrolytic capacitor according to the first embodiment, the metal foil that is contained in the conductor layer preferably has at least one through-hole. The through-hole of the metal foil enables the ESR to be decreased.

When the insulating layer is disposed between the part of the core portion on which the porous portion is not disposed and the sealing layer in the solid electrolytic capacitor according to the first embodiment, the metal foil may not be disposed on the insulating layer but is preferably disposed also on the insulating layer as illustrated in FIG. 1(a). When the metal foil is disposed also on the insulating layer, an area in which the cathode through-electrode in contact with the cathode outer electrode can be disposed is increased, and the ESR can be decreased.

When the metal foil is disposed also on the insulating layer, the cathode through-electrode may be formed above the insulating layer.

Figure 2:
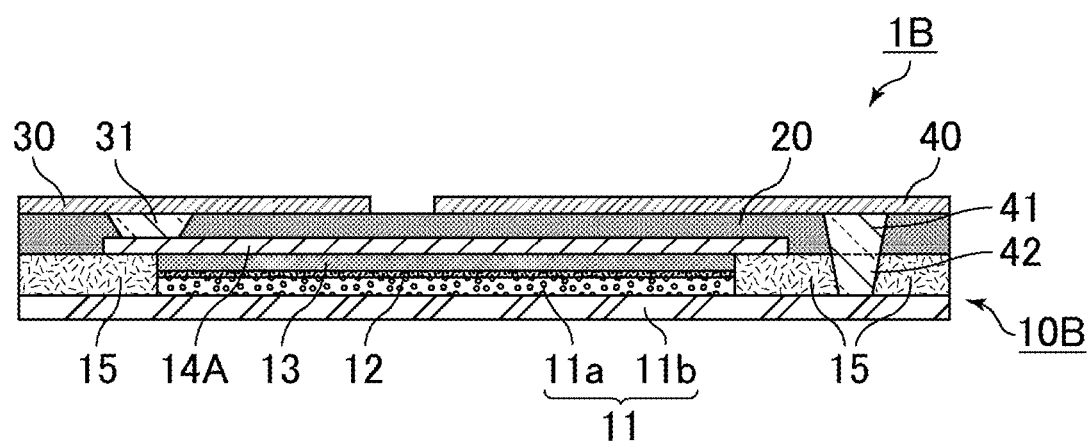
FIG. 2 schematically illustrates a sectional view of another example of the solid electrolytic capacitor according to the first embodiment.

FIG. 2 schematically illustrates a sectional view of another example of the solid electrolytic capacitor according to the first embodiment.

In a capacitor element 10B of a solid electrolytic capacitor 1B illustrated in FIG. 2, the conductor layer 14A consist of the metal foil is disposed also on the insulating layer 15, and the cathode through-electrode 31 is formed above the insulating layer 15.

An example of a method for manufacturing the solid electrolytic capacitor according to the first embodiment will now be described.

FIG. 3(a) to FIG. 3(j) schematically illustrate the example of the method for manufacturing the solid electrolytic capacitor illustrated in FIG. 1(a) with perspective views.

The capacitor element with the insulating layer formed on the exposed portion of the core portion is first prepared.

Figure 3A:
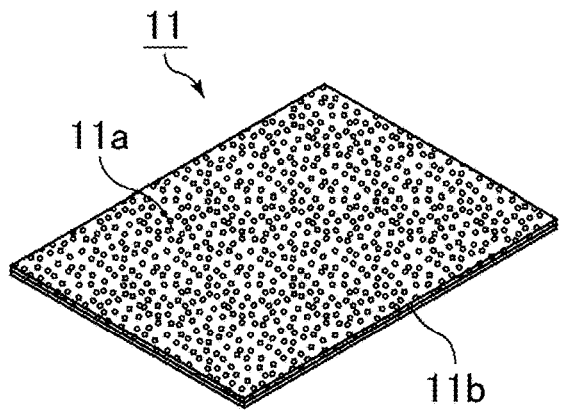
FIGS. 3(*a*) to 3(*j*) schematically illustrate an example of a method for manufacturing the solid electrolytic capacitor illustrated in FIG. 1(*a*) with perspective views.
Figure 3B:
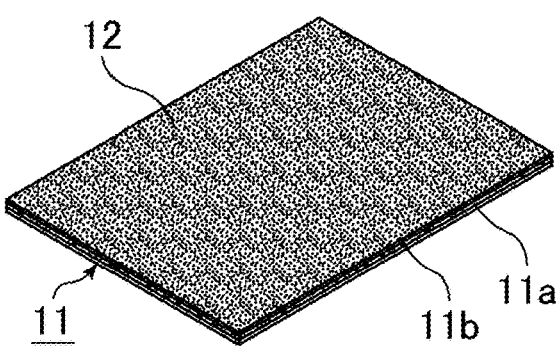

As illustrated in FIG. 3(a), the valve action metal base 11 that includes the porous portion 11a such as the etching layer on the entire first main surface of the core portion 11b is prepared. As illustrated in FIG. 3(b), the dielectric layer 12 is formed on the surface of the porous portion 11a. For example, in the case where aluminum foil is used as the valve action metal base, the dielectric layer composed of the oxide film can be formed by performing anode oxidation treatment (also referred to as chemical conversion treatment) on surfaces of the aluminum foil in a solution that contains, for example, ammonium adipate, as described above.

The stress-relaxing portion that contains no porous portion may be disposed on the surface of the core portion in a manner in which a part of the valve action metal base is not etched. The stress-relaxing portion that includes no porous portion is preferably disposed at and near the central portion of the surface of the valve action metal base in a plan view of the valve action metal base as described above.

The solid electrolytic capacitor according to the present invention has a relatively thin structure. Accordingly, there is a possibility that, when a stress is applied, the dielectric layer cracks, and a leak electric current is generated therefrom. For this reason, the stress-relaxing portion is disposed at the central portion, which is likely to be subjected to a stress, and this portion can have a function of letting the stress escape. The stress-relaxing portion may be near the cathode.

Figure 4A:
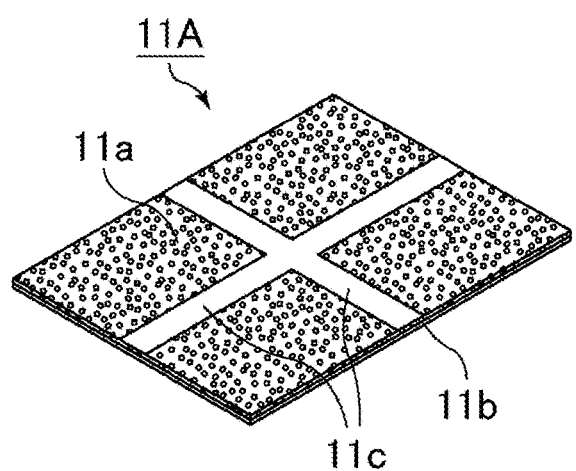
FIG. 4(*a*) schematically illustrates a perspective view of an example of a valve action metal base that includes a stress-relaxing layer.
Figure 4B:
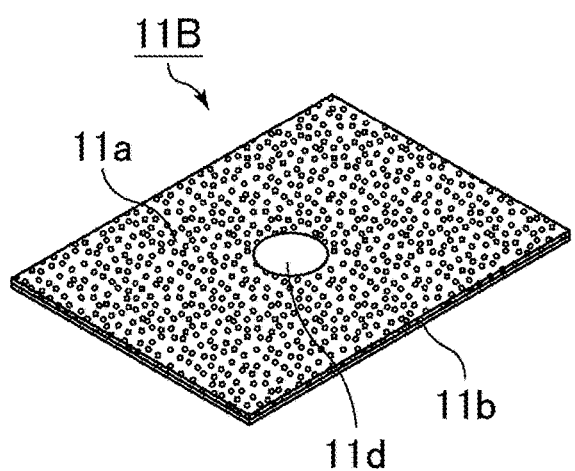

FIG. 4(a) schematically illustrates a perspective view of an example of the valve action metal base that includes the stress-relaxing layer. FIG. 4(b) schematically illustrates a perspective view of another example of the valve action metal base that includes the stress-relaxing layer. A stress-relaxing portion 11c that has a cross shape in which an intersection is at a central portion of the core portion 11b is disposed at a central portion of the surface of the core portion 11b of a valve action metal base 11A illustrated in FIG. 4(a). A stress-relaxing portion 11d that has a circular shape is disposed at a central portion of the surface of the core portion 11b of a valve action metal base 11B illustrated in FIG. 4(b). For example, the width of each of lines of the stress-relaxing portion 11c illustrated in FIG. 4(a) is no less than 0.2 mm and no more than 1.0 mm.

The area of the stress-relaxing portion is preferably no less than 5% and less than 20% of the area of the first main surface of the valve action metal base as described above. Specifically, when the area of the first main surface of the valve action metal base is 3.5 mm×2.8 mm, the area is 15% when the width of the stress-relaxing portion is 0.2 mm. When the area of the first main surface of the valve action metal base is 5.0 mm×5.0 mm, the area is 10% when the width of the stress-relaxing portion is 0.2 mm.

Figure 3C:
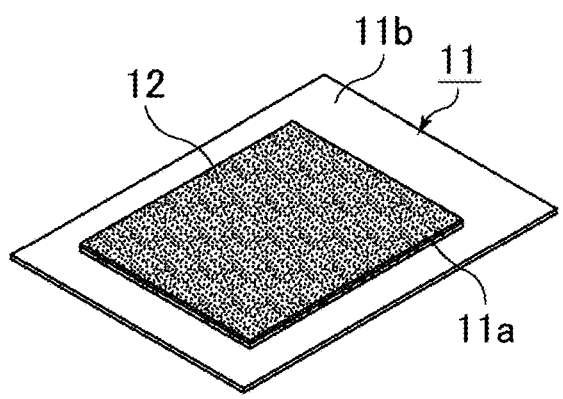

As illustrated in FIG. 3(c), a part of the dielectric layer 12 and a part of the porous portion 11a are removed by, for example, a laser process to expose the core portion 11b, which becomes the anode, from the first main surface of the valve action metal base 11. In this case, the position of a surface of the exposed portion of the core portion 11b is lower than that of the surface of the porous portion 11a. In FIG. 3(c), the part of the core portion 11b within the edge portion of the valve action metal base 11 is exposed. The dielectric layer 12 may be formed after the core portion 11b is exposed by removing the part of the porous portion 11a. In this case, the surface of the core portion 11b is preferably masked such that the dielectric layer 12 is not formed on the surface of the core portion 11b. In the case where the laser process is performed, the core portion 11b, which becomes the anode, is preferably composed of aluminum. The core portion that is composed of aluminum functions as a laser stop layer for preventing a laser from penetrating the core portion and can inhibit the porous portion 11a from being damaged. The laser process is used also in the case of forming the cathode through-electrode 31. In this case, the conductor layer 14A, which becomes the cathode, is preferably composed of aluminum as well. The reason is that the same laser process as with the anode can be continuously performed.

From the perspective that the efficiency of manufacturing is increased, chemical-conversion foil that is subjected to the chemical conversion treatment in advance may be used as the valve action metal base having the surface on which the dielectric layer is formed. In this case, since the dielectric layer is formed on the entire chemical-conversion foil, the core portion, which becomes the anode, can be exposed from the first main surface of the valve action metal base by removing a part of the dielectric layer and a part of the porous portion by, for example, the laser process.

Figure 3D:
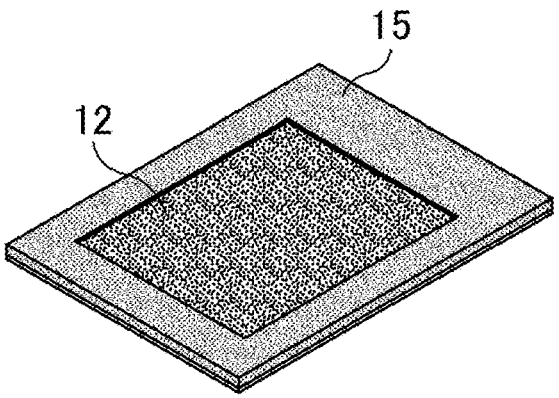

As illustrated in FIG. 3(d), an insulating resin is applied to the core portion 11b to form the insulating layer 15. A method of applying the insulating resin is not particularly limited, and examples thereof include dispensing and screen printing.

Figure 3E:
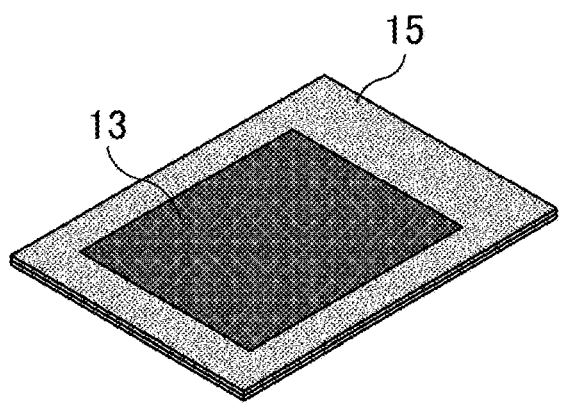

As illustrated in FIG. 3(e), the solid electrolyte layer 13 is formed on the dielectric layer 12. For example, the solid electrolyte layer can be formed by a method of forming a polymer film such as a poly (3,4-ethylenedioxythiophene) film on the surface of the dielectric layer by using, for example, a process liquid containing a monomer such as 3,4-ethylenedioxythiophene or a method of drying a dispersing liquid of a polymer such as poly (3,4-ethylenedioxythiophene) applied to the surface of the dielectric layer. The solid electrolyte layer is preferably formed by forming the outer layer for coating the dielectric layer after the inner layer for filling the fine holes of the dielectric layer is formed.

Figure 3F:
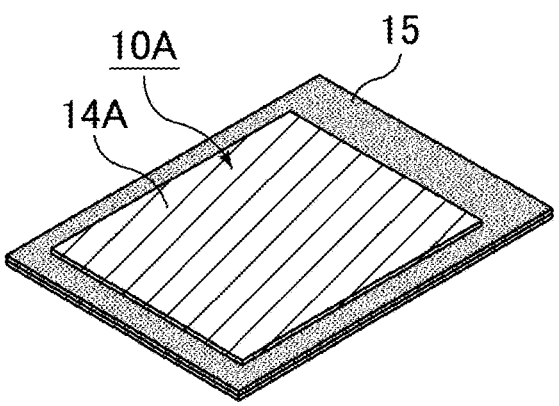

As illustrated in FIG. 3(f), the conductor layer 14A is formed on the solid electrolyte layer 13. In the above manner, the capacitor element 10A on which the insulating layer 15 is formed is obtained. In FIG. 3(f), only the metal foil is disposed as the conductor layer 14A on the solid electrolyte layer 13. The conductive resin layer such as the carbon layer and the metal foil may be disposed as the conductor layer. The silver layer may be disposed instead of the conductive resin layer. The silver layer may be disposed between the conductive resin layer and the metal foil.

For example, the carbon layer and the silver layer can be formed by applying and drying silver paste after carbon paste is applied and dried.

When the metal foil is disposed, the layer below the metal foil preferably has viscosity with the metal foil placed thereon. The carbon paste, the silver paste, and the solid electrolyte layer have viscosity before being dried and are suitable to directly dispose the metal foil thereon. When the carbon layer, the silver layer, or the solid electrolyte layer that serves as the layer below the metal foil is dried, it is difficult for the metal foil to adhere. Accordingly, the metal foil is preferably placed after the conductive adhesive layer is disposed.

Figure 3G:
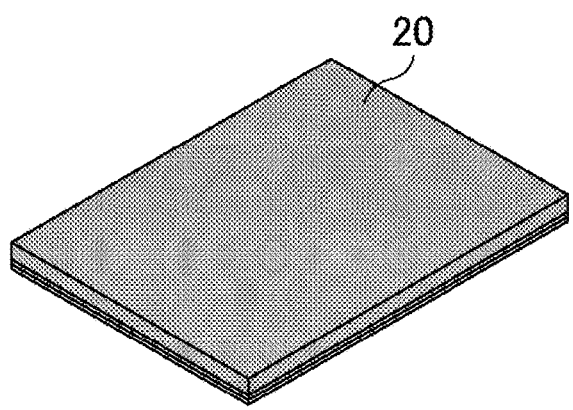

As illustrated in FIG. 3(g), the sealing layer 20 is formed on the insulating layer 15 and the conductor layer 14A of the capacitor element 10A so as to cover the first main surface of the capacitor element 10A on which the insulating layer 15 is formed. The sealing layer can be formed by, for example, a resin molding method.

Figure 3H:
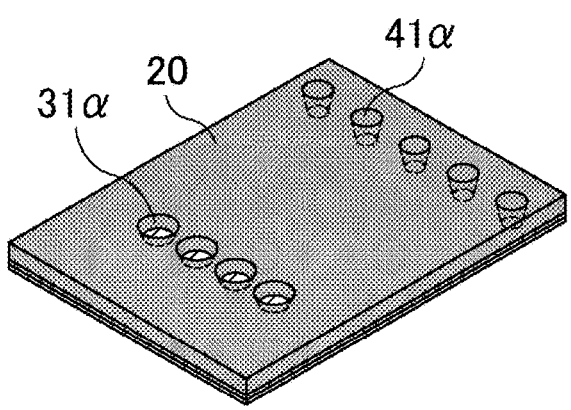

As illustrated in FIG. 3(h), a cathode through-hole 31α that extends through the sealing layer 20 on the conductor layer 14A of the capacitor element 10A is formed by, for example, the laser process, and an anode through-holes 41α that extends through the insulating layer 15 and the sealing layer 20 on the exposed portion of the core portion 11b of the capacitor element 10A is formed.

Figure 3I:
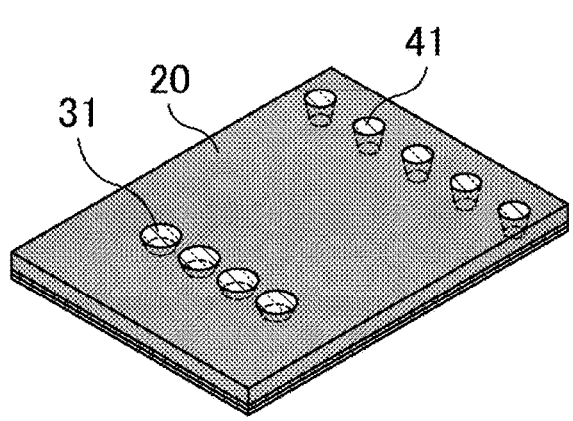

Subsequently, as illustrated in FIG. 3(i), the cathode through-electrode 31 that extends through the sealing layer 20 on the conductor layer 14A of the capacitor element 10A, the second anode through-electrode 42 (not illustrated) that extends through the insulating layer 15 on the exposed portion 11b of the core portion 11b of the capacitor element 10A, and the first anode through-electrode 41 that extends through the sealing layer 20 on the insulating layer 15 are formed. The cathode through-electrode 31 is connected to the conductor layer 14A of the capacitor element 10A. The first anode through-electrode 41 and the second anode through-electrode 42 are connected to the core portion 11b of the capacitor element 10A. For example, a plating electrode or a paste electrode may be formed as each of the cathode through-electrode, the first anode through-electrode, and the second anode through-electrode.

Figure 5A:
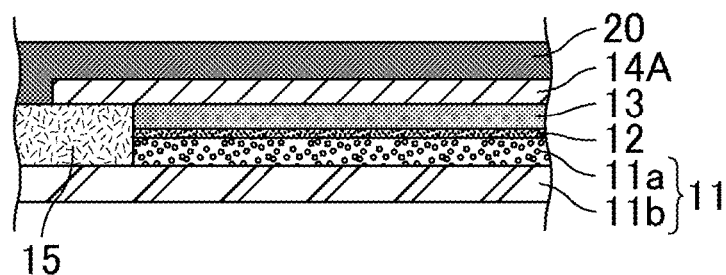
FIG. 5(*a*), FIG. 5(*b*), and FIG. 5(*c*) schematically illustrate an example of a method of forming a cathode through-electrode with sectional views.
Figure 5B:
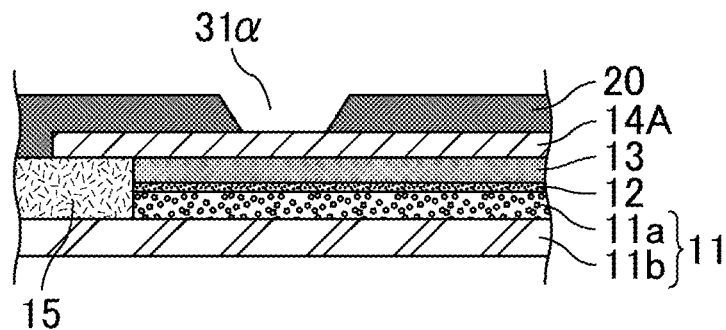
Figure 5C:
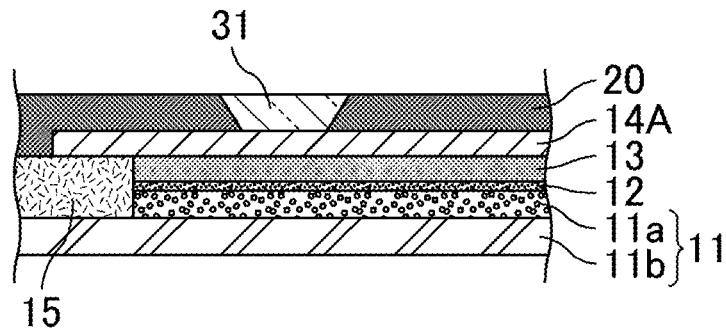

FIG. 5(a), FIG. 5(b), and FIG. 5(c) schematically illustrate an example of a method of forming the cathode through-electrode with a sectional view.

As illustrated in FIG. 5(a) and FIG. 5(b), the cathode through-hole 31α that extends through the sealing layer 20 on the conductor layer 14A that contains the metal foil is formed. The cathode through-hole is preferably formed by the laser process. When the cathode through-hole is formed by the laser process, the cathode through-hole may be formed up to a part of the conductor layer. Subsequently, as illustrated in FIG. 5(c), the cathode through-electrode 31 is formed in the cathode through-hole 31α. For example, a plating electrode or a paste electrode may be formed as the cathode through-electrode. When the cathode through-hole is formed by the laser process, the sectional shape of the cathode through-electrode can be a reversely tapered shape.

The cathode through-electrode, the first anode through-electrode, and the second anode through-electrode may be formed after the sealing layer is formed or may be formed before the sealing layer is formed.

Figure 3J:
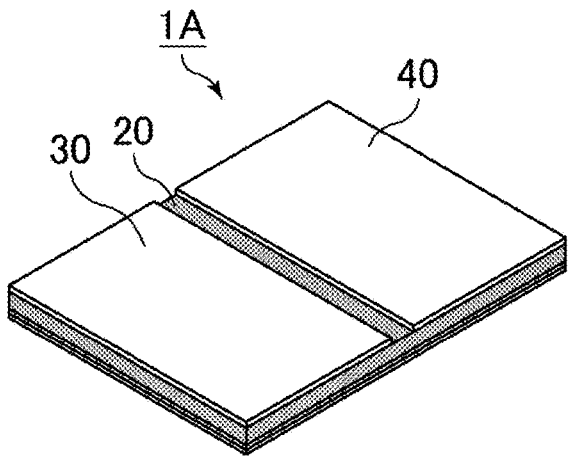

As illustrated in FIG. 3(j), the anode outer electrode 40 that is connected to the first anode through-electrode 41 that is exposed from the surface of the sealing layer 20 and the cathode outer electrode 30 that is connected to the cathode through-electrode 31 that is exposed from the surface of the sealing layer 20 are formed on the sealing layer 20. The anode outer electrode 40 is electrically connected to the core portion 11b with the second anode through-electrode 42 and the first anode through-electrode 41 interposed therebetween. The cathode outer electrode 30 is electrically connected to the conductor layer 14A with the cathode through-electrode 31 interposed therebetween. For example, a metal electrode, a paste electrode, or a ball-shaped terminal may be formed as each of the anode outer electrode and the cathode outer electrode.

In the above manner, the solid electrolytic capacitor 1A illustrated in FIG. 1(a) is obtained.

The shape of the cathode through-electrode, the first anode through-electrode, and the second anode through-electrode is not limited to a columnar shape such as a cylindrical shape and may be a wall shape.

Figure 6A:
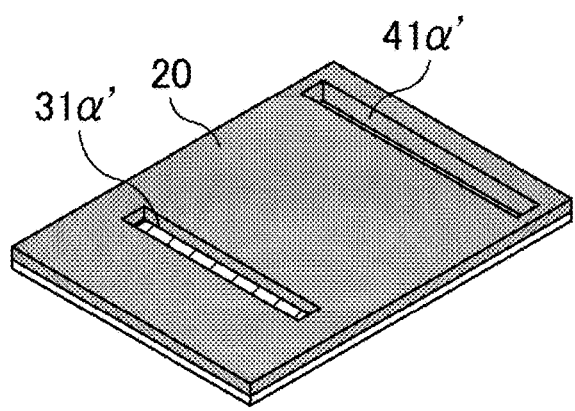
FIG. 6(*a*) and FIG. 6(*b*) schematically illustrate an example of a method of forming a cathode through-electrode, a first anode through-electrode, and a second anode through-electrode in a wall shape with perspective views.
Figure 6B:
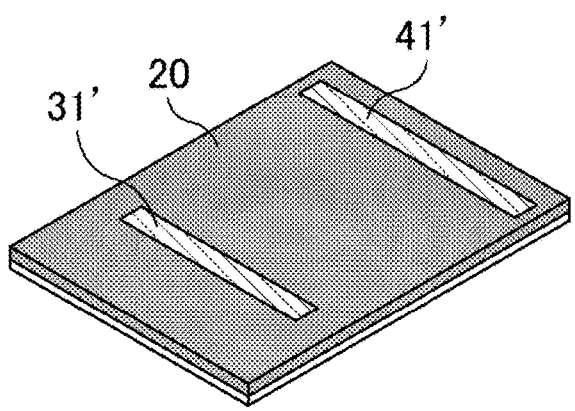

FIG. 6(a) and FIG. 6(b) schematically illustrate an example of a method of forming the cathode through-electrode, the first anode through-electrode, and the second anode through-electrode in a wall shape with perspective views.

A cathode through-electrode 31', a second anode through-electrode (not illustrated), and a first anode through-electrode 41' in a wall shape may be formed as illustrated in FIG. 6(b) in a manner in which a cathode through-hole 31α' and an anode through-hole 41α' that has a rectangular-cuboid sectional shape are formed as illustrated in FIG. 6(a) and these through-holes are filled with a conductive material. In this case, the area of connection with the metal foil, the anode outer electrode, and the cathode outer electrode can be larger than that in the case of a columnar shape such as a cylindrical shape, and the ESR can be decreased. The anode through-electrode or the cathode through-electrode may have a wall shape.

Second Embodiment

According to the second embodiment, the sealing layer and the anode outer electrode are disposed in this order on the core portion, and the first anode through-electrode is disposed in the sealing layer on the core portion unlike the first embodiment. The first anode through-electrode is in direct contact with the core portion, the core portion is extended to the surface of the sealing layer with the first anode through-electrode interposed therebetween. The design of the second embodiment enables the length of the through-electrode that has a tapered conductive path to be relatively decreased because the core portion is substantially near the anode outer electrode. Consequently, the resistivity can be decreased as a whole, and a large electric current can be dealt with. In particular, when a three-terminal-structure product is used as a circuit bypass capacitor, allowable electric current capacitance between anodes is preferably set to be large. Accordingly, it is advantageous to design a high conductor ratio in a conductive path as in the second embodiment. In addition, the anode outer electrode can be disposed on the same side as the cathode outer electrode, and a solid electrolytic capacitor can be designed to be thin.

Figure 7A:
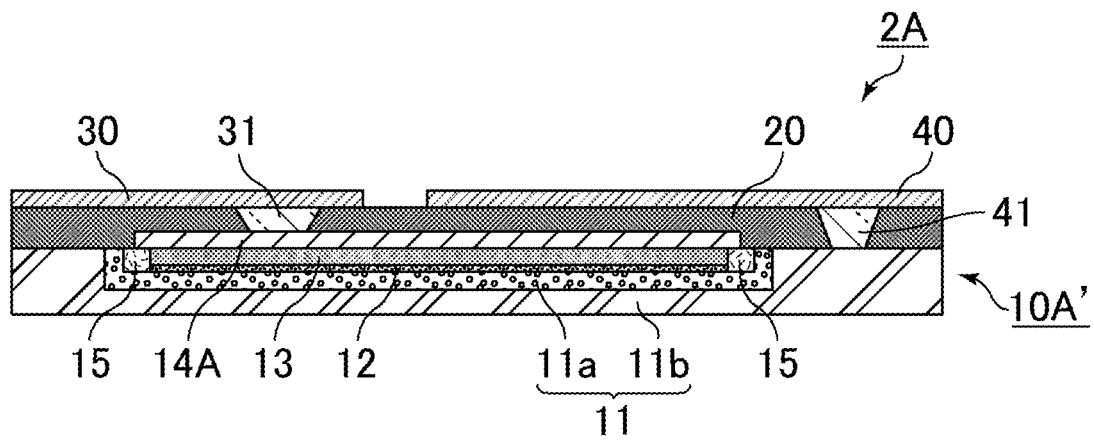
FIG. 7(*a*) schematically illustrates a sectional view of an example of a solid electrolytic capacitor according to a second embodiment.
Figure 7B:
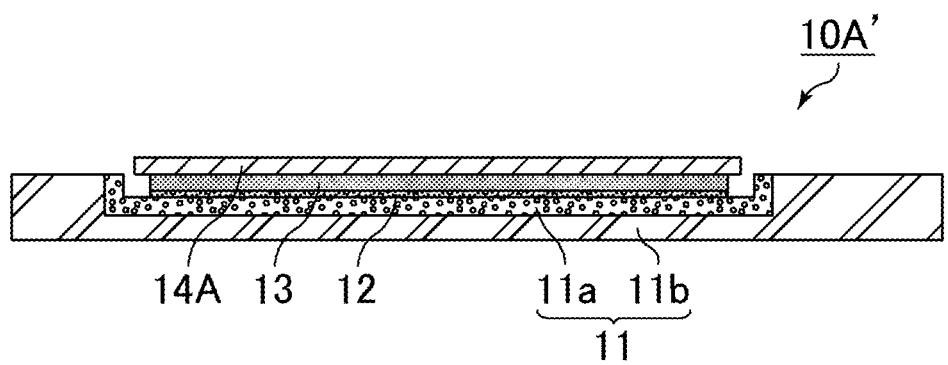
Figure 7C:
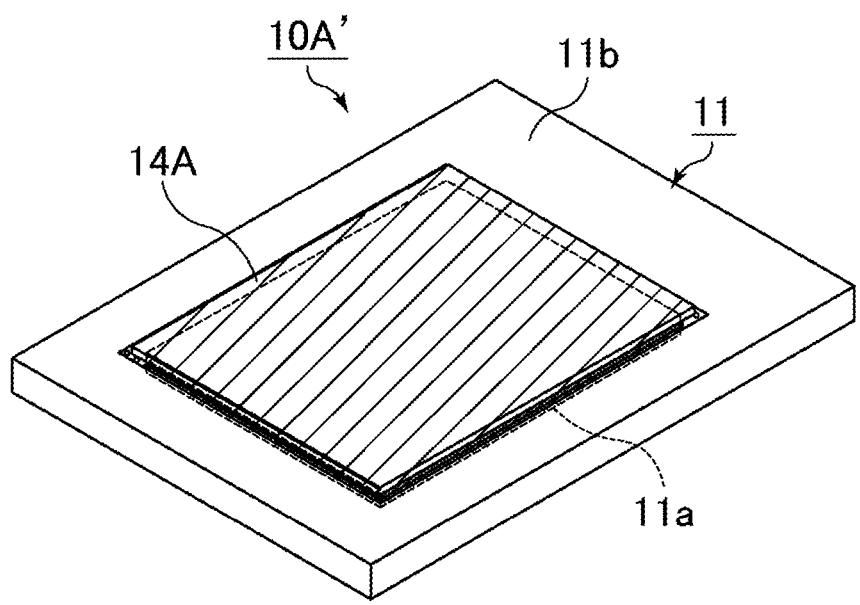

FIG. 7(a) schematically illustrates a sectional view of an example of a solid electrolytic capacitor according to the second embodiment. FIG. 7(b) schematically illustrates a sectional view of an example of a capacitor element that is included in the solid electrolytic capacitor illustrated in FIG. 7(a). FIG. 7(c) schematically illustrates a perspective view of the example of the capacitor element that is included in the solid electrolytic capacitor illustrated in FIG. 7(a).

FIG. 7(a) is a sectional view of a solid electrolytic capacitor 2A. The solid electrolytic capacitor 2A illustrated in FIG. 7(a) includes a capacitor element 10A', the sealing layer 20, the cathode outer electrode 30, and the anode outer electrode 40. As illustrated in FIG. 7(a) and FIG. 7(b), the capacitor element 10A' includes the valve action metal base 11 that includes the porous portion 11a on the first main surface of the core portion 11b, the dielectric layer 12 that is formed on the surface of the porous portion 11a, the solid electrolyte layer 13 that is disposed on the dielectric layer 12, and the conductor layer 14A that is disposed on the solid electrolyte layer 13, and includes the exposed portion of the core portion 11b along the first main surface of the valve action metal base 11. In the solid electrolytic capacitor 2A illustrated in FIG. 7(a), the conductor layer 14A is consist of the metal foil. As illustrated in FIG. 7(a), the insulating layer 15 that insulates the conductor layer 14A and the valve action metal base 11 from each other is disposed on the first main surface of the valve action metal base 11.

In the solid electrolytic capacitor 2A illustrated in FIG. 7(a), regarding the first main surface of the valve action metal base 11, the position of the part of the surface of the core portion 11b on which the porous portion 11a is not formed is higher than that of the part of the porous portion 11a nearest to the solid electrolyte layer 13 when the solid electrolytic capacitor 2A is viewed in the thickness direction. The part of the surface of the core portion 11b on which the porous portion 11a is not formed may be flush with the part of the porous portion 11a near the solid electrolyte layer 13 or located at a position lower than that. As illustrated in FIG. 7(b) and FIG. 7(c), it is preferable that the porous portion 11a be located at the central portion of the valve action metal base 11, and that a part of the core portion 11b on which the porous portion 11a is not formed be located within the edge portion of the valve action metal base 11. In particular, it is preferable that the porous portion 11a be located on an inner surface of a recessed portion of the valve action metal base 11, and that the insulating layer 15 is disposed on an inner wall of the recessed portion.

The sealing layer 20 covers a first main surface of the capacitor element 10A'. In the solid electrolytic capacitor 2A illustrated in FIG. 7(a), the sealing layer 20 is disposed on the conductor layer 14A and is disposed also on the core portion 11b so as to cover the first main surface of the capacitor element 10A'.

The cathode outer electrode 30 is electrically connected to the conductor layer 14A. In the solid electrolytic capacitor 2A illustrated in FIG. 7 (a), the sealing layer 20 and the cathode outer electrode 30 are disposed in this order on the conductor layer 14A. The cathode through-electrode 31 that extends through the sealing layer 20 is disposed in the sealing layer 20 on the conductor layer 14A. The conductor layer 14A and the cathode outer electrode 30 are connected to each other with the cathode through-electrode 31 that is extended to the surface of the sealing layer 20 interposed therebetween.

The form and sectional shape of the cathode through-electrode 31, for example, are the same as in the first embodiment. The form and shape of the cathode outer electrode 30, for example, are the same as in the first embodiment.

The anode outer electrode 40 is electrically connected to the core portion 11b. In the solid electrolytic capacitor 2A illustrated in FIG. 7(a), and the sealing layer 20 and the anode outer electrode 40 are disposed in this order on the part of the core portion 11b on which the porous portion 11a is not disposed. The first anode through-electrode 41 that extends through the sealing layer 20 is disposed in the sealing layer 20 on the part of the core portion 11b on which the porous portion 11a is not disposed. The first anode through-electrode 41 is in direct contact with the core portion 11b. The anode outer electrode 40 and the part of the core portion 11b on which the porous portion 11a is not disposed are connected to each other with the first anode through-electrode 41 that is extended to the surface of the sealing layer 20 interposed therebetween.

The form and sectional shape of the first anode through-electrode 41, for example, are the same as in the first embodiment. The form and shape of the anode outer electrode 40, for example, are the same as in the first embodiment.

In FIG. 7(a), the cathode outer electrode 30 and the anode outer electrode 40 are not in contact with each other and are insulated from each other on the surface of the sealing layer 20.

From the perspective of protection of other surfaces, for example, surfaces other than the surfaces of the anode outer electrode 40 and the cathode outer electrode 30 may be covered by another insulating layer, although this is not illustrated in FIG. 7(a). From the perspective of protection of the capacitor element, for example, the stress-relaxing layer and the damp-proof film may be disposed between the capacitor element and the sealing layer.

The material of the insulating layer and the sealing layer that are included in the solid electrolytic capacitor, for example, is the same as in the first embodiment.

The material of the valve action metal base that is included in the capacitor element, for example, is preferably the same as in the first embodiment. The stress-relaxing portion may be disposed on the surface of the valve action metal base as in the first embodiment.

The thickness of the core portion of the valve action metal base is preferably no less than 5 μm and no more than 300 μm. The thickness of the porous portion except for the core portion is preferably no less than 5 μm and no more than 200 μm. When the recessed portion is formed in the valve action metal base, the depth of the recessed portion is preferably no less than 5 μm and no more than 200 μm.

The material of the dielectric layer and the solid electrolyte layer that are included in the capacitor element, for example, is the same as in the first embodiment. When the porous portion is located in the recessed portion of the valve action metal base, the solid electrolyte layer preferably does not project from the recessed portion.

In the solid electrolytic capacitor according to the second embodiment, the conductor layer contains the metal foil. Preferred structures of the conductor layer are the same as in the first embodiment. Preferred structures of the metal foil are the same as in the first embodiment as well.

When the insulating layer is disposed between the sealing layer and the exposed portion of the core portion, the metal foil may not be disposed on the insulating layer but is preferably disposed also on the insulating layer as in the first embodiment.

When the metal foil is disposed also on the insulating layer, the cathode through-electrode may be formed above the insulating layer.

An example of a method for manufacturing the solid electrolytic capacitor according to the second embodiment will now be described.

FIG. 8(a) to FIG. 8(i) schematically illustrate the example of the method for manufacturing the solid electrolytic capacitor illustrated in FIG. 7(a) with perspective views.

The capacitor element is first prepared.

Figure 8A:
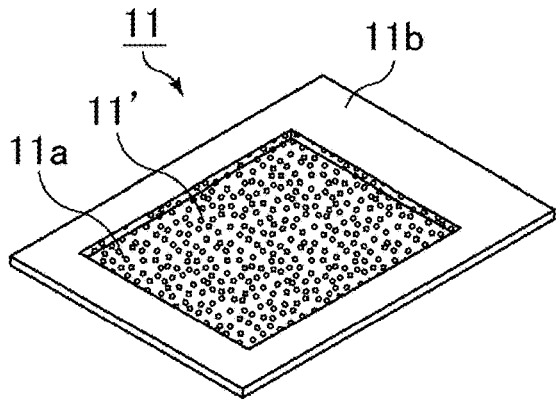
FIGS. 8(*a*) to 8(*i*) schematically illustrate an example of a method for manufacturing the solid electrolytic capacitor illustrated in FIG. 7(*a*) with perspective views.

As illustrated in FIG. 8(a), a recessed portion 11' is formed on the first main surface of the valve action metal base 11 that includes the exposed portion of the core portion 11b, the porous portion 11a such as the etching layer is formed on an inner surface of the recessed portion 11'. A method of forming the recessed portion is not particularly limited, and examples thereof include cutting, pressing, and etching. The recessed portion 11' and the porous portion 11a can be formed at the same time by etching. In FIG. 8(a), the part of the core portion 11b within the edge portion of the valve action metal base 11 and around the recessed portion 11' becomes the anode. In this case, the position of the surface of the exposed portion of the core portion 11b is higher than that of the surface of the porous portion 11a.

The stress-relaxing portion that contains no porous portion may be disposed on the surface of the core portion in a manner in which a part of the valve action metal base is not etched as in the first embodiment. The stress-relaxing portion that includes no porous portion is preferably disposed at and near the central portion of the surface of the valve action metal base in a plan view of the valve action metal base as described above.

Figure 8B:
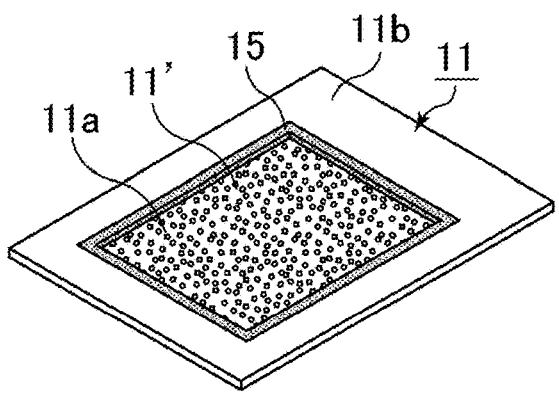

As illustrated in FIG. 8(b), an insulating resin is applied to an outer circumferential portion of the recessed portion 11' in contact with the core portion 11b to form the insulating layer 15. A method of applying the insulating resin is not particularly limited, and examples thereof include dispensing and screen printing. The porous portion 11a may be formed on the inner surface of the recessed portion 11' after the insulating layer 15 is formed on the outer circumferential portion of the recessed portion 11'.

Figure 8C:
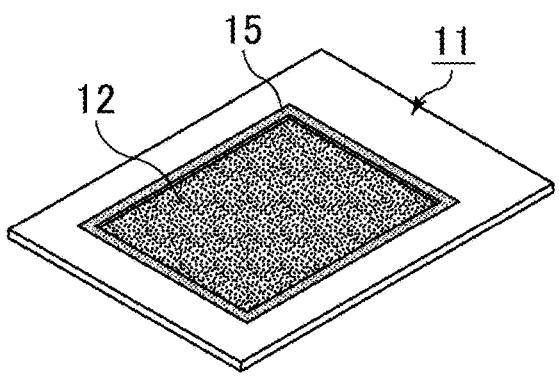

As illustrated in FIG. 8(c), the dielectric layer 12 is formed on the surface of the porous portion 11a. The surface of the core portion 11b is preferably masked such that the dielectric layer 12 is not formed on the surface of the core portion 11b.

Figure 8D:
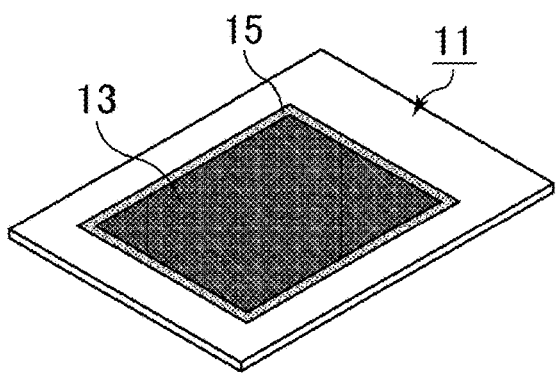

As illustrated in FIG. 8(d), the solid electrolyte layer 13 is formed on the dielectric layer 12. The solid electrolyte layer is preferably formed by forming the outer layer for coating the dielectric layer after the inner layer for filling the fine holes of the dielectric layer is formed.

Figure 8E:
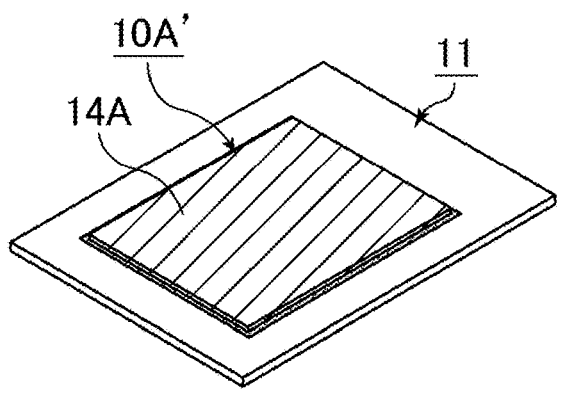

As illustrated in FIG. 8(e), the conductor layer 14A is formed on the solid electrolyte layer 13. In the above manner, the capacitor element 10A' is obtained. In FIG. 8(e), only the metal foil is disposed as the conductor layer 14A on the solid electrolyte layer 13 as in the first embodiment. The conductive resin layer such as the carbon layer and the metal foil may be disposed as the conductor layer. The silver layer may be disposed instead of the conductive resin layer. The silver layer may be disposed between the conductive resin layer and the metal foil.

Figure 8F:
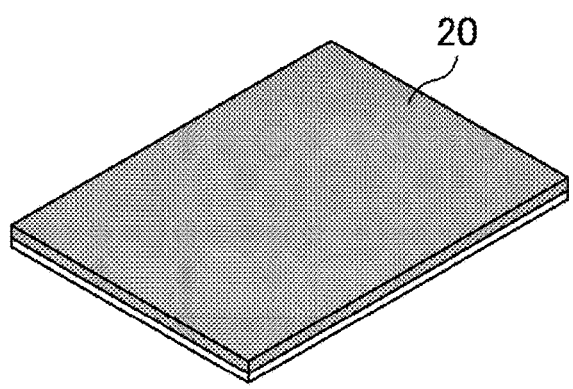

As illustrated in FIG. 8(f), the sealing layer 20 is formed on the conductor layer 14A and the exposed portion of the core portion 11b of the capacitor element 10A' so as to cover the first main surface of the capacitor element 10A'. The sealing layer can be formed by, for example, the resin molding method.

Figure 8G:
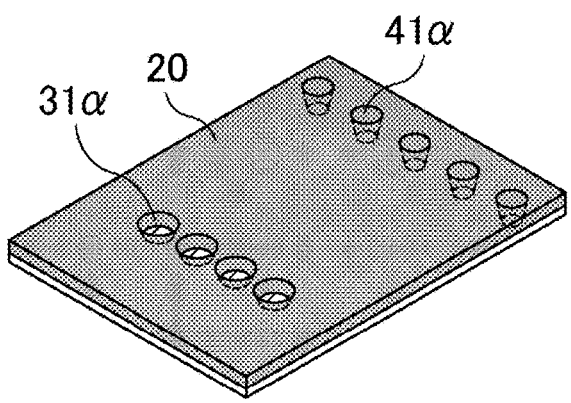

As illustrated in FIG. 8(g), by the laser process, the cathode through-hole 31a that extends through the sealing layer 20 on the conductor layer 14A of the capacitor element 10A' is formed, and the anode through-holes 41α that extends through the sealing layer 20 on the exposed portion of the core portion 11b of the capacitor element 10A' is formed.

Figure 8H:
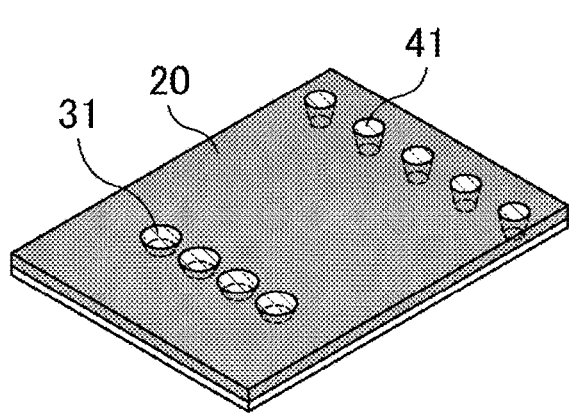

Subsequently, as illustrated in FIG. 8(h), the cathode through-electrode 31 that extends through the sealing layer 20 on the conductor layer 14A of the capacitor element 10A' and the first anode through-electrode 41 that extends through the sealing layer 20 on the exposed portion of the core portion 11b of the capacitor element 10A' are formed. The cathode through-electrode 31 is connected to the conductor layer 14A of the capacitor element 10A'. The first anode through-electrode 41 is connected to the core portion 11b of the capacitor element 10A'. For example, a plating electrode or a paste electrode may be formed as each of the cathode through-electrode and the first anode through-electrode.

The cathode through-electrode and the first anode through-electrode may be formed after the sealing layer is formed or may be formed before the sealing layer is formed. The shape of the cathode through-electrode and the first anode through-electrode is not limited to a columnar shape such as a cylindrical shape and may be a wall shape.

Figure 8I:
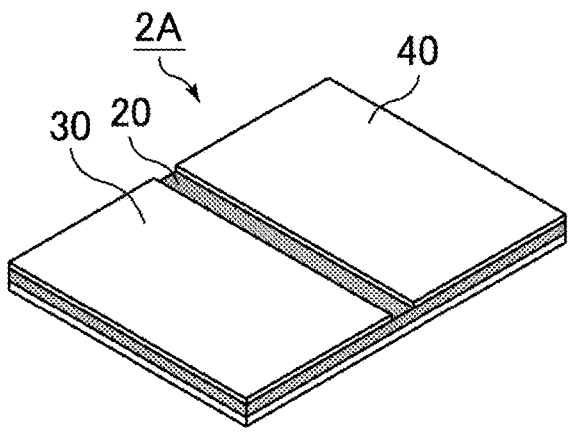

As illustrated in FIG. 8(i), the anode outer electrode 40 that is connected to the first anode through-electrode 41 that is exposed from the surface of the sealing layer 20 and the cathode outer electrode 30 that is connected to the cathode through-electrode 31 that is exposed from the surface of the sealing layer 20 are formed on the sealing layer 20. The anode outer electrode 40 is electrically connected to the core portion 11b with the first anode through-electrode 41 interposed therebetween. The cathode outer electrode 30 is electrically connected to the conductor layer 14A with the cathode through-electrode 31 interposed therebetween. For example, a metal electrode, a paste electrode, or a ball-shaped terminal may be formed as each of the anode outer electrode and the cathode outer electrode.

In the above manner, the solid electrolytic capacitor 2A illustrated in FIG. 7(a) is obtained.

Third Embodiment

A solid electrolytic capacitor according to a third embodiment has the same structure as the solid electrolytic capacitor according to the first embodiment except that the conductor layer includes no metal foil.

Figure 9A:
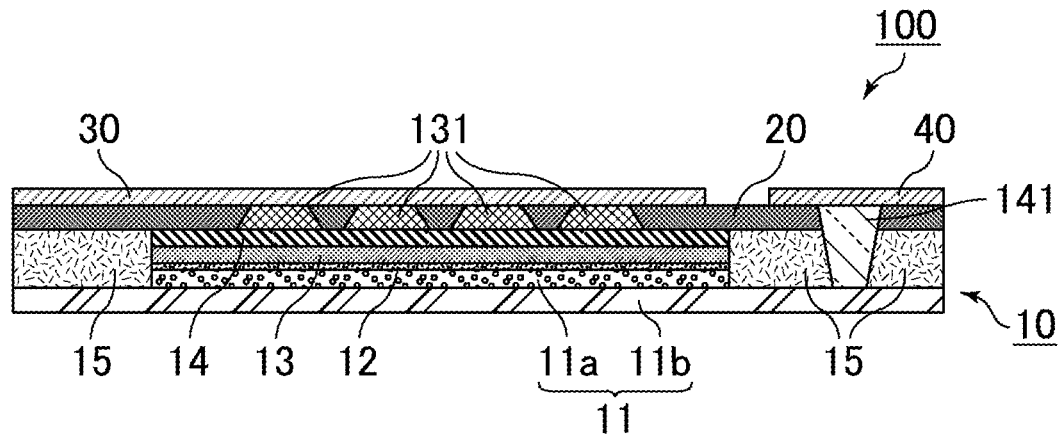
FIG. 9(*a*) schematically illustrates a sectional view of an example of a solid electrolytic capacitor according to a third embodiment.
Figure 9B:
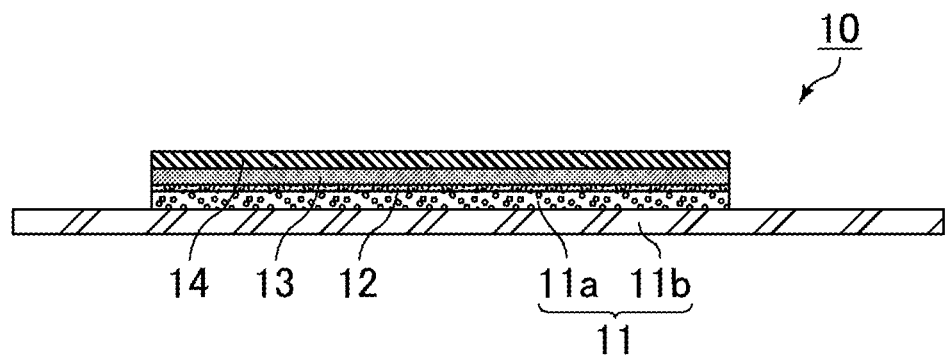
Figure 9C:
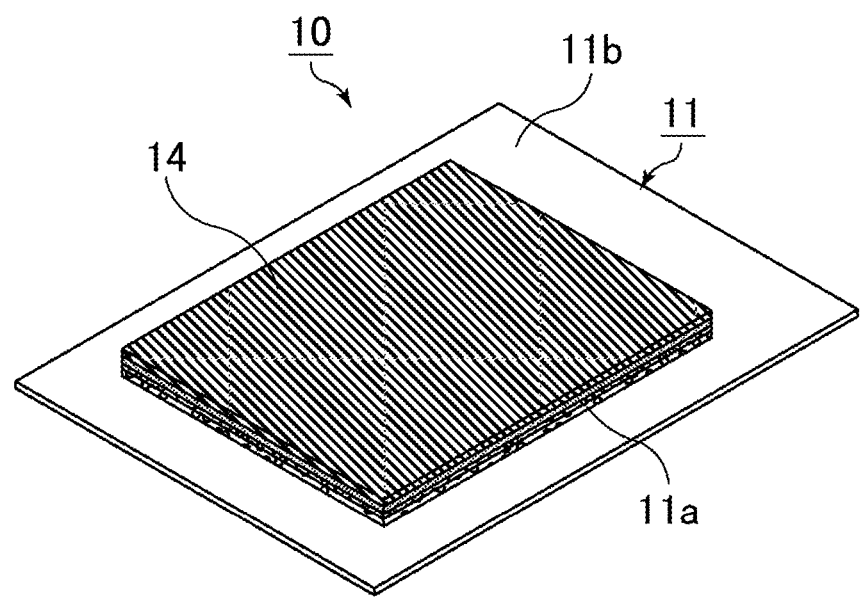

FIG. 9(a) schematically illustrates a sectional view of an example of the solid electrolytic capacitor according to the third embodiment. FIG. 9(b) schematically illustrates a sectional view of an example of a capacitor element that is included in the solid electrolytic capacitor illustrated in FIG. 9(a). FIG. 9(c) schematically illustrates a perspective view of the example of the capacitor element that is included in the solid electrolytic capacitor illustrated in FIG. 9(a).

FIG. 9(a) is a sectional view of a solid electrolytic capacitor 100. The solid electrolytic capacitor 100 illustrated in FIG. 9(a) includes a capacitor element 10, the sealing layer 20, the cathode outer electrode 30, and the anode outer electrode 40. As illustrated in FIG. 9(a) and FIG. 9(b), the capacitor element 10 includes the valve action metal base 11 that includes the porous portion 11a on the first main surface of the core portion 11b, the dielectric layer 12 that is formed on the surface of the porous portion 11a, the solid electrolyte layer 13 that is disposed on the dielectric layer 12, and a conductor layer 14 that is disposed on the solid electrolyte layer 13, and includes the exposed portion of the core portion 11b along the first main surface of the valve action metal base 11. As illustrated in FIG. 9(a), the insulating layer 15 that insulates the conductor layer 14 and the valve action metal base 11 from each other is disposed between the sealing layer 20 and the part of the core portion 11b on which the porous portion 11a is not disposed.

In the solid electrolytic capacitor 100 illustrated in FIG. 9(a), regarding the first main surface of the valve action metal base 11, the position of the part of the surface of the core portion 11b on which the porous portion 11a is not formed is lower than that of the part of the porous portion 11a nearest to the solid electrolyte layer 13 when the solid electrolytic capacitor 100 is viewed in the thickness direction. The part of the surface of the core portion 11b on which the porous portion 11a is not formed may be flush with the part of the porous portion 11a near the solid electrolyte layer 13 or located at a position higher than that. As illustrated in FIG. 9(b) and FIG. 9(c), it is preferable that the porous portion 11a be located at the central portion of the valve action metal base 11, and that the part of the core portion 11b on which the porous portion 11a is not formed be located within the edge portion of the valve action metal base 11.

The sealing layer 20 covers a first main surface of the capacitor element 10. In the solid electrolytic capacitor 100 illustrated in FIG. 9(a), the sealing layer 20 is disposed on the conductor layer 14 and is disposed also on the insulating layer 15 so as to cover the first main surface of the capacitor element 10.

The cathode outer electrode 30 is electrically connected to the conductor layer 14. In the solid electrolytic capacitor 100 illustrated in FIG. 9(a), the sealing layer 20 and the cathode outer electrode 30 are disposed in this order on the conductor layer 14. Cathode through-electrodes 131 that extend through the sealing layer 20 are disposed in the sealing layer 20 on the conductor layer 14. The conductor layer 14 and the cathode outer electrode 30 are connected to each other with the cathode through-electrodes 131 that are extended to the surface of the sealing layer 20 interposed therebetween.

The form of each cathode through-electrode 131 is not particularly limited, and examples thereof include a plating electrode and a paste electrode.

In an example illustrated in FIG. 9(a), a sectional shape of each cathode through-electrode 131 is a large tapered shape in which the area of a part near the conductor layer 14 is larger than that of a part near the cathode outer electrode 30. When the cathode through-electrode 131 is a paste electrode, the sectional shape of the cathode through-electrode 131 may be a tapered shape described above or a rectangular shape in which the area of the part near the cathode outer electrode 30 is substantially the same as the area of the part near the conductor layer 14.

When the cathode through-electrode 131 is a plating electrode, the sectional shape of the cathode through-electrode 131 is preferably a reversely tapered shape in which the area of the part near the cathode outer electrode 30 is larger than that of the part near the conductor layer 14. In this case, the size of the capacitance generation portion can be increased. In the case of a reversely tapered shape, the filling efficiency of plating is good.

Each cathode through-electrode 131 may be a columnar metal pin. When the cathode through-electrode 131 is the metal pin, the sectional shape of the cathode through-electrode 131 is preferably a rectangular shape in which the area of the part near the cathode outer electrode 30 is substantially the same as the area of the part near the conductor layer 14. An example of the shape of the metal pin is a cylindrical shape. The shape of the cathode through-electrode is not limited to a columnar shape such as a cylindrical shape and may be a wall shape as in the first embodiment.

In FIG. 9(a), the four cathode through-electrodes 131 are formed, and at least one cathode through-electrode 131 suffices.

The height of each cathode through-electrode 131 is equal to the thickness of the sealing layer 20. The height of the cathode through-electrode 131 is not particularly limited but is preferably no less than 5 μm and no more than 200 μm.

The form and shape of the cathode outer electrode 30, for example, are the same as in the first embodiment.

The anode outer electrode 40 is electrically connected to the core portion 11b. In the solid electrolytic capacitor 100 illustrated in FIG. 9(a), the insulating layer 15, the sealing layer 20, and the anode outer electrode 40 are disposed in this order on the part of the core portion 11b on which the porous portion 11a is not disposed. An anode through-electrode 141 that extends through the sealing layer 20 and the insulating layer 15 is disposed in the sealing layer 20 and the insulating layer 15 on the part of the core portion 11b on which the porous portion 11a is not disposed. The anode outer electrode 40 and the part of the core portion 11b on which the porous portion 11a is not disposed are connected to each other with the anode through-electrode 141 that is extended to the surface of the sealing layer 20 interposed therebetween. As illustrated in FIG. 9(a), a part of the anode through-electrode that extends through the insulating layer 15 and a part of the anode through-electrode that extends through the sealing layer 20 may be integrally formed.

The form of the anode through-electrode 141 is not particularly limited, and examples thereof include a plating electrode and a paste electrode. When the part of the anode through-electrode that extends through the insulating layer 15 and the part of the anode through-electrode that extends through the sealing layer 20 are not integrally formed, the parts of the anode through-electrode may have different forms.

In an example illustrated in FIG. 9(a), a sectional shape of the anode through-electrode 141 is a reversely tapered shape in which the area of a part near the anode outer electrode 40 is larger than that of a part near the core portion 11b. When the anode through-electrode 141 is a plating electrode, the sectional shape of the anode through-electrode 141 is preferably a reversely tapered shape. In this case, the size of the capacitance generation portion can be increased. In the case of a reversely tapered shape, the filling efficiency of plating is good.

The anode through-electrode 141 may be a columnar metal pin. When the anode through-electrode 141 is a metal pin, the sectional shape of the anode through-electrode 141 is preferably a rectangular shape in which the area of the part near the anode outer electrode 40 is substantially the same as the area of the part near the core portion 11b. An example of the shape of the metal pin is a cylindrical shape. The shape of the anode through-electrode is not limited to a columnar shape such as a cylindrical shape and may be a wall shape as in the first embodiment.

In FIG. 9(a), the single anode through-electrode 141 is formed but there may be two or more anode through-electrodes 141. In FIG. 9(a), the anode through-electrode 141 is formed on the right-hand side, but the anode through-electrode 141 may be formed on the left-hand side.

The form and shape of the anode outer electrode 40, for example, are the same as in the first embodiment.

In FIG. 9(a), the cathode outer electrode 30 and the anode outer electrode 40 are not in contact with each other and are insulated from each other on the surface of the sealing layer 20.

From the perspective of protection of other surfaces, for example, surfaces other than the surfaces of the anode outer electrode 40 and the cathode outer electrode 30 may be covered by another insulating layer, although this is not illustrated in FIG. 9(a). From the perspective of protection of the capacitor element, for example, the stress-relaxing layer and the damp-proof film may be disposed between the capacitor element and the sealing layer.

The material of the insulating layer and the sealing layer that are included in the solid electrolytic capacitor, for example, is the same as in the first embodiment.

The material of the valve action metal base that is included in the capacitor element, for example, is preferably the same as in the first embodiment. The stress-relaxing portion may be disposed on the surface of the valve action metal base as in the first embodiment.

The material of the dielectric layer and the solid electrolyte layer that are included in the capacitor element, for example, is the same as in the first embodiment.

In the solid electrolytic capacitor according to the third embodiment, the conductor layer includes the conductive resin layer, or the silver layer, or both. An example of the conductive resin layer is the carbon layer, which is the conductive adhesive layer that contains the conductive graphite filler and carbon black. The conductor layer is preferably composed of an underlying conductive resin layer such as the carbon layer and the silver layer thereon. The conductor layer may be consist of the conductive resin layer or consists of the silver layer. The conductor layer such as the conductive resin layer and/or the silver layer preferably covers the entire solid electrolyte layer.

An example of a method for manufacturing the solid electrolytic capacitor according to the third embodiment will now be described.

FIG. 10(a) to FIG. 10(i) schematically illustrate the example of the method for manufacturing the solid electrolytic capacitor illustrated in FIG. 9(a) with perspective views.

The capacitor element with the insulating layer formed on the exposed portion of the core portion is first prepared.

FIG. 10(a) to FIG. 10(e) are common to FIG. 3(a) to FIG. 3(e), and a detailed description thereof is omitted.

Figure 10A:
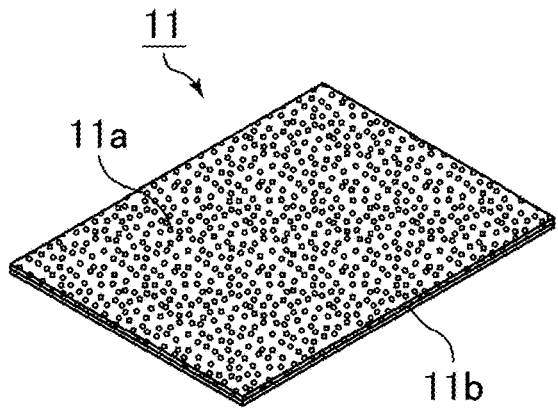
FIGS. 10(*a*) to 10(*i*) schematically illustrate an example of a method for manufacturing the solid electrolytic capacitor illustrated in FIG. 9(*a*) with perspective views.
Figure 10B:
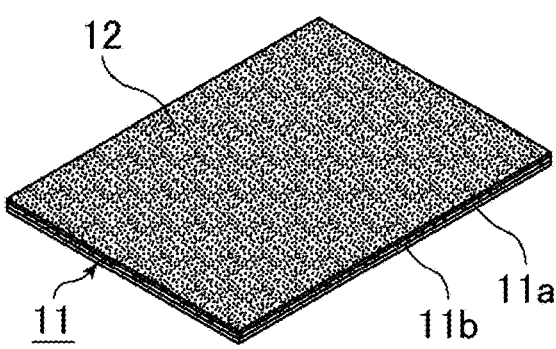
Figure 10C:
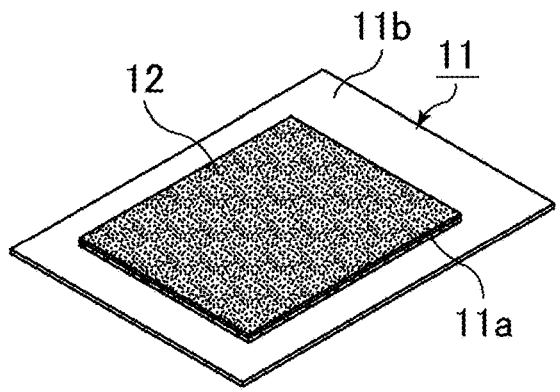
Figure 10D:
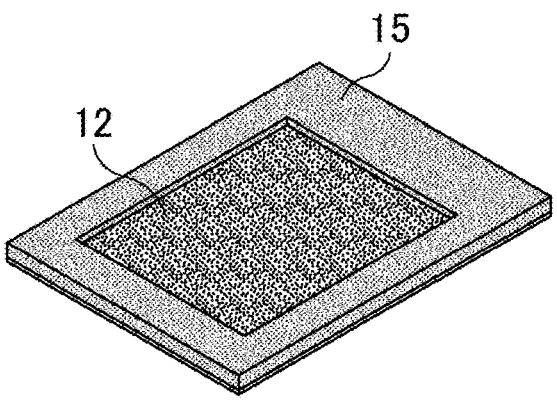
Figure 10E:
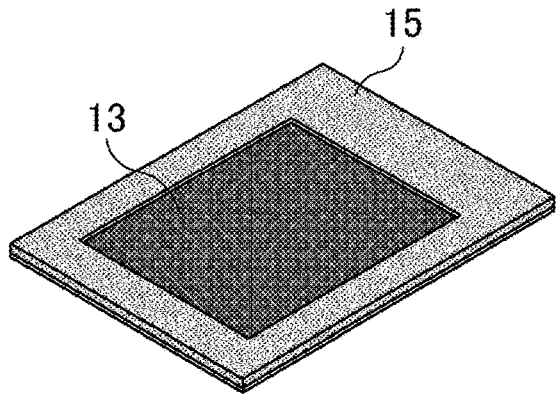
Figure 10F:
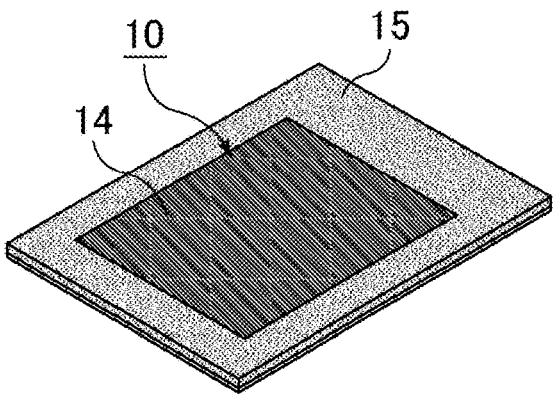

As illustrated in FIG. 10(f), the conductor layer 14 is formed on the solid electrolyte layer 13. In the above manner, the capacitor element 10 on which the insulating layer 15 is formed is obtained. The conductive resin layer such as the carbon layer and the silver layer are preferably formed as the conductor layer by being sequentially stacked. However, only the conductive resin layer may be formed or only the silver layer may be formed. For example, the carbon layer and the silver layer can be formed by applying and drying silver paste after carbon paste is applied and dried.

Figure 10G:
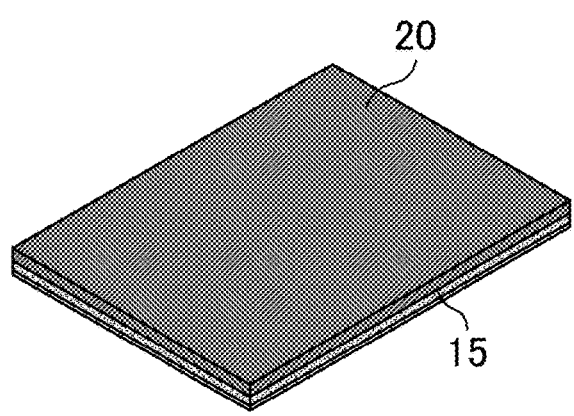

Subsequently, as illustrated in FIG. 10(g), the sealing layer 20 is formed on the insulating layer 15 and the conductor layer 14 of the capacitor element 10 so as to cover the first main surface of the capacitor element 10 on which the insulating layer 15 is formed. The sealing layer can be formed by, for example, the resin molding method.

Figure 10H:
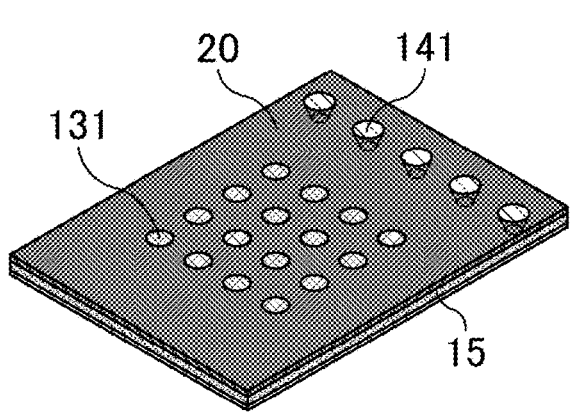

As illustrated in FIG. 10(h), the anode through-electrode 141 that is disposed in the sealing layer 20 and the insulating layer 15 is formed so as to extend through the sealing layer 20 and the insulating layer 15 on the exposed portion of the core portion 11b of the capacitor element 10, and the cathode through-electrodes 131 that are disposed in the sealing layer 20 are formed so as to extend through the sealing layer 20 on the conductor layer 14 of the capacitor element 10. The anode through-electrode 141 is connected to the core portion 11b of the capacitor element 10. The cathode through-electrodes 131 are connected to the conductor layer 14 of the capacitor element 10.

A method of forming the anode through-electrode and the cathode through-electrodes will be described later. The anode through-electrode and the cathode through-electrodes may be formed after the sealing layer is formed or may be formed before the sealing layer is formed. The shape of the anode through-electrode and each cathode through-electrode is not limited to a columnar shape such as a cylindrical shape and may be a wall shape.

Figure 10I:
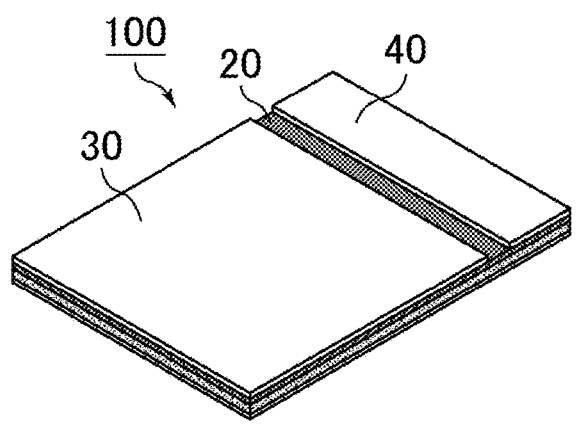

As illustrated in FIG. 10(i), the anode outer electrode 40 that is connected to the anode through-electrode 141 that is exposed from the surface of the sealing layer 20 and the cathode outer electrode 30 that is connected to the cathode through-electrodes 131 that are exposed from the surface of the sealing layer 20 are formed on the sealing layer 20. The anode outer electrode 40 is electrically connected to the core portion 11b with the anode through-electrode 141 interposed therebetween. The cathode outer electrode 30 is electrically connected to the conductor layer 14 with the cathode through-electrodes 131 interposed therebetween. For example, a metal electrode, a paste electrode, or a ball-shaped terminal may be formed as each of the anode outer electrode and the cathode outer electrode.

In the above manner, the solid electrolytic capacitor 100 illustrated in FIG. 9(a) is obtained.

Figure 11A:
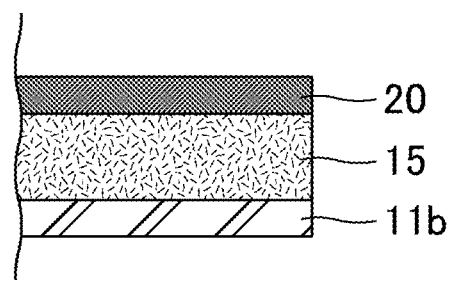
FIG. 11(*a*), FIG. 11(*b*), and FIG. 11(*c*) schematically illustrate an example of a method of forming an anode through-electrode with sectional views.
Figure 11B:
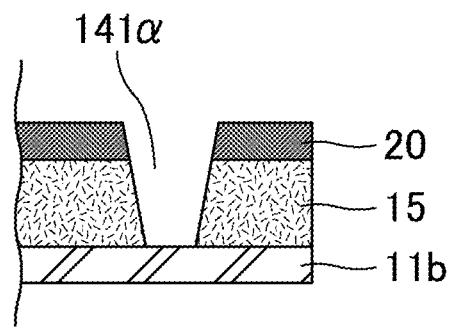
Figure 11C:
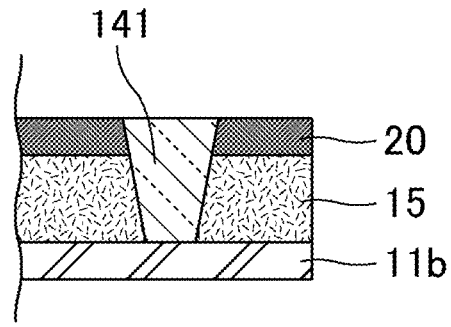

FIG. 11(a), FIG. 11(b), and FIG. 11(c) schematically illustrate an example of the method of forming the anode through-electrode with sectional views.

As illustrated in FIG. 11(a) and FIG. 11(b), an anode through-hole 141α that extends through the sealing layer 20 and the insulating layer 15 on the exposed portion of the core portion 11b is formed. The anode through-hole is preferably formed by the laser process. When the anode through-hole is formed by the laser process, the anode through-hole may be formed up to a part of the core portion. Subsequently, as illustrated in FIG. 11(c), the anode through-electrode 141 is formed in the anode through-hole 141α. For example, a plating electrode or a paste electrode may be formed as the anode through-electrode. When the anode through-hole is formed by the laser process, the sectional shape of the anode through-electrode can be a reversely tapered shape.

Figure 12A:
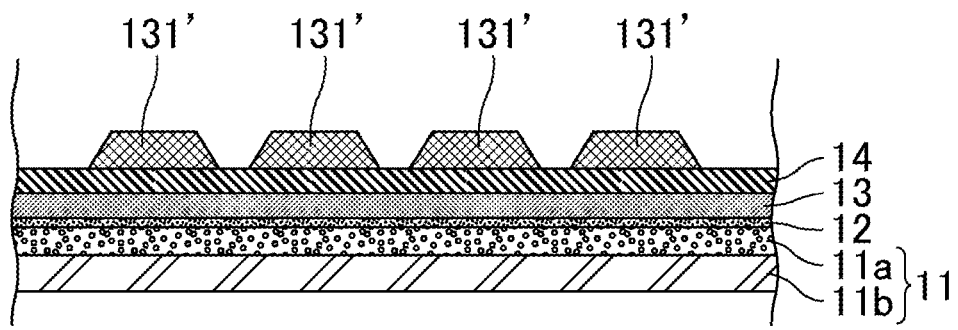
FIG. 12(*a*), FIG. 12(*b*), and FIG. 12(*c*) schematically illustrate an example of a method of forming cathode through-electrodes with sectional views.
Figure 12B:
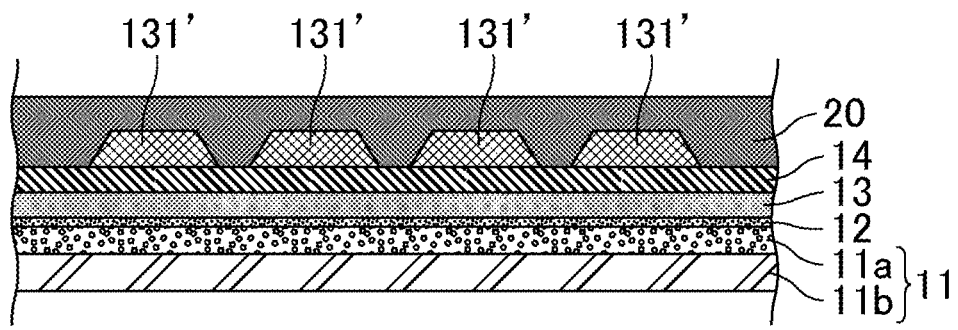
Figure 12C:
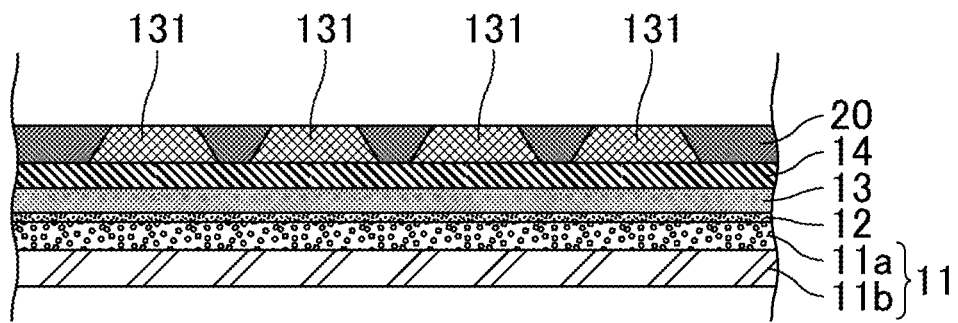

FIG. 12(a), FIG. 12(b), and FIG. 12(c) schematically illustrate an example of a method of forming the cathode through-electrodes with sectional views.

As illustrated in FIG. 12(a), cathode bumps (paste electrodes) 131', which become the cathode through-electrodes 131, are formed on the conductor layer 14 by using conductive paste, and subsequently, the sealing layer 20 is formed so as to cover the cathode bumps 131' as illustrated in FIG. 12(b). Subsequently, as illustrated in FIG. 12(c), the sealing layer 20 is cut out such that a surface of each cathode bump 131' is exposed. Alternatively, the sealing layer 20 may be formed such that the cathode bump 131' is covered and a surface of the cathode bump 131' is exposed. In this case, it is not necessary to cut out the sealing layer 20. Consequently, the cathode through-electrodes 131 that extend through the sealing layer 20 on the conductor layer 14 are formed in the sealing layer 20. The cathode through-electrodes 131 are substantially the same as the cathode bumps 131'. When the cathode bumps are formed by using conductive paste, the sectional shape of each cathode through-electrode can be a tapered shape.

FIG. 13(a), FIG. 13(b), FIG. 13(c), and FIG. 13(d) schematically illustrate another example of the method of forming the cathode through-electrodes with sectional views.

Figure 13A:
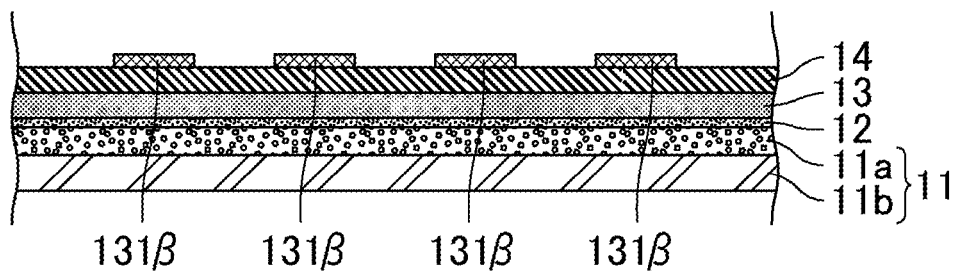
FIG. 13(*a*), FIG. 13(*b*), FIG. 13(*c*), and FIG. 13(*d*) schematically illustrate another example of the method of forming the cathode through-electrodes with sectional views.
Figure 13B:
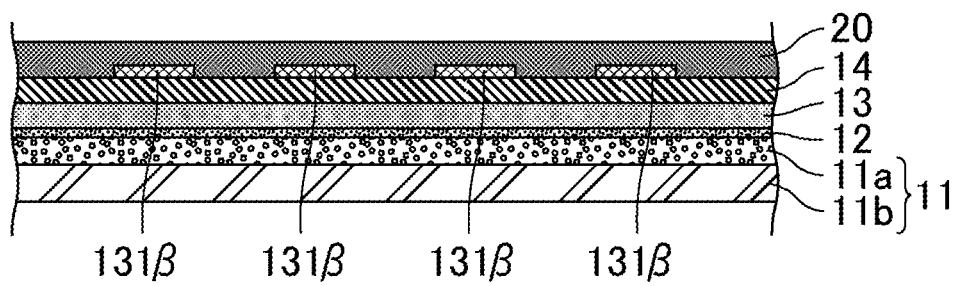
Figure 13C:
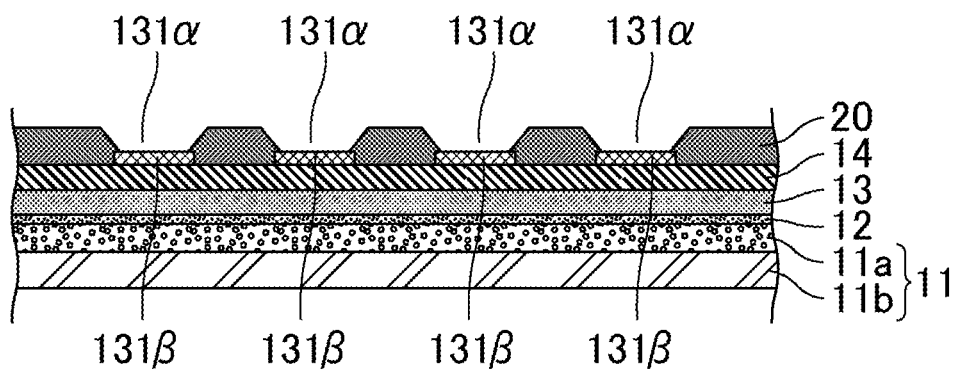
Figure 13D:
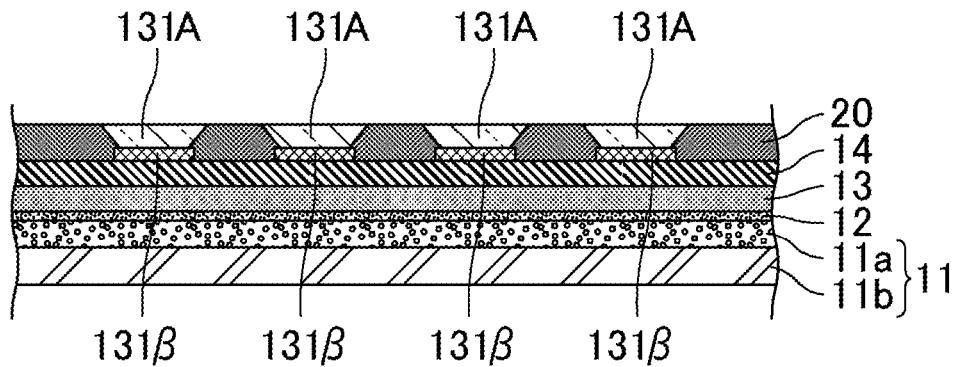

As illustrated in FIG. 13(a), metal-containing layers 131β are formed on the conductor layer 14, and subsequently, the sealing layer 20 is formed as illustrated in FIG. 13(b). As illustrated in FIG. 13(c), cathode through-holes 131α that extend through the sealing layer 20 on the metal-containing layers 131β are formed. The cathode through-holes are preferably formed by the laser process. When the cathode through-holes are formed by the laser process, the cathode through-holes may be formed up to parts of the metal-containing layers. Subsequently, as illustrated in FIG. 13(d), cathode through-electrodes 131A are formed in the cathode through-holes 131α. For example, a plating electrode or a paste electrode may be formed as each of the cathode through-electrodes. When the cathode through-holes are formed by the laser process, the sectional shape of each cathode through-electrode can be a reversely tapered shape.

The metal content of each metal-containing layer is larger than that of the surface of the conductor layer near the sealing layer. For example, when the silver is formed on the surface of the conductor layer near the sealing layer, the metal-containing layer that is formed has a metal content larger than that of silver paste of which the silver layer is composed. The metal-containing layer that is formed on the conductor layer enables the conductor layer of the capacitor element to be protected from being damaged by, for example, a laser beam when the cathode through-holes are formed. The metal-containing layer may contain only metal or may contain an additional resin component.

It should be appreciated that the metal that is contained in each metal-containing layer is not particularly limited. However, the metal-containing layer preferably contains copper, aluminum, or an alloy the main component of which is any one of these metals. Copper and aluminum are metals having a high reflectance at a laser wave length and enable the cathode through-holes to be formed while the conductor layer of the capacitor element is prevented from being damaged.

In each metal-containing layer, the ratio of the metal content to the total weight of the metal and the resin component is preferably 80% or more by weight. The metal-containing layer may not contain the resin component.

The thickness of each metal-containing layer is not particularly limited and is, for example, no less than 5 µm and no more than 50 µm.

Fourth Embodiment

A solid electrolytic capacitor according to a fourth embodiment has the same structure as the solid electrolytic capacitor according to the second embodiment except that the conductor layer contains no metal foil.

Figure 14A:
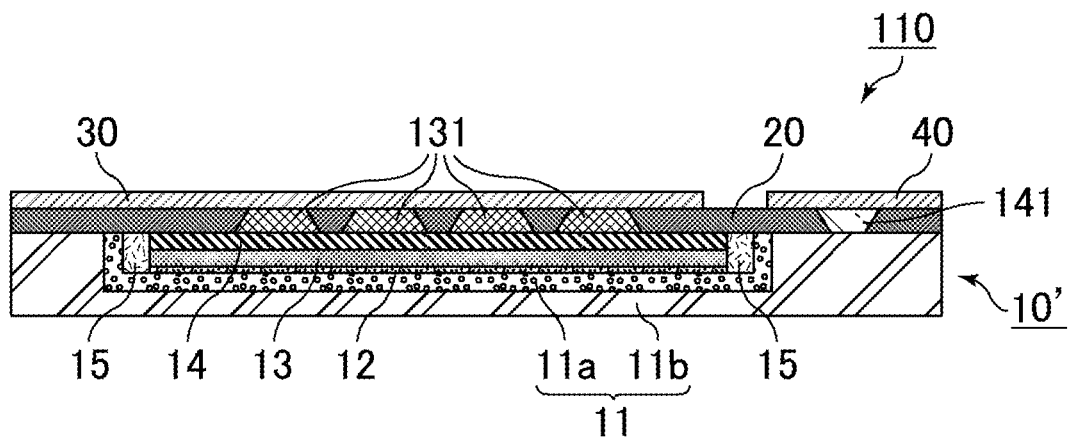
FIG. 14(*a*) schematically illustrates a sectional view of an example of a solid electrolytic capacitor according to a fourth embodiment.
Figure 14B:
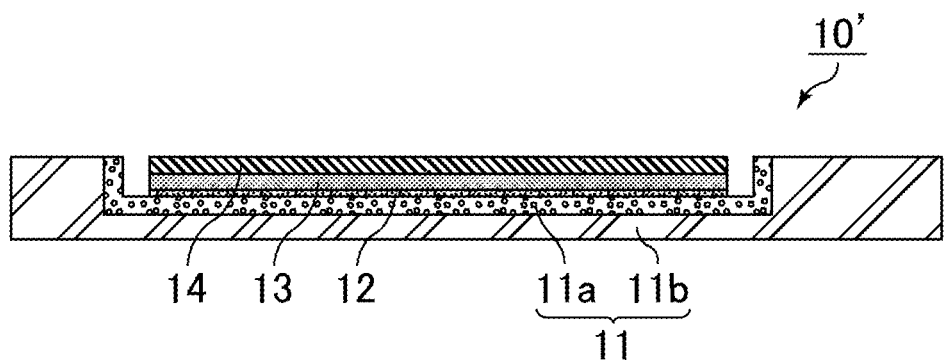
Figure 14C:
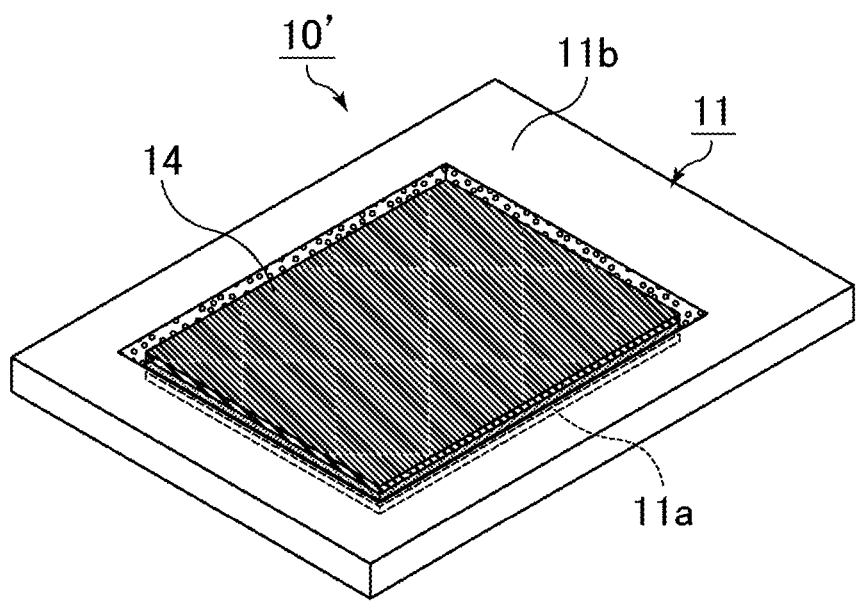

FIG. 14(a) schematically illustrates a sectional view of an example of the solid electrolytic capacitor according to the fourth embodiment. FIG. 14(b) schematically illustrates a sectional view of an example of a capacitor element that is included in the solid electrolytic capacitor illustrated in FIG. 14(a). FIG. 14(c) schematically illustrates a perspective view of the example of the capacitor element that is included in the solid electrolytic capacitor illustrated in FIG. 14(a).

FIG. 14(a) is a sectional view of a solid electrolytic capacitor 110. The solid electrolytic capacitor 110 illustrated in FIG. 14(a) includes a capacitor element 10', the sealing layer 20, the cathode outer electrode 30, and the anode outer electrode 40. As illustrated in FIG. 14(a) and FIG. 14(b), the capacitor element 10' includes the valve action metal base 11 that includes the porous portion 11a on the first main surface of the core portion 11b, the dielectric layer 12 that is formed on the surface of the porous portion 11a, the solid electrolyte layer 13 that is disposed on the dielectric layer 12, and the conductor layer 14 that is disposed on the solid electrolyte layer 13, and includes the exposed portion of the core portion 11b along the first main surface of the valve action metal base 11. As illustrated in FIG. 14(a), the insulating layer 15 that insulates the conductor layer 14 and the valve action metal base 11 from each other is disposed on the first main surface of the valve action metal base 11.

In the solid electrolytic capacitor 110 illustrated in FIG. 14(a), regarding the first main surface of the valve action metal base 11, the position of the part of the surface of the core portion 11b on which the porous portion 11a is not formed is higher than that of the part of the porous portion 11a nearest to the solid electrolyte layer 13 when the solid electrolytic capacitor 110 is viewed in the thickness direction. The part of the surface of the core portion 11b on which the porous portion 11a is not formed may be flush with the part of the porous portion 11a near the solid electrolyte layer 13 or located at a position lower than that. As illustrated in FIG. 14(b) and FIG. 14(c), it is preferable that the porous portion 11a be located at the central portion of the valve action metal base 11, and that the part of the core portion 11b on which the porous portion 11a is not formed be located within the edge portion of the valve action metal base 11. In particular, it is preferable that the porous portion 11a be located on the inner surface of the recessed portion of the valve action metal base 11, and that the insulating layer 15 is disposed on the inner wall of the recessed portion.

The sealing layer 20 covers a first main surface of the capacitor element 10'. In the solid electrolytic capacitor 110 illustrated in FIG. 14(a), the sealing layer 20 is disposed on the conductor layer 14 and is disposed also on the core portion 11b so as to cover the first main surface of the capacitor element 10'.

The cathode outer electrode 30 is electrically connected to the conductor layer 14. In the solid electrolytic capacitor 110 illustrated in FIG. 14(a), the sealing layer 20 and the cathode outer electrode 30 are disposed in this order on the conductor layer 14. The cathode through-electrodes 131 that extend through the sealing layer 20 are disposed in the sealing layer 20 on the conductor layer 14. The conductor layer 14 and the cathode outer electrode 30 are connected to each other with the cathode through-electrodes 131 that are extended to the surface of the sealing layer 20 interposed therebetween.

The form and sectional shape of each cathode through-electrode 131, for example, are the same as in the third embodiment. The form and shape of the cathode outer electrode 30, for example, are the same as in the first embodiment.

The anode outer electrode 40 is electrically connected to the core portion 11b. In the solid electrolytic capacitor 110 illustrated in FIG. 14(a), the sealing layer 20 and the anode outer electrode 40 are disposed in this order on the part of the core portion 11b on which the porous portion 11a is not disposed. The anode through-electrode 141 that extends through the sealing layer 20 is disposed in the sealing layer 20 on the part of the core portion 11b on which the porous portion 11a is not disposed. The anode outer electrode 40 and the part of the core portion 11b on which the porous portion 11a is not disposed are connected to each other with the anode through-electrode 141 that is extended to the surface of the sealing layer 20 interposed therebetween.

The form and sectional shape of the anode through-electrode 141, for example, are the same as in the third embodiment. The form and shape of the anode outer electrode 40, for example, are the same as in the first embodiment.

In FIG. 14(a), the cathode outer electrode 30 and the anode outer electrode 40 are not in contact with each other and are insulated from each other on the surface of the sealing layer 20.

From the perspective of protection of other surfaces, for example, surfaces other than the surfaces of the anode outer electrode 40 and the cathode outer electrode 30 may be covered by another insulating layer, although this is not illustrated in FIG. 14(a). From the perspective of protection of the capacitor element, for example, the stress-relaxing layer and the damp-proof film may be disposed between the capacitor element and the sealing layer.

The material of the insulating layer and the sealing layer that are included in the solid electrolytic capacitor, for example, is the same as in the first embodiment.

The material of the valve action metal base that is included in the capacitor element, for example, is preferably the same as in the first embodiment. The stress-relaxing portion may be disposed on the surface of the valve action metal base as in the first embodiment.

The material of the dielectric layer and the solid electrolyte layer that are included in the capacitor element, for example, is the same as in the first embodiment.

The structure of the conductor layer that is included in the capacitor element is the same as in the third embodiment.

An example of a method for manufacturing the solid electrolytic capacitor according to the fourth embodiment will now be described.

FIG. 15(a) to FIG. 15(h) schematically illustrate the example of the method for manufacturing the solid electrolytic capacitor illustrated in FIG. 14(a) with perspective views.

The capacitor element is first prepared.

FIG. 15(a) to FIG. 15(d) are common to FIG. 8(a) to FIG. 8(d), and a detailed description thereof is omitted.

Figure 15A:
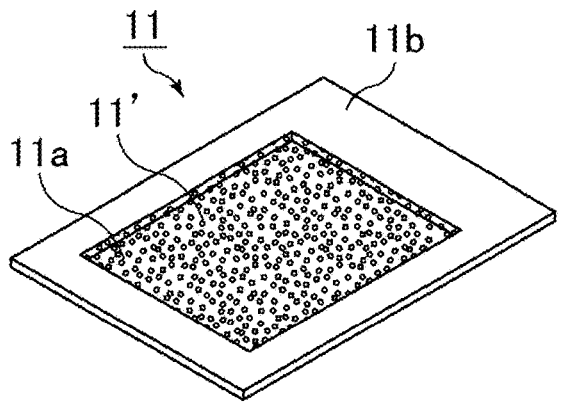
FIGS. 15(*a*) to 15(*h*) schematically illustrate an example of a method for manufacturing the solid electrolytic capacitor illustrated in FIG. 14(*a*) with perspective views.
Figure 15B:
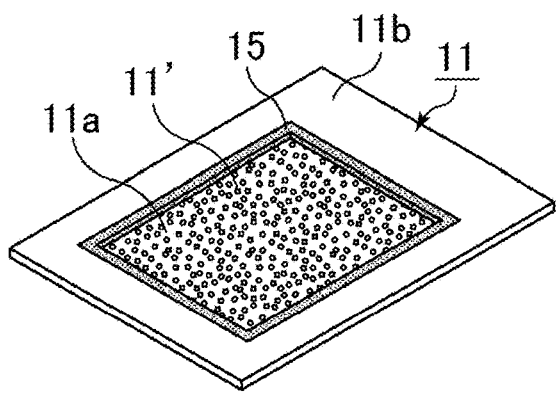
Figure 15C:
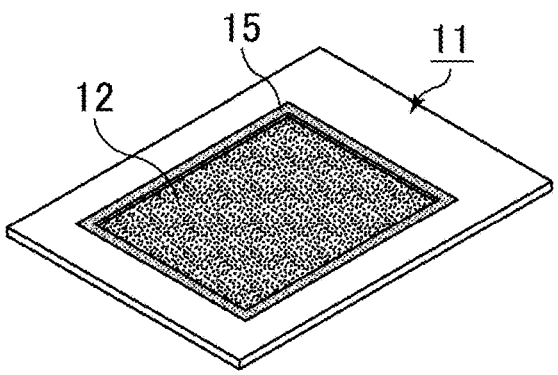
Figure 15D:
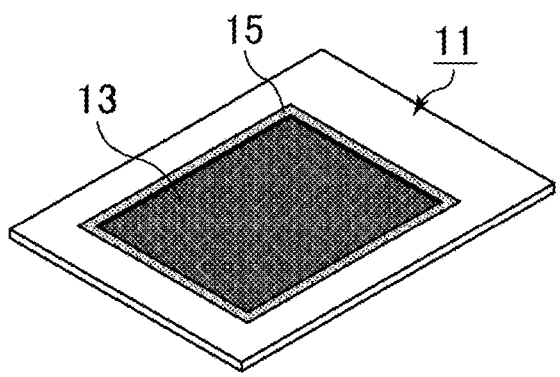
Figure 15E:
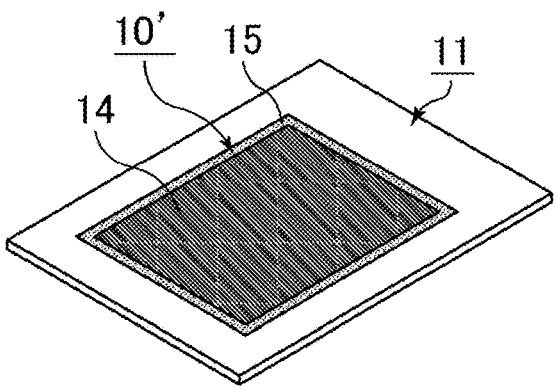

As illustrated in FIG. 15(e), the conductor layer 14 is formed on the solid electrolyte layer 13. In the above manner, the capacitor element 10' is obtained. The conductive resin layer such as the carbon layer and the silver layer are preferably formed as the conductor layer by being sequentially stacked. However, only the conductive resin layer may be formed, or only the silver layer may be formed.

Figure 15F:
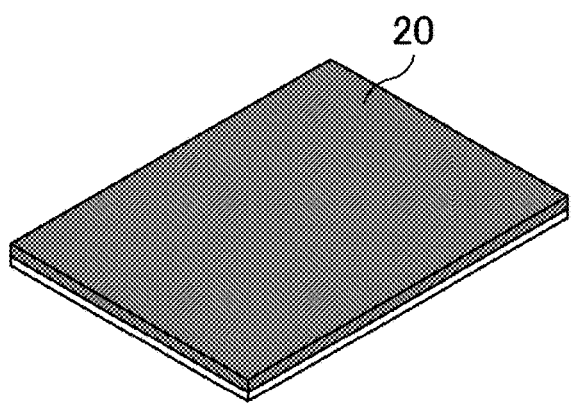

Subsequently, as illustrated in FIG. 15(f), the sealing layer 20 is formed on the conductor layer 14 and the exposed portion of the core portion 11b of the capacitor element 10' so as to cover the first main surface of the capacitor element 10'. The sealing layer can be formed by, for example, the resin molding method.

Figure 15G:
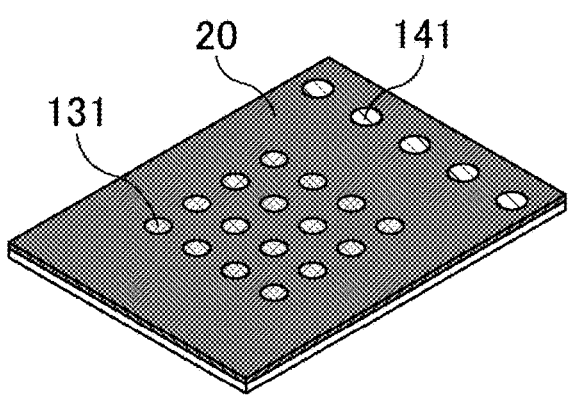

As illustrated in FIG. 15(g), the anode through-electrode 141 that is disposed in the sealing layer 20 is formed so as to extend through the sealing layer 20 on the exposed portion of the core portion 11b of the capacitor element 10', and the cathode through-electrodes 131 that are disposed in the sealing layer 20 are formed so as to extend through the sealing layer 20 on the conductor layer 14 of the capacitor element 10'. The anode through-electrode 141 is connected to the core portion 11b of the capacitor element 10', and the cathode through-electrodes 131 are connected to the conductor layer 14 of the capacitor element 10'.

A method of forming the anode through-electrode will be described later. A method of forming the cathode through-electrodes is the same as in the third embodiment. The anode through-electrode and the cathode through-electrodes may be formed after the sealing layer is formed or may be formed before the sealing layer is formed. The shape of the anode through-electrode and each cathode through-electrode is not limited to a columnar shape such as a cylindrical shape and may be a wall shape.

Figure 15H:
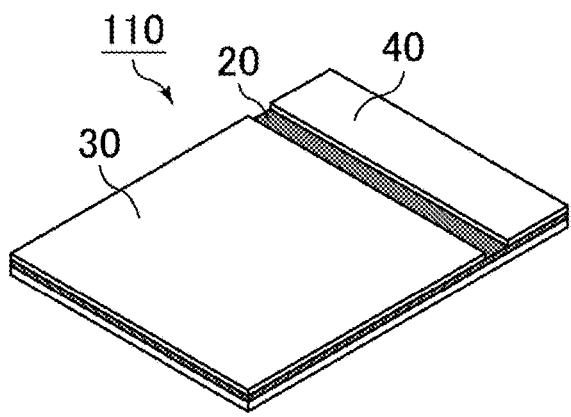

As illustrated in FIG. 15(h), the anode outer electrode 40 that is connected to the anode through-electrode 141 that is exposed from the surface of the sealing layer 20 and the cathode outer electrode 30 that is connected to the cathode through-electrodes 131 that are exposed from the surface of the sealing layer 20 are formed on the sealing layer 20. The anode outer electrode 40 is electrically connected to the core portion 11b with the anode through-electrode 141 interposed therebetween. The cathode outer electrode 30 is electrically connected to the conductor layer 14 with the cathode through-electrodes 131 interposed therebetween. For example, a metal electrode, a paste electrode, or a ball-shaped terminal may be formed as each of the anode outer electrode and the cathode outer electrodes.

In the above manner, the solid electrolytic capacitor 110 illustrated in FIG. 14(a) is obtained.

Figure 16A:
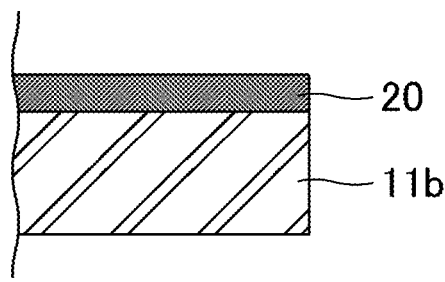
FIG. 16(*a*), FIG. 16(*b*), and FIG. 16(*c*) schematically illustrate another example of the method of forming the anode through-electrode with sectional views.
Figure 16B:
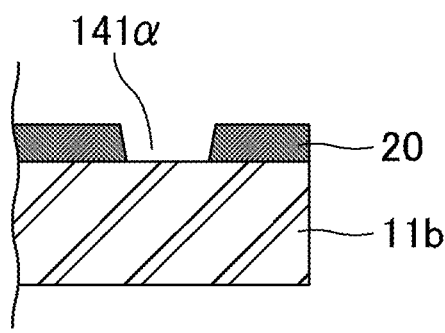
Figure 16C:
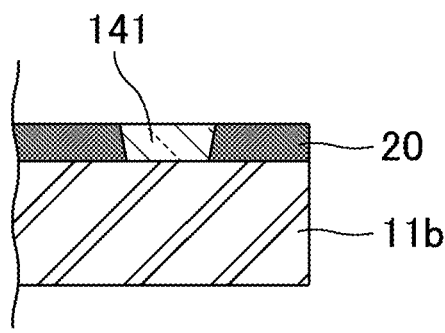

FIG. 16(a), FIG. 16(b), and FIG. 16(c) schematically illustrate another example of the method of forming the anode through-electrode with sectional views.

As illustrated in FIG. 16(a) and FIG. 16(b), the anode through-hole 141α that extends through the sealing layer 20 on the exposed portion of the core portion 11b is formed. The anode through-hole is preferably formed by the laser process. When the anode through-hole is formed by the laser process, the anode through-hole may be formed up to a part of the core portion. Subsequently, as illustrated in FIG. 16(c), the anode through-electrode 141 is formed in the anode through-hole 141α. For example, a plating electrode or a paste electrode may be formed as the anode through-electrode. When the anode through-hole is formed by the laser process, the sectional shape of the anode through-electrode can be a reversely tapered shape.

Fifth Embodiment

In a solid electrolytic capacitor according to a fifth embodiment, at least a first sealing layer, a first cathode inner electrode, a second sealing layer, and the cathode outer electrode are disposed in this order on the conductor layer of the capacitor element, first cathode through-electrodes are disposed in the first sealing layer on the conductor layer, a second cathode through-electrode is disposed in the second sealing layer, and the conductor layer is extended to the surface of the second sealing layer with the first cathode through-electrodes, the first cathode inner electrode, and the second cathode through-electrode interposed therebetween. Accordingly, the functions are integrated onto the surface of the valve action metal base, the functional layers other than the capacitance generation portion (portion that is conducive to electrostatic capacity) are minimized, and the ratio of the volume of the capacitance generation portion to the volume of the entire capacitor can be increased as in the first embodiment. Consequently, the volumetric efficiency of the capacitance generation portion can be increased, and the solid electrolytic capacitor can be designed to be thin.

In addition, since the anode outer electrode and the cathode outer electrode are disposed on the surface of the second sealing layer, there is no need to use an electrode having a thickness such as a mounting substrate or a lead frame. For this reason, the thickness of each functional layer in the capacitor element is maintained, and the entire product can be designed to be thin. In particular, since the first cathode inner electrode is disposed between the conductor layer and the cathode outer electrode, the size of the capacitance generation portion of the capacitor element is increased, and the size and arrangement of the anode outer electrode and the cathode outer electrode that are formed on the surface of the solid electrolytic capacitor, for example, can be freely designed.

The distance of extension from any part of the conductor layer that is disposed in the cathode to the cathode outer electrode is short, and the ESR and the ESL can be designed to be lower than that in the existing solid electrolytic capacitor.

According to the fifth embodiment, the insulating layer is disposed between the first sealing layer and the exposed portion of the core portion of the capacitor element, at least the insulating layer, the first sealing layer, the first anode inner electrode, the second sealing layer, and the anode outer electrode are disposed in this order on the exposed portion of the core portion, the first anode through-electrode is disposed in the first sealing layer and the insulating layer on the exposed portion of the core portion, the second anode through-electrode is disposed in the second sealing layer, the core portion is extended to the surface of the second sealing layer with the first anode through-electrode, the first anode inner electrode, and the second anode through-electrode interposed therebetween. An advantage of the fifth embodiment in design is that the material of the insulating layer in direct contact with the porous portion and the material of the first sealing layer can be designed separately. The cathode near the first main surface of the capacitor element is covered by the first sealing layer and the first cathode inner electrode. Accordingly, the airtightness is substantially high, and the insulating layer and the interface of each layer can be main paths through which liquid enters from the outside. In this case, selecting the material of the insulating layer from highly adhesive, waterproof materials achieves highly reliable design. In addition, the anode outer electrode can be disposed on the same side as the cathode outer electrode, and the solid electrolytic capacitor can be designed to be thin.

According to the fifth embodiment, the second sealing layer is directly disposed on the first sealing layer. The second anode through-electrode is directly connected to the first anode inner electrode. The second cathode through-electrode is directly connected to the first cathode inner electrode.

In the present specification, when another sealing layer is not disposed between the first sealing layer and the second sealing layer, it should be appreciated that configuration can be referred to as the "second sealing layer being directly disposed on the first sealing layer". Moreover, when another sealing layer is disposed between the first sealing layer and the second sealing layer, the configuration can be referred to as the "second sealing layer being indirectly disposed above the first sealing layer". Accordingly, when the second sealing layer is disposed on the first anode inner electrode and the first cathode inner electrode that are disposed on the first sealing layer also corresponds to the "second sealing layer is directly disposed on the first sealing layer".

Figure 17:
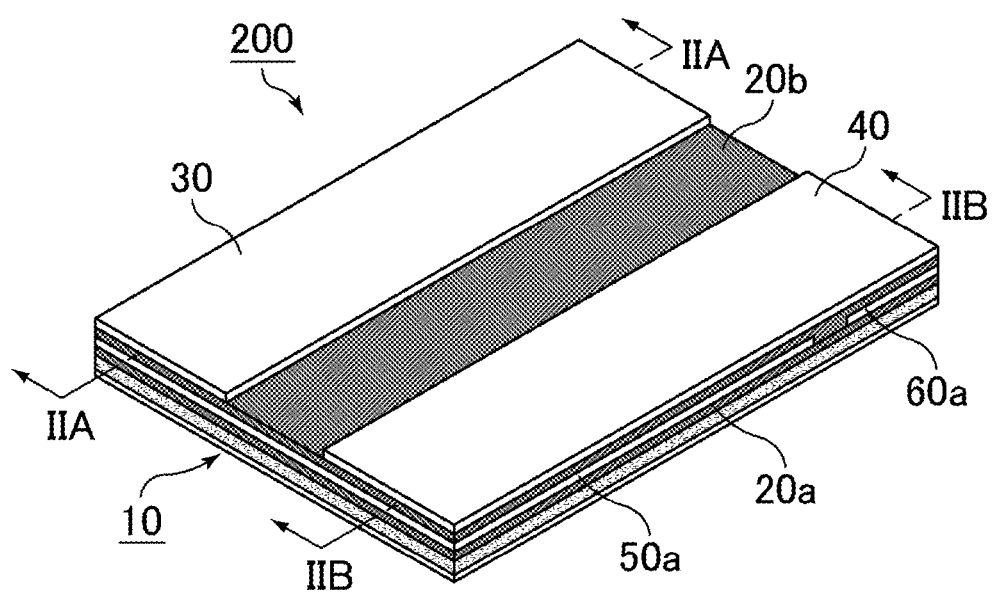
FIG. 17 schematically illustrates a perspective view of an example of a solid electrolytic capacitor according to a fifth embodiment.
Figure 18A:
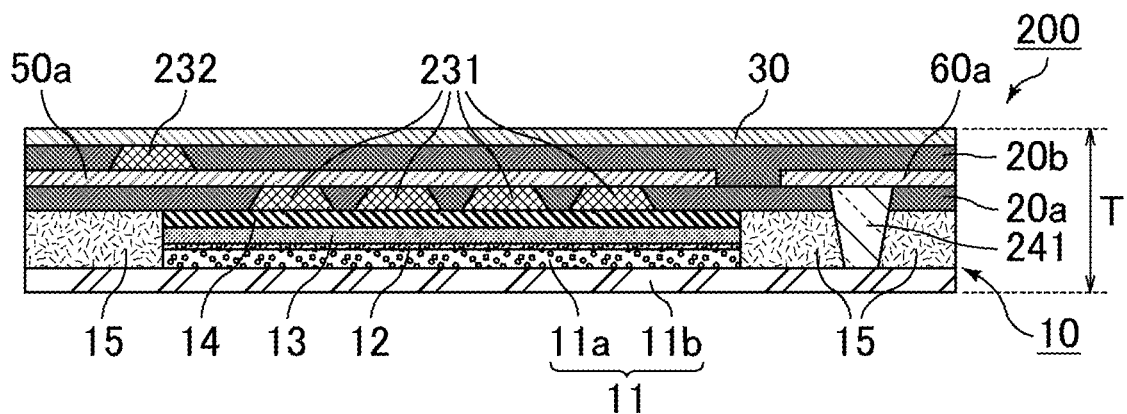
FIG. 18(*a*) is a sectional view of the solid electrolytic capacitor illustrated in FIG. 17 taken along line IIA-IIA.

FIG. 17 schematically illustrates a perspective view of an example of the solid electrolytic capacitor according to the fifth embodiment. FIG. 18(*a*) is a sectional view of the solid electrolytic capacitor illustrated in FIG. 17 taken along line IIA-IIA. FIG. 18(*b*) is a sectional view of the solid electrolytic capacitor illustrated in FIG. 17 taken along line IIB-IIB. FIG. 18(*c*) schematically illustrates a sectional view of an example of the capacitor element that is included in the solid electrolytic capacitor illustrated in FIG. 17.

A solid electrolytic capacitor 200 illustrated in FIG. 17, FIG. 18(*a*), and FIG. 18(*b*) includes the capacitor element 10, a first sealing layer 20*a*, a first cathode inner electrode 50*a*, a first anode inner electrode 60*a*, a second sealing layer 20*b*, the cathode outer electrode 30, and the anode outer electrode 40. As illustrated in FIG. 18(*a*), FIG. 18 (*b*), and FIG. 18(*c*), the capacitor element 10 includes the valve action metal base 11 that includes the porous portion 11*a* on the first main surface of the core portion 11*b*, the dielectric layer 12 that is formed on the surface of the porous portion 11*a*, the solid electrolyte layer 13 that is disposed on the dielectric layer 12, and the conductor layer 14 that is disposed on the solid electrolyte layer 13 and includes the exposed portion of the core portion 11*b* along the first main surface of the valve action metal base 11. As illustrated in FIG. 18(*a*) and FIG. 18(*b*), the insulating layer 15 that insulates the conductor layer 14 and the valve action metal base 11 from each other is disposed between the first sealing layer 20*a* and the part of the core portion 11*b* on which the porous portion 11*a* is not disposed.

In the capacitor element 10 illustrated in FIG. 18(*c*), regarding the first main surface of the valve action metal base 11, the position of the part of the surface of the core portion 11*b* on which the porous portion 11*a* is not formed is lower than that of the part of the porous portion 11*a* nearest to the solid electrolyte layer 13 when the capacitor element 10 is viewed in the thickness direction. The part of the surface of the core portion 11*b* on which the porous portion 11*a* is not formed may be flush with the part of the porous portion 11*a* near the solid electrolyte layer 13 or located at a position higher than that. As illustrated in FIG. 18(*c*), it is preferable that the porous portion 11*a* be located at the central portion of the valve action metal base 11, and that the part of the core portion 11*b* on which the porous portion 11*a* is not formed be located within the edge portion of the valve action metal base 11.

The first sealing layer 20*a* covers the first main surface of the capacitor element 10. In FIG. 18(*a*) and FIG. 18(*b*), the first sealing layer 20*a* is disposed on the conductor layer 14 and is disposed also on the insulating layer 15 so as to cover the first main surface of the capacitor element 10.

The first cathode inner electrode 50*a* is electrically connected to the conductor layer 14. In FIG. 18(*a*) and FIG. 18(*b*), the first sealing layer 20*a* and the first cathode inner electrode 50*a* are disposed in this order on the conductor layer 14. First cathode through-electrodes 231 that extend through the first sealing layer 20*a* are disposed in the first sealing layer 20*a* on the conductor layer 14. The conductor layer 14 and the first cathode inner electrode 50*a* are connected to each other with the first cathode through-electrodes 231 that are extended to a surface of the first sealing layer 20*a* interposed therebetween.

The first anode inner electrode 60*a* is electrically connected to the core portion 11*b*. In FIG. 18(*a*) and FIG. 18(*b*), the insulating layer 15, the first sealing layer 20*a*, and the first anode inner electrode 60*a* are disposed in this order on the part of the core portion 11*b* on which the porous portion 11*a* is not disposed. A first anode through-electrode 241 that extends through the first sealing layer 20*a* and the insulating layer 15 is disposed in the first sealing layer 20*a* and the insulating layer 15 on the part of the core portion 11*b* on which the porous portion 11*a* is not disposed. The first anode inner electrode 60*a* and the part of the core portion 11*b* on which the porous portion 11*a* is not disposed are connected to each other with the first anode through-electrode 241 that is extended to the surface of the first sealing layer 20*a* interposed therebetween. As illustrated in FIG. 18(*a*) and FIG. 18(*b*), an anode through-electrode that extends through the insulating layer 15 and an anode through-electrode that extends through the first sealing layer 20*a* may be integrally formed.

The second sealing layer 20*b* covers the first main surface of the capacitor element 10. In FIG. 18(*a*) and FIG. 18(*b*), the second sealing layer 20*b* is directly disposed on the first sealing layer 20*a* so as to cover the first anode inner electrode 60*a* and the first cathode inner electrode 50*a*.

The cathode outer electrode 30 is electrically connected to the first cathode inner electrode 50*a*. In FIG. 18(*a*), a second cathode through-electrode 232 that extends through the second sealing layer 20*b* is disposed in the second sealing layer 20*b* on the first cathode inner electrode 50*a*. The first cathode inner electrode 50*a* and the cathode outer electrode 30 are connected to each other with the second cathode through-electrode 232 that is extended to the surface of the second sealing layer 20*b* interposed therebetween. Accordingly, the conductor layer 14 and the cathode outer electrode 30 are connected to each other with the first cathode through-electrodes 231, the first cathode inner electrode 50*a*, and the second cathode through-electrode 232 interposed therebetween.

The anode outer electrode 40 is electrically connected to the first anode inner electrode 60*a*. In FIG. 18(*b*), a second anode through-electrode 242 that extends through the second sealing layer 20*b* is disposed in the second sealing layer 20*b* on the first anode inner electrode 60*a*. The first anode inner electrode 60*a* and the anode outer electrode 40 are connected to each other with the second anode through-electrode 242 that is extended to the surface of the second sealing layer 20*b* interposed therebetween. Accordingly, the anode outer electrode 40 and the part of the core portion 11*b* on which the porous portion 11*a* is not disposed are connected to each other with the first anode through-electrode 241, the first anode inner electrode 60*a*, and the second anode through-electrode 242 interposed therebetween.

The form of each first cathode through-electrode 231 is not particularly limited, and examples thereof include a plating electrode and a paste electrode. The form of the second cathode through-electrode 232 is not particularly limited as well, and examples thereof include a plating electrode and a paste electrode. When the first cathode through-electrode 231 is a plating electrode, the second cathode through-electrode 232 is preferably a plating electrode as well but may be a paste electrode. Similarly, when the first cathode through-electrode 231 is a paste electrode, the second cathode through-electrode 232 is preferably a paste electrode as well but may be a plating electrode.

In FIG. 18(*a*), a sectional shape of each first cathode through-electrode 231 is a large tapered shape in which the area of a part near the conductor layer 14 is larger than that of a part near the first cathode inner electrode 50*a*, and a sectional shape of the second cathode through-electrode 232 is a large tapered shape in which the area of a part near the first cathode inner electrode 50*a* is larger than that of a part near the cathode outer electrode 30. When the first cathode through-electrode 231 is a paste electrode, the sectional shape of the first cathode through-electrode 231 may be a tapered shape described above or a rectangular shape in which the area of the part near the first cathode inner electrode 50*a* is substantially the same as the area of the part near the conductor layer 14. Similarly, when the second cathode through-electrode 232 is a paste electrode, the sectional shape of the second cathode through-electrode 232 may be a tapered shape described above or a rectangular shape in which the area of the part near the cathode outer electrode 30 is substantially the same as the area of the part near the first cathode inner electrode 50*a*.

When each first cathode through-electrode 231 is a plating electrode, the sectional shape of the first cathode through-electrode 231 is preferably a reversely tapered shape in which the area of the part near the first cathode inner electrode 50*a* is larger than the area of the part near the conductor layer 14. In this case, the size of the capacitance generation portion can be increased. Similarly, when the second cathode through-electrode 232 is a plating electrode, the sectional shape of the second cathode through-electrode 232 is preferably a reversely tapered shape in which the area of the part near the cathode outer electrode 30 is larger than the area of the part near the first cathode inner electrode 50*a*. In the case of a reversely tapered shape, the filling efficiency of plating is good.

Each first cathode through-electrode 231 may be a columnar metal pin. When the first cathode through-electrode 231 is a metal pin, the sectional shape of the first cathode through-electrode 231 is preferably a rectangular shape in which the area of the part near the first cathode inner electrode 50*a* is substantially the same as the area of the part near the conductor layer 14. Similarly, the second cathode through-electrode 232 may be a columnar metal pin. When the second cathode through-electrode 232 is a metal pin, the sectional shape of the second cathode through-electrode 232 is preferably a rectangular shape in which the area of the part near the cathode outer electrode 30 is substantially the same as the area of the part near the first cathode inner electrode 50*a*. An example of the shape of the metal pin is a cylindrical shape. The shape of the first cathode through-electrode and the second cathode through-electrode is not limited to a columnar shape such as a cylindrical shape and may be a wall shape as in the first embodiment.

In FIG. 18(*a*), the four first cathode through-electrodes 231 and the single second cathode through-electrode 232 are formed, and at least one first cathode through-electrode 231 and at least one second cathode through-electrode 232 suffice.

The form of the first cathode inner electrode 50*a* is not particularly limited, and examples thereof include a metal electrode and a paste electrode.

The shape of the first cathode inner electrode 50*a* is not particularly limited. However, it is preferable that the first cathode inner electrode 50*a* cover the first cathode through-electrodes 231 when viewed in the direction of the normal of the first main surface of the capacitor element 10, and that the area thereof be larger than the area of each first cathode through-electrode 231 that is extended to the surface of the first sealing layer 20*a*.

The form of the cathode outer electrode 30 is not particularly limited, and examples thereof include a metal electrode and a paste electrode.

The shape of the cathode outer electrode 30 is not particularly limited. However, it is preferable that the cathode outer electrode 30 cover the second cathode through-electrode 232 when viewed in the direction of the normal of the first main surface of the capacitor element 10, and that the area thereof be larger than the area of the second cathode through-electrode 232 that is extended to the surface of the second sealing layer 20*b*.

The cathode outer electrode 30 may be a ball-shaped terminal that is disposed on the second cathode through-electrode 232. An example of the ball-shaped terminal is a BGA ("Ball Grid Array") terminal.

The form of the first anode through-electrode 241 is not particularly limited, and examples thereof include a plating electrode and a paste electrode. When the anode through-electrode that extends through the insulating layer 15 and the anode through-electrode that extends through the first sealing layer 20*a* are not integrally formed, the anode through-electrodes may have different forms. The form of the second anode through-electrode 242 is not particularly limited as well, and examples thereof include a plating electrode and a paste electrode. When the first anode through-electrode 241 is a plating electrode, the second anode through-electrode 242 is preferably a plating electrode as well but may be a paste electrode. Similarly, when the first anode through-electrode 241 is a paste electrode, the second anode through-electrode 242 is preferably a paste electrode as well but may be a plating electrode.

In an example illustrated in FIG. 18(*b*), the sectional shape of the first anode through-electrode 241 is a reversely tapered shape in which the area of a part near the first anode inner electrode 60a is larger than the area of a part near the core portion 11b, and the sectional shape of the second anode through-electrode 242 is a reversely tapered shape in which the area of the part near the anode outer electrode 40 is larger than the area of the part near the first anode inner electrode 60a. When the first anode through-electrode 241 is a plating electrode, the sectional shape of the first anode through-electrode 241 is preferably a reversely tapered shape. In this case, the size of the capacitance generation portion can be increased. Similarly, when the second anode through-electrode 242 is a plating electrode, the sectional shape of the second anode through-electrode 242 is preferably a reversely tapered shape. In the case of a reversely tapered shape, the filling efficiency of plating is good.

The first anode through-electrode 241 may be a columnar metal pin. When the first anode through-electrode 241 is a metal pin, the sectional shape of the first anode through-electrode 241 is preferably a rectangular shape in which the area of the part near the first anode inner electrode 60a is substantially the same as the area of the part near the core portion 11b. Similarly, the second anode through-electrode 242 may be a columnar metal pin. When the second anode through-electrode 242 is a metal pin, the sectional shape of the second anode through-electrode 242 is preferably a rectangular shape in which the area of the part near the anode outer electrode 40 is substantially the same as the area of the part near the first anode inner electrode 60a. An example of the shape of the metal pin is a cylindrical shape. The shape of the first anode through-electrode and the second anode through-electrode is not limited to a columnar shape such as a cylindrical shape and may be a wall shape (i.e., a linear shape) as in the first embodiment.

Figure 18B:
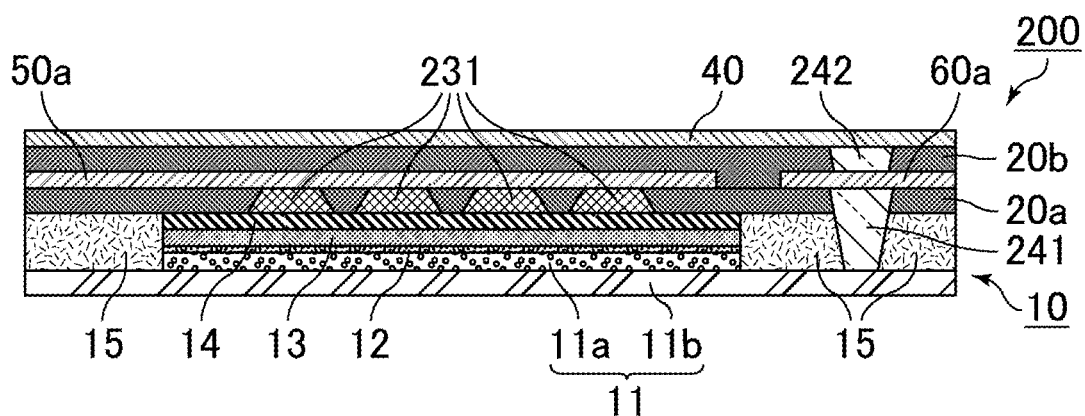
Figure 18C:
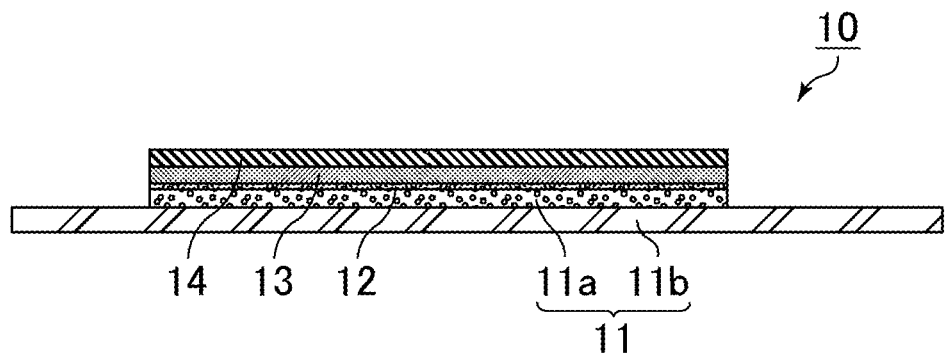

In FIG. 18(b), the single first anode through-electrode 241 and the single second anode through-electrode 242 are formed, and at least one first anode through-electrode 241 and at least one second anode through-electrode 242 suffice. In FIG. 18(b), the first anode through-electrode 241 and the second anode through-electrode 242 are formed on the right-hand side, but the first anode through-electrode 241 and the second anode through-electrode 242 may be formed on the left-hand side.

The form of the first anode inner electrode 60a is not particularly limited, and examples thereof include a metal electrode and a paste electrode.

The shape of the first anode inner electrode 60a is not particularly limited. However, it is preferable that the first anode inner electrode 60a cover the first anode through-electrode 241 when viewed in the direction of the normal of the first main surface of the capacitor element 10, and that the area thereof be larger than the area of the first anode through-electrode 241 that is extended to the surface of the first sealing layer 20a.

The form of the anode outer electrode 40 is not particularly limited, and examples thereof include a metal electrode and a paste electrode.

The shape of the anode outer electrode 40 is not particularly limited. However, it is preferable that the anode outer electrode 40 cover the second anode through-electrode 242 when viewed in the direction of the normal of the first main surface of the capacitor element 10, and that the area thereof be larger than the area of the second anode through-electrode 242 that is extended to the surface of the second sealing layer 20b.

The anode outer electrode 40 may be a ball-shaped terminal that is disposed on the second anode through-electrode 242. An example of the ball-shaped terminal is a BGA terminal.

In FIG. 17, the cathode outer electrode 30 and the anode outer electrode 40 are not in contact with each other and are insulated from each other on the surface of the second sealing layer 20b.

From the perspective of protection of other surfaces, for example, surfaces other than the surfaces of the anode outer electrode 40 and the cathode outer electrode 30 may be covered by another insulating layer, although this is not illustrated in FIG. 17. From the perspective of protection of the capacitor element, for example, the stress-relaxing layer and the damp-proof film may be disposed between the capacitor element and the first sealing layer.

In the solid electrolytic capacitor according to the fifth embodiment, the value of $S_A/S_B$ is preferably no less than 0.3 and no more than 3.5 where $S_A$ is the area of the anode outer electrode, and $S_B$ is the area of the cathode outer electrode in a plan view in the direction of the normal of the first main surface of the capacitor element. Mounting abilities can be improved in a manner in which the area of the anode outer electrode is adjusted to be substantially the same as the area of the cathode outer electrode and the value of $S_A/S_B$ is adjusted to be approximate to 1.

In the solid electrolytic capacitor according to the fifth embodiment, the thickness of the first sealing layer is not particularly limited but is preferably 20 μm or less, more preferably no less than 1 μm and no more than 20 μm.

In the solid electrolytic capacitor according to the fifth embodiment, the thickness of the second sealing layer is not particularly limited but is preferably 20 μm or less, more preferably no less than 1 μm and no more than 20 μm as in the first sealing layer. The thickness of the second sealing layer may be the same as the thickness of the first sealing layer or may differ therefrom.

The thickness of the first sealing layer and the second sealing layer can be measured by section observation with a scanning electron microscope ("SEM"). The thickness of the other layers can be measured in the same manner.

In the solid electrolytic capacitor according to the fifth embodiment, the thickness (i.e., the length represented by T in FIG. 18(a)) of the entire solid electrolytic capacitor is preferably 500 μm or less, more preferably no less than 80 μm and no more than 400 μm. When surfaces other than the surfaces of the anode outer electrode and the cathode outer electrode are covered by an insulating layer, the thickness of the entire solid electrolytic capacitor includes the thickness of the insulating layer.

In the solid electrolytic capacitor according to the fifth embodiment, the first anode through-electrode, the first anode inner electrode, the second anode through-electrode, and the anode outer electrode are preferably composed of plating films having the same composition.

The first anode through-electrode, the first anode inner electrode, the second anode through-electrode, and the anode outer electrode are also preferably composed of conductive paste solidifications having the same composition.

Unsintered or partly sintered conductive particles are preferably in contact with each other in the above conductive paste solidifications. The kind and shape of the conductive particles, for example, are not particularly limited.

A resin component more preferably remains in the above conductive paste solidifications. The kind of the resin is not particularly limited.

The content of the resin component in the above conductive paste solidifications is not particularly limited. However, the ratio thereof to the weight of the conductive particles is preferably 1% or more by weight, more preferably no less than 1% by weight and no more than 30% by weight.

It is noted that the content of the resin component in the conductive paste solidifications can be measured by decomposition gas chromatography-mass spectrometry.

The first anode through-electrode, the first anode inner electrode, the second anode through-electrode, and the anode outer electrode are also preferably composed of solder compounds having the same composition.

In the solid electrolytic capacitor according to the fifth embodiment, the first anode through-electrode and the first anode inner electrode are preferably integrally formed. In particular, the first anode through-electrode, the first anode inner electrode, the second anode through-electrode, and the anode outer electrode are preferably integrally formed.

In the present specification, the "first anode through-electrode and the first anode inner electrode being integrally formed" indicates that there is no other connection layers composed of a conductive adhesive or solder between the first anode through-electrode and the first anode inner electrode.

When a section from the core portion of the capacitor element to the anode outer electrode connected thereto is composed of the same kind of material (such as a plating film, a conductive paste solidification, or a solder compound) as described above, the resistivity of this path can be further decreased.

In the solid electrolytic capacitor according to the fifth embodiment, the first cathode through-electrodes, the first cathode inner electrode, the second cathode through-electrode, and the cathode outer electrode are preferably composed of plating films having the same composition. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be composed of plating films having the same composition.

The first cathode through-electrodes, the first cathode inner electrode, the second cathode through-electrode, and the cathode outer electrode are also preferably composed of conductive paste solidifications having the same composition. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be composed of conductive paste solidifications having the same composition.

Unsintered or partly sintered conductive particles are preferably in contact with each other in the above conductive paste solidifications. The kind and shape of the conductive particles, for example, are not particularly limited.

A resin component more preferably remains in the conductive paste solidifications. The kind of the resin is not particularly limited.

The content of the resin component in the above conductive paste solidifications is not particularly limited. However, the ratio thereof to the weight of the conductive particles is preferably 1% or more by weight, more preferably no less than 1% by weight and no more than 30% by weight.

The first cathode through-electrodes, the first cathode inner electrode, the second cathode through-electrode, and the cathode outer electrode are also preferably composed of solder compounds having the same composition. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be composed of solder compounds having the same composition.

In the solid electrolytic capacitor according to the fifth embodiment, the first cathode through-electrodes and the first cathode inner electrode are preferably integrally formed. In particular, the first cathode through-electrodes, the first cathode inner electrode, the second cathode through-electrode, and the cathode outer electrode are preferably integrally formed.

When a section from the conductor layer of the capacitor element to the cathode outer electrode connected thereto is composed of the same kind of material (such as a plating film, a conductive paste solidification, or a solder compound) as described above, the resistivity of this path can be further decreased.

In the solid electrolytic capacitor according to the fifth embodiment, the material of the insulating layer, for example, is the same as in the first embodiment. The insulating layer may be composed of the same resin as in the first sealing layer.

In the solid electrolytic capacitor according to the fifth embodiment, the first sealing layer and the second sealing layer are preferably composed of a resin. Examples of the resin of which the first sealing layer and the second sealing layer are composed include an epoxy resin and a phenolic resin.

In the solid electrolytic capacitor according to the fifth embodiment, the material of the valve action metal base that is included in the capacitor element, for example, is preferably the same as in the first embodiment. The stress-relaxing portion may be disposed on the surface of the valve action metal base as in the first embodiment.

In the solid electrolytic capacitor according to the fifth embodiment, the material of the dielectric layer and the solid electrolyte layer that are included in the capacitor element, for example, is the same as in the first embodiment.

In the solid electrolytic capacitor according to the fifth embodiment, the conductor layer includes the conductive resin layer, or the silver layer, or both as described according to, for example, the third embodiment. In this case, the conductor layer is preferably composed of the underlying conductive resin layer such as the carbon layer and the silver layer thereon. The conductor layer may be consist of the conductive resin layer or consists of the silver layer. The conductor layer such as the conductive resin layer and/or the silver layer preferably covers the entire solid electrolyte layer.

In the solid electrolytic capacitor according to the fifth embodiment, the conductor layer preferably contains the metal foil as described according to the first embodiment.

Figure 19A:
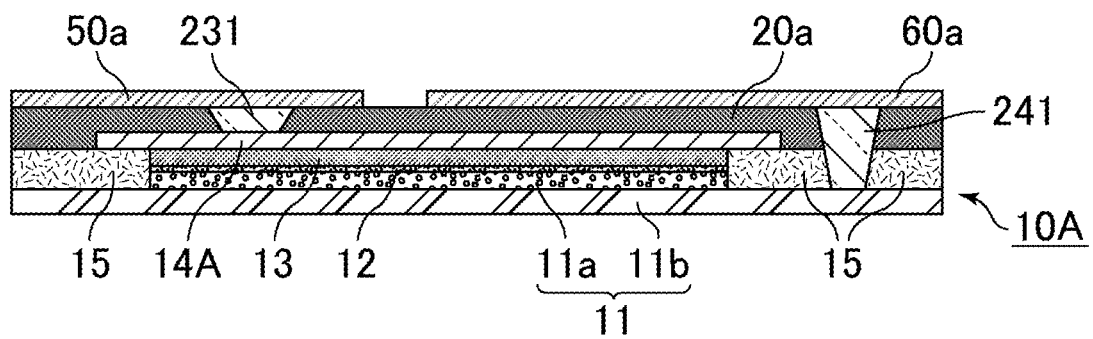
FIG. 19(*a*) schematically illustrates a sectional view of a part of the structure of another example of the solid electrolytic capacitor according to the fifth embodiment.
Figure 19B:
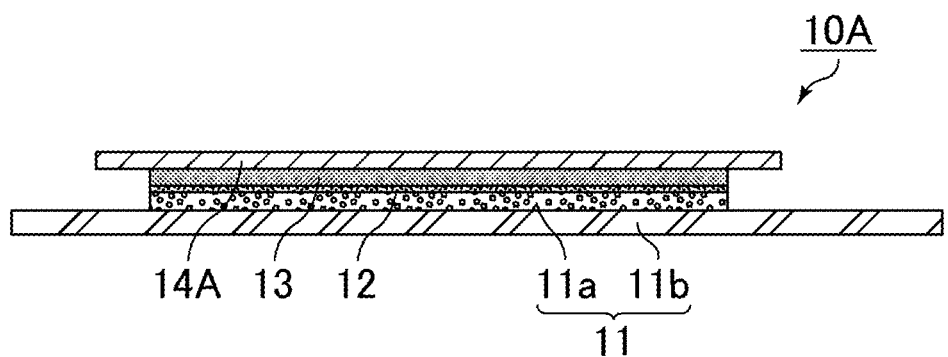

FIG. 19(a) schematically illustrates a sectional view of a part of the structure of another example of the solid electrolytic capacitor according to the fifth embodiment. FIG. 19(b) schematically illustrates a sectional view of an example of a capacitor element that is included in the solid electrolytic capacitor illustrated in FIG. 19(a).

The solid electrolytic capacitor illustrated in FIG. 19(a) includes the capacitor element 10A instead of the capacitor element 10 that is included in the solid electrolytic capacitor

200 illustrated in FIG. 18(*a*) and FIG. 18(*b*). The other components are common to the solid electrolytic capacitor 200. Accordingly, in FIG. 19(*a*), the first anode inner electrode 60*a* and the first cathode inner electrode 50*a* that are disposed on the first sealing layer 20*a* are illustrated, but a description of components located at positions higher than those of the first anode inner electrode 60*a* and the first cathode inner electrode 50*a* is omitted.

As illustrated in FIG. 19(*a*) and FIG. 19(*b*), the capacitor element 10A includes the valve action metal base 11 that includes the porous portion 11*a* on the first main surface of the core portion 11*b*, the dielectric layer 12 that is formed on the surface of the porous portion 11*a*, the solid electrolyte layer 13 that is disposed on the dielectric layer 12, and the conductor layer 14A that is disposed on the solid electrolyte layer 13, and includes the exposed portion of the core portion 11*b* along the first main surface of the valve action metal base 11. In the capacitor element 10A illustrated in FIG. 19(*b*), the conductor layer 14A is consist of the metal foil. As illustrated in FIG. 19(*a*), the insulating layer 15 that insulates the conductor layer 14A and the valve action metal base 11 from each other is disposed between the first sealing layer 20*a* and the part of the core portion 11*b* on which the porous portion 11*a* is not disposed.

It should be appreciated that exemplary structures of the conductor layer that contains the metal foil are the same as in the first embodiment described above.

When the insulating layer is disposed between the first sealing layer and the part of the core portion on which the porous portion is not disposed in the solid electrolytic capacitor according to the fifth embodiment, the metal foil may not be disposed on the insulating layer but is preferably disposed also on the insulating layer as illustrated in FIG. 19(*a*).

When the metal foil is disposed also on the insulating layer, the first cathode through-electrodes may be formed above the insulating layer.

Figure 20:
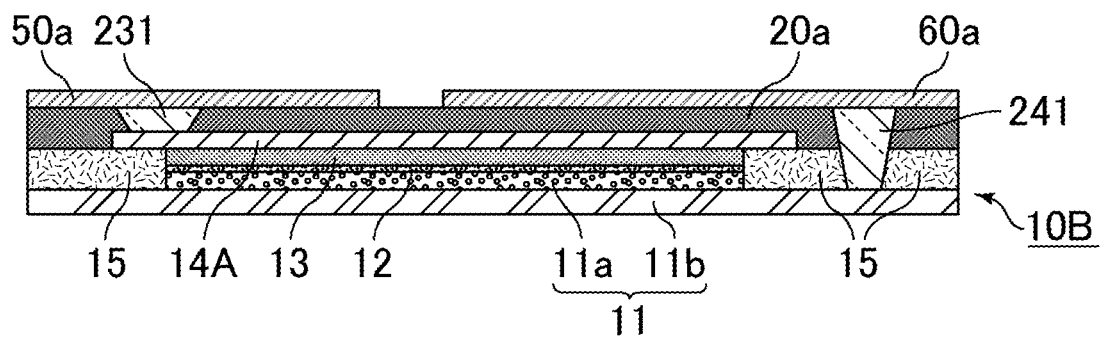
FIG. 20 schematically illustrates a sectional view of a part of the structure of another example of the solid electrolytic capacitor according to the fifth embodiment.
Figure 21A:
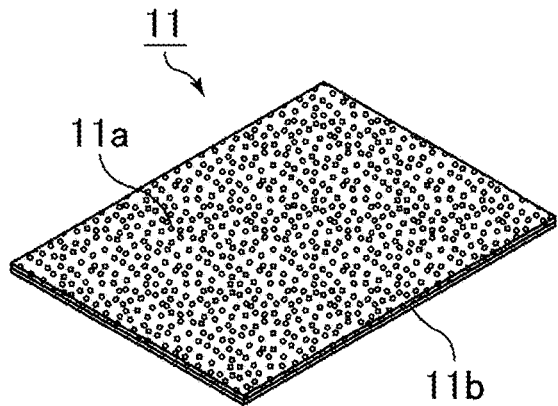
FIGS. 21(*a*) to 21(*l*) schematically illustrate an example of a method for manufacturing the solid electrolytic capacitor illustrated in FIG. 17 with perspective views.
Figure 21B:
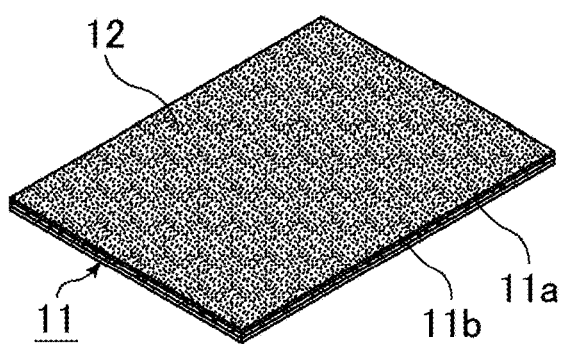
Figure 21C:
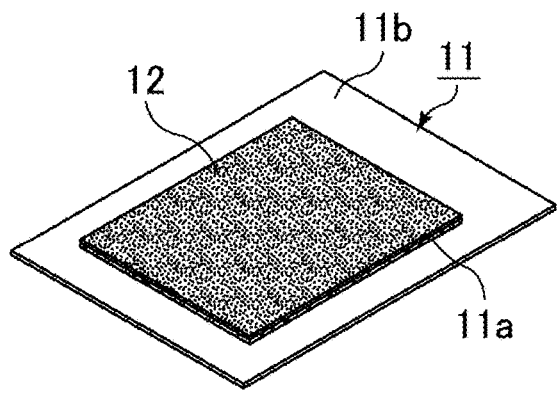
Figure 21D:
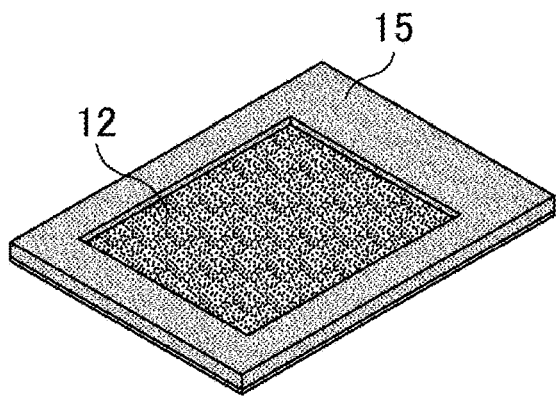
Figure 21E:
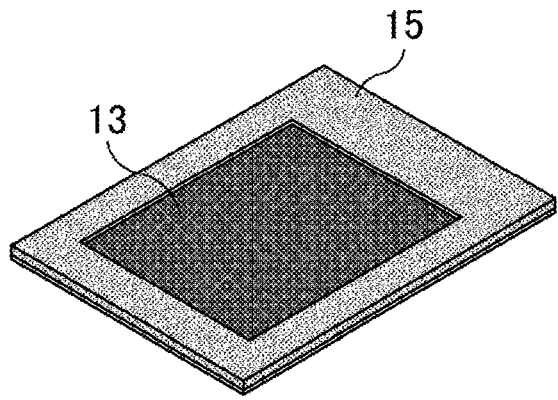
Figure 21F:
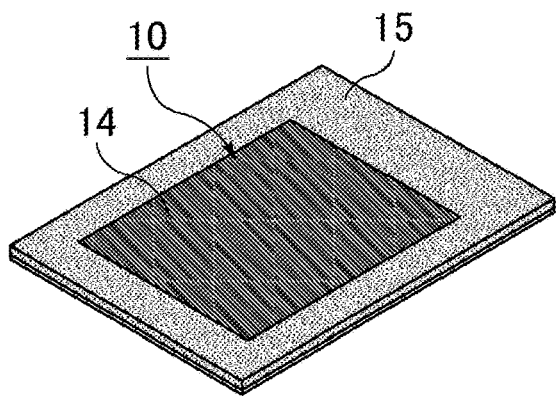
Figure 21G:
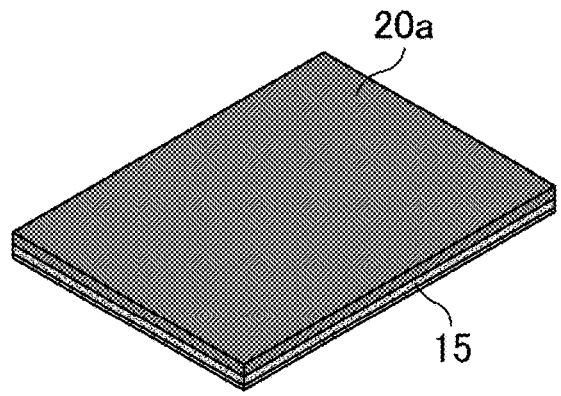
Figure 21H:
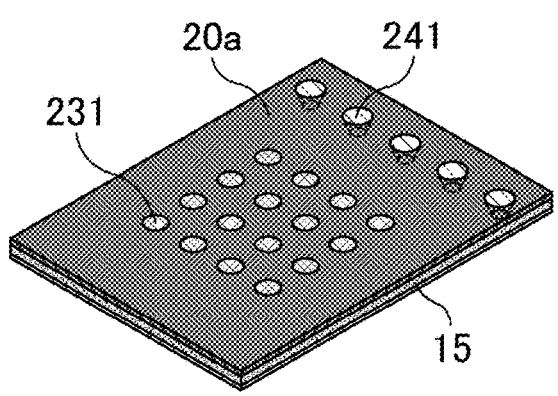
Figure 21I:
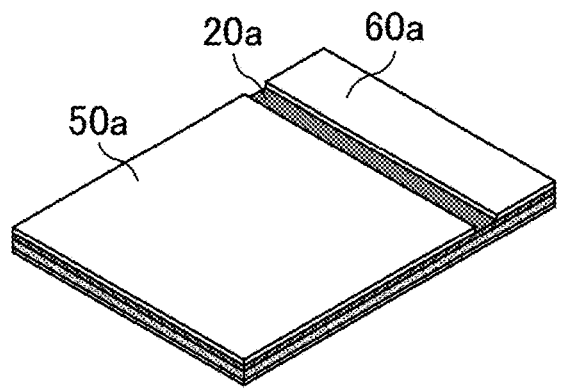
Figure 21J:
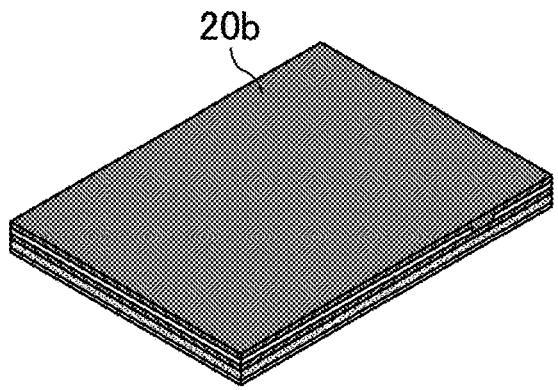
Figure 21K:
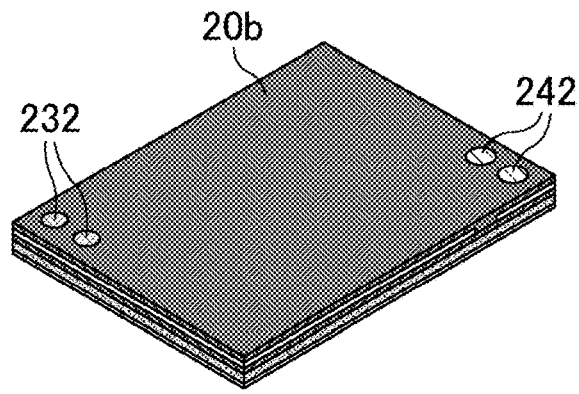
Figure 21L:
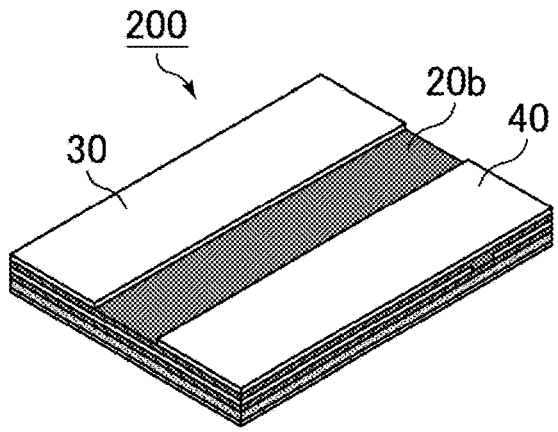

FIG. 20 schematically illustrates a part of the structure of another example of the solid electrolytic capacitor according to the fifth embodiment. In FIG. 20, a description of components located at positions higher than those of the first anode inner electrode 60*a* and the first cathode inner electrode 50*a* is omitted as in FIG. 19(*a*).

In FIG. 20, the conductor layer 14A consist of the metal foil is disposed also on the insulating layer 15 in the capacitor element 10B, and the first cathode through-electrode 231 is formed above the insulating layer 15.

A method for manufacturing of the solid electrolytic capacitor according to the fifth embodiment will now be described.

FIG. 21(*a*) to FIG. 21(*l*) schematically illustrate an example of the method for manufacturing the solid electrolytic capacitor illustrated in FIG. 17 with perspective views.

The capacitor element with the insulating layer formed on the exposed portion of the core portion is first prepared.

FIG. 21(*a*) to FIG. 21(*e*) are common to FIG. 3(*a*) to FIG. 3(*e*), and a detailed description thereof is omitted.

Moreover, FIG. 21(*f*) is common to FIG. 10(*f*), and a detailed description thereof is omitted.

As illustrated in FIG. 21(*g*), the first sealing layer 20*a* is formed on the insulating layer 15 and the conductor layer 14 of the capacitor element 10 so as to cover the first main surface of the capacitor element 10 on which the insulating layer 15 is formed. The first sealing layer can be formed by, for example, the resin molding method.

As illustrated in FIG. 21(*h*), the first anode through-electrode 241 that is disposed in the first sealing layer 20*a* and the insulating layer 15 is formed so as to extend through the first sealing layer 20*a* and the insulating layer 15 on the exposed portion of the core portion 11*b* of the capacitor element 10, and the first cathode through-electrodes 231 that are disposed in the first sealing layer 20*a* are formed so as to extend through the first sealing layer 20*a* on the conductor layer 14 of the capacitor element 10. The first anode through-electrode 241 is connected to the core portion 11*b* of the capacitor element 10. The first cathode through-electrodes 231 are connected to the conductor layer 14 of the capacitor element 10.

A method of forming the first anode through-electrode and the first cathode through-electrodes will be described later. The first anode through-electrode and the first cathode through-electrodes may be formed after the first sealing layer is formed or may be formed before the first sealing layer is formed. The shape of the first anode through-electrode and each first cathode through-electrode is not limited to a columnar shape such as a cylindrical shape and may be a wall shape.

As illustrated in FIG. 21(*i*), the first anode inner electrode 60*a* that is connected to the first anode through-electrode 241 that is exposed from the surface of the first sealing layer 20*a* and the first cathode inner electrode 50*a* that is connected to the first cathode through-electrodes 231 that are exposed from the surface of the first sealing layer 20*a* are formed on the first sealing layer 20*a*. The first anode inner electrode 60*a* is electrically connected to the core portion 11*b* with the first anode through-electrode 241 interposed therebetween. The first cathode inner electrode 50*a* is electrically connected to the conductor layer 14 with the first cathode through-electrodes 231 interposed therebetween. For example, a metal electrode or a paste electrode may be formed as each of the first anode inner electrode and the first cathode inner electrode.

Subsequently, as illustrated in FIG. 21(*j*), the second sealing layer 20*b* is directly formed on the first sealing layer 20*a* so as to cover the first anode inner electrode 60*a* and the first cathode inner electrode 50*a*. The second sealing layer can be formed by, for example, the resin molding method.

As illustrated in FIG. 21(*k*), the second anode through-electrode 242 that is disposed in the second sealing layer 20*b* is formed so as to extend through the second sealing layer 20*b* on the first anode inner electrode 60*a*, and the second cathode through-electrode 232 that is disposed in the second sealing layer 20*b* is formed so as to extend through the second sealing layer 20*b* on the first cathode inner electrode 50*a*. The second anode through-electrode 242 is connected to the first anode inner electrode 60*a*. The second cathode through-electrode 232 is connected to the first cathode inner electrode 50*a*.

A method of forming the second anode through-electrode and the second cathode through-electrode is the same as the method of forming the first anode through-electrode and the first cathode through-electrode. The second anode through-electrode and the second cathode through-electrode may be formed after the second sealing layer is formed or may be formed before the second sealing layer is formed. The shape of the second anode through-electrode and the second cathode through-electrode is not limited to a columnar shape such as a cylindrical shape and may be a wall shape.

As illustrated in FIG. 21(*l*), the anode outer electrode 40 that is connected to the second anode through-electrode 242 that is exposed from the surface of the second sealing layer 20*b* and the cathode outer electrode 30 that is connected to the second cathode through-electrode 232 that is exposed from the surface of the second sealing layer 20*b* are formed on the second sealing layer 20b. The anode outer electrode 40 is electrically connected to the core portion 11b with the first anode through-electrode 241, the first anode inner electrode 60a, and the second anode through-electrode 242 interposed therebetween. The cathode outer electrode 30 is electrically connected to the conductor layer 14 with the first cathode through-electrodes 231, the first cathode inner electrode 50a, and the second cathode through-electrode 232 interposed therebetween. For example, a metal electrode, a paste electrode, or a ball-shaped terminal may be formed as each of the anode outer electrode and the cathode outer electrode.

In the above manner, the solid electrolytic capacitor 200 illustrated in FIG. 17 is obtained.

According to the fifth embodiment, the anode outer electrode and the cathode outer electrode are formed above the first anode inner electrode and the first cathode inner electrode. This enables the size of the anode and cathode outer electrodes to be freely designed. For this reason, a solid electrolytic capacitor in which the area of the anode outer electrode is substantially the same as the area of the cathode outer electrode can be manufactured, and the mounting ability can be improved.

It is noted that electrodes corresponding to the first anode inner electrode and the first cathode inner electrode can be used as the anode outer electrode and the cathode outer electrode. In this case, however, the area of the anode outer electrode is smaller than the area of the cathode outer electrode, and the mounting ability is not sufficient. The area of the first anode inner electrode can be adjusted to be approximate to the area of the first cathode inner electrode by adjusting positions at which the first anode through-electrode and the first cathode through-electrodes are formed. In this case, however, a conduction path that can be lead to right above becomes narrow, and frequency characteristics are affected.

The first anode through-electrode can be formed in the same manner as the method of forming the anode through-electrode illustrated in FIG. 11(a), FIG. 11(b), and FIG. 11(c) described according to the third embodiment. For example, an anode through-hole that extends through the first sealing layer 20a and the insulating layer 15 on the exposed portion of the core portion 11b is formed. The anode through-hole is preferably formed by the laser process. When the anode through-hole is formed by the laser process, the anode through-hole may be formed up to a part of the core portion. Subsequently, the first anode through-electrode 241 is formed in the anode through-hole. For example, a plating electrode or a paste electrode may be formed as the first anode through-electrode. When the anode through-hole is formed by the laser process, the sectional shape of the first anode through-electrode can be a reversely tapered shape.

The second anode through-electrode can be formed in the same manner as above. For example, an anode through-hole that extends through the second sealing layer 20b on the first anode inner electrode 60a is formed. The anode through-hole is preferably formed by the laser process. When the anode through-hole is formed by the laser process, the anode through-hole may be formed up to a part of the first anode inner electrode. Subsequently, the second anode through-electrode 242 is formed in the anode through-hole. For example, a plating electrode or a paste electrode may be formed as the second anode through-electrode. When the anode through-hole is formed by the laser process, the sectional shape of the second anode through-electrode can be a reversely tapered shape.

The first cathode through-electrodes can be formed in the same manner as the method of forming the cathode through-electrodes illustrated in FIG. 12(a), FIG. 12(b), and FIG. 12(c) described according to the third embodiment. For example, cathode bumps (paste electrodes), which become the first cathode through-electrodes 231, are formed on the conductor layer 14 by using conductive paste, and subsequently, the first sealing layer 20a is formed so as to cover the cathode bumps. Subsequently, the first sealing layer 20a is cut out such that a surface of each cathode bump is exposed. Alternatively, the first sealing layer 20a may be formed such that the cathode bump is covered and the surface of the cathode bump is exposed. In this case, it is not necessary to cut out the first sealing layer 20a. Consequently, the first cathode through-electrodes 231 that extend through the first sealing layer 20a on the conductor layer 14 are formed in the first sealing layer 20a. The first cathode through-electrodes 231 are substantially the same as the cathode bumps. When the cathode bumps are formed by using conductive paste, the sectional shape of each first cathode through-electrode can be a tapered shape.

The second cathode through-electrode can be formed in the same manner as above. For example, a cathode bump (paste electrode), which becomes the second cathode through-electrode 232, is formed on the first cathode inner electrode 50a by using conductive paste, and subsequently, the second sealing layer 20b is formed so as to cover the cathode bump. Subsequently, the second sealing layer 20b is cut out such that a surface of the cathode bump is exposed. Alternatively, the second sealing layer 20b may be formed such that the cathode bump is covered and the surface of the cathode bump is exposed. In this case, it is not necessary to cut out the second sealing layer 20b. Consequently, the second cathode through-electrode 232 that extends through the second sealing layer 20b on the first cathode inner electrode 50a is formed in the second sealing layer 20b. The second cathode through-electrode 232 is substantially the same as the cathode bump. When the cathode bump is formed by using conductive paste, the sectional shape of the second cathode through-electrode can be a tapered shape.

The first cathode through-electrodes can also be formed in the same manner as the method of forming the cathode through-electrodes illustrated in FIG. 13(a), FIG. 13(b), FIG. 13(c), and FIG. 13(d) described according to the third embodiment. For example, the metal-containing layers are formed on the conductor layer 14, and subsequently, the first sealing layer 20a is formed. The cathode through-holes that extend through the first sealing layer 20a on the metal-containing layers are formed. The cathode through-holes are preferably formed by the laser process. When the cathode through-holes are formed by the laser process, the cathode through-holes may be formed up to parts of the metal-containing layers. Subsequently, the first cathode through-electrodes are formed in the cathode through-holes. For example, a plating electrode or a paste electrode may be formed as each of the first cathode through-electrodes. When the cathode through-holes are formed by the laser process, the sectional shape of each first cathode through-electrode can be a reversely tapered shape.

The second cathode through-electrode can be formed in the same manner as above. For example, the metal-containing layer is formed on the first cathode inner electrode 50a, and subsequently, the second sealing layer 20b is formed. The cathode through-hole that extends through the second sealing layer 20b on the metal-containing layer is formed. The cathode through-hole is preferably formed by the laser process. When the cathode through-hole is formed by the laser process, the cathode through-hole may be formed up to a part of the metal-containing layer. Subsequently, the second cathode through-electrode is formed in the cathode through-hole. For example, a plating electrode or a paste electrode may be formed as the second cathode through-electrode. When the cathode through-hole is formed by the laser process, the sectional shape of the second cathode through-electrode can be a reversely tapered shape.

The second cathode through-electrode can also be formed in the same manner as the second anode through-electrode is formed because the cathode through-hole can be formed in the second sealing layer even when the metal-containing layer is not formed on the first cathode inner electrode.

The method for manufacturing the solid electrolytic capacitor that includes the capacitor element 10 illustrated in FIG. 18(a) is described above. The method of manufacturing the solid electrolytic capacitor that includes the capacitor element 10A illustrated in FIG. 19(a) or the capacitor element 10B illustrated in FIG. 20 is the same as the method for manufacturing the solid electrolytic capacitor that includes the capacitor element 10 except that the conductor layer that contains the metal foil is formed on the solid electrolyte layer.

A method of forming the conductor layer that contains the metal foil on the solid electrolyte layer is the same as in the first embodiment, and a detailed description thereof is omitted.

When the conductor layer that contains the metal foil is formed on the solid electrolyte layer, each first cathode through-electrode can be formed in the same manner as the method of forming the cathode through-electrode illustrated in FIG. 5(a), FIG. 5(b), and FIG. 5(c) described according to the first embodiment. For example, the cathode through-hole that extends through the first sealing layer 20a on the conductor layer 14A that contains the metal foil is formed. The cathode through-hole is preferably formed by the laser process. When the cathode through-hole is formed by the laser process, the cathode through-hole may be formed up to a part of the conductor layer. Subsequently, the first cathode through-electrode is formed in the cathode through-hole. For example, a plating electrode or a paste electrode may be formed as the first cathode through-electrode. When the cathode through-hole is formed by the laser process, the sectional shape of the first cathode through-electrode can be a reversely tapered shape.

When the conductor layer that contains the metal foil is formed on the solid electrolyte layer, the second cathode through-electrode can be formed in the same manner as above. For example, the cathode through-hole that extends through the second sealing layer 20b on the first cathode inner electrode 50a is formed. The cathode through-hole is preferably formed by the laser process. When the cathode through-hole is formed by the laser process, the cathode through-hole may be formed up to a part of the first cathode inner electrode. Subsequently, the second cathode through-electrode is formed in the cathode through-hole. For example, a plating electrode or a paste electrode may be formed as the second cathode through-electrode. When the cathode through-hole is formed by the laser process, the sectional shape of the second cathode through-electrode can be a reversely tapered shape.

In the method for manufacturing the solid electrolytic capacitor according to the fifth embodiment, the first anode through-electrode, the first anode inner electrode, the second anode through-electrode, and the anode outer electrode are preferably formed by using plating solutions having the same composition.

The first anode through-electrode, the first anode inner electrode, the second anode through-electrode, and the anode outer electrode are also preferably formed by using conductive paste having the same composition. The above conductive paste contains conductive particles and a resin component.

The first anode through-electrode, the first anode inner electrode, the second anode through-electrode, and the anode outer electrode are also preferably formed by using solder compounds having the same composition.

In the method for manufacturing the solid electrolytic capacitor according to the fifth embodiment, the first anode through-electrode and the first anode inner electrode are preferably integrally formed. In particular, the first anode through-electrode, the first anode inner electrode, the second anode through-electrode, and the anode outer electrode are preferably integrally formed.

In the method for manufacturing the solid electrolytic capacitor according to the fifth embodiment, the first cathode through-electrodes, the first cathode inner electrode, the second cathode through-electrode, and the cathode outer electrode are preferably formed by using plating solutions having the same composition. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be formed by using plating solutions having the same composition.

The first cathode through-electrodes, the first cathode inner electrode, the second cathode through-electrode, and the cathode outer electrode are preferably formed by using conductive paste having the same composition as well. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be formed by using conductive paste having the same composition. The above conductive paste contains conductive particles and a resin component.

The first cathode through-electrodes, the first cathode inner electrode, the second cathode through-electrode, and the cathode outer electrode are preferably formed by using solder compounds having the same composition as well. In this case, the first anode through-electrode, the first anode inner electrode, the second anode through-electrode, the anode outer electrode, the first cathode through-electrodes, the first cathode inner electrode, the second cathode through-electrode, and the cathode outer electrode may be formed by using solder compounds having the same composition.

In the method for manufacturing the solid electrolytic capacitor according to the fifth embodiment, the first cathode through-electrodes and the first cathode inner electrode are preferably integrally formed. In particular, the first cathode through-electrodes, the first cathode inner electrode, the second cathode through-electrode, and the cathode outer electrode are preferably integrally formed.

Sixth Embodiment

According to a sixth embodiment, the insulating layer is disposed between the first sealing layer and the exposed portion of the core portion of the capacitor element, at least the insulating layer, the first sealing layer, the first anode inner electrode, the second sealing layer, and the anode outer electrode are disposed in this order on the exposed portion of the core portion, the first anode through-electrode is disposed in the first sealing layer and the insulating layer on the exposed portion of the core portion, the second anode through-electrode is disposed in the second sealing layer, and the core portion is extended to the surface of the second sealing layer with the first anode through-electrode, the first anode inner electrode, and the second anode through-electrode interposed therebetween as in the fifth embodiment.

According to the sixth embodiment, one or more third sealing layers are disposed between the first sealing layer and the second sealing layer unlike the fifth embodiment. A third anode through-electrode that is directly or indirectly connected to the first anode inner electrode, and a third cathode through-electrode that is directly or indirectly connected to the first cathode inner electrode are formed in the one or more third sealing layers so as to extend through the sealing layers. The second anode inner electrode that is connected to the third anode through-electrode that is exposed from a surface of the one or more third sealing layers, or the second cathode inner electrode that is connected to the third cathode through-electrode that is exposed from the surface of the one or more third sealing layers, or both are disposed on the one or more third sealing layers.

The solid electrolytic capacitor according to the sixth embodiment has the same structure as the solid electrolytic capacitor according to the fifth embodiment except that the one or more third sealing layers are disposed between the first sealing layer and the second sealing layer. A method for manufacturing the solid electrolytic capacitor according to the sixth embodiment has the same feature as the method for manufacturing the solid electrolytic capacitor according to the fifth embodiment except that the one or more third sealing layers are formed between the first sealing layer and the second sealing layer. Accordingly, an example of the method for manufacturing the solid electrolytic capacitor according to the sixth embodiment will be described, and a detailed description of the other structures is omitted.

FIG. 22(*a*) to FIG. 22(*h*) schematically illustrate the example of the method for manufacturing the solid electrolytic capacitor according to the sixth embodiment with perspective views.

The capacitor element with the insulating layer formed on the exposed portion of the core portion is first prepared as in the fifth embodiment. Subsequently, the first sealing layer is formed on the insulating layer and the conductor layer of the capacitor element so as to cover the first main surface of the capacitor element with the insulating layer formed.

As illustrated in FIG. 22(*a*), the first anode through-electrode 241 that is disposed in the first sealing layer 20*a* and the insulating layer 15 is formed so as to extend through the first sealing layer 20*a* and the insulating layer 15 on the exposed portion of the core portion of the capacitor element, and the first cathode through-electrodes 231 that are disposed in the first sealing layer 20*a* are formed so as to extend through the first sealing layer 20*a* on the conductor layer of the capacitor element. The first anode through-electrode 241 is connected to the core portion of the capacitor element. The first cathode through-electrodes 231 are connected to the conductor layer of the capacitor element. A method of forming the first anode through-electrode and the first cathode through-electrodes is the same as in the fifth embodiment.

As illustrated in FIG. 22(*b*), the first anode inner electrode 60*a* that is connected to the first anode through-electrode 241 that is exposed from the surface of the first sealing layer 20*a* and the first cathode inner electrode 50*a* that is connected to the first cathode through-electrodes 231 that are exposed from the surface of the first sealing layer 20*a* are formed on the first sealing layer 20*a*. The first anode inner electrode 60*a* is electrically connected to the core portion with the first anode through-electrode 241 interposed therebetween. The first cathode inner electrode 50*a* is electrically connected to the conductor layer with the first cathode through-electrodes 231 interposed therebetween. For example, a metal electrode and a paste electrode may be formed as each of the first anode inner electrode and the first cathode inner electrode.

Subsequently, as illustrated in FIG. 22(*c*), a third sealing layer 20*c* is directly formed on the first sealing layer 20*a* so as to cover the first anode inner electrode 60*a* and the first cathode inner electrode 50*a*. The third sealing layer can be formed by, for example, the resin molding method.

As illustrated in FIG. 22(*d*), a third anode through-electrode 243 that is disposed in the third sealing layer 20*c* is formed so as to extend through the third sealing layer 20*c* on the first anode inner electrode 60*a*, and a third cathode through-electrode 233 that is disposed in the third sealing layer 20*c* is formed so as to extend through the third sealing layer 20*c* on the first cathode inner electrode 50*a*. The third anode through-electrode 243 is connected to the first anode inner electrode 60*a*. The third cathode through-electrode 233 is connected to the first cathode inner electrode 50*a*.

A method of forming the third anode through-electrode and the third cathode through-electrode is the same as the method of forming the second anode through-electrode and the second cathode through-electrode described according to the fifth embodiment. The third anode through-electrode and the third cathode through-electrode may be formed after the third sealing layer is formed or may be formed before the third sealing layer is formed. The shape of the third anode through-electrode and the third cathode through-electrode is not limited to a columnar shape such as a cylindrical shape and may be a wall shape.

As illustrated in FIG. 22(*e*), a second anode inner electrode 60*b* that is connected to the third anode through-electrode 243 that is exposed from the surface of the third sealing layer 20*c* is formed on the third sealing layer 20*c*. The second anode inner electrode 60*b* is electrically connected to the first anode inner electrode 60*a* with the third anode through-electrode 243 interposed therebetween. The second cathode inner electrode that is connected to the third cathode through-electrode 233 that is exposed from the surface of the third sealing layer 20*c* may be formed on the third sealing layer 20*c*, although this is not illustrated in FIG. 22(*e*). The second cathode inner electrode is electrically connected to the first cathode inner electrode 50*a* with the third cathode through-electrode 233 interposed therebetween. For example, a metal electrode and a paste electrode may be formed as each of the second anode inner electrode and the second cathode inner electrode.

Subsequently, as illustrated in FIG. 22(*f*), the second sealing layer 20*b* is directly formed on the third sealing layer 20*c* so as to cover the second anode inner electrode 60*b*. The second sealing layer can be formed by, for example, the resin molding method.

As illustrated in FIG. 22(*g*), the second anode through-electrode 242 that is disposed in the second sealing layer 20*b* is formed so as to extend through the second sealing layer 20*b* on the second anode inner electrode 60*b*, and the second cathode through-electrode 232 that is disposed in the second sealing layer 20*b* is formed so as to extend through the second sealing layer 20*b* on the third cathode through-electrode 233. The second anode through-electrode 242 is connected to the second anode inner electrode 60b. The second cathode through-electrode 232 is connected to the third cathode through-electrode 233. A method of forming the second anode through-electrode and the second cathode through-electrode is the same as in the fifth embodiment.

Figure 22A:
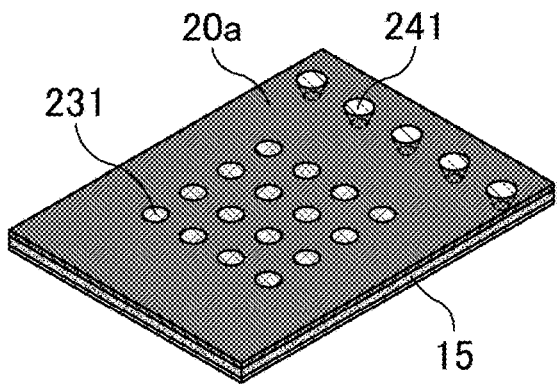
FIGS. 22(*a*) to 22(*h*) schematically illustrate an example of a method for manufacturing a solid electrolytic capacitor according to a sixth embodiment with perspective views.
Figure 22B:
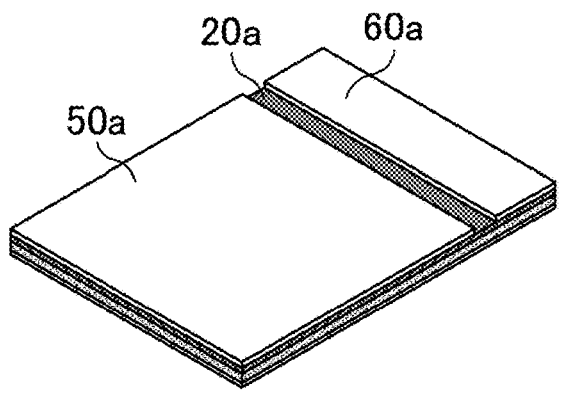
Figure 22C:
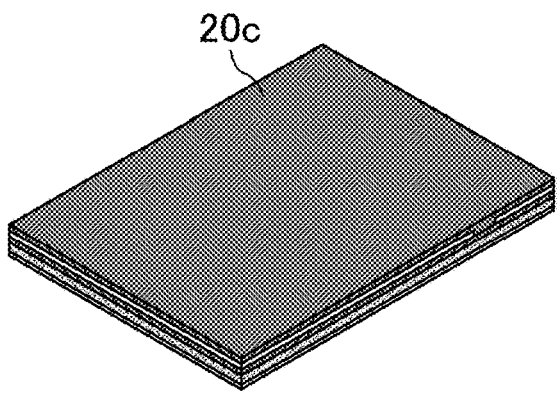
Figure 22D:
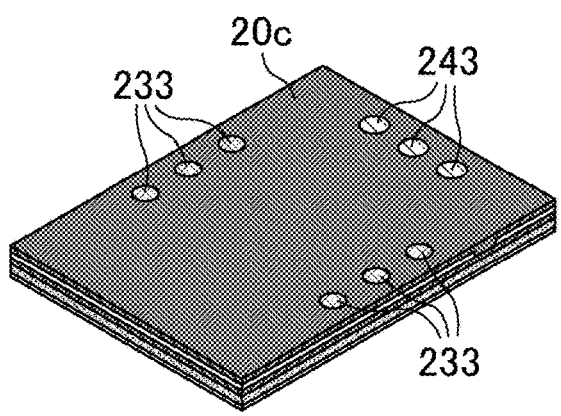
Figure 22E:
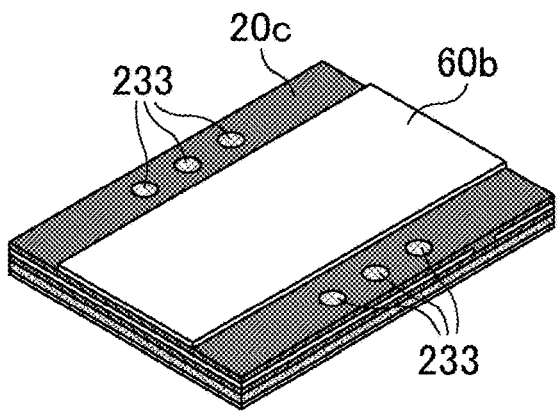
Figure 22F:
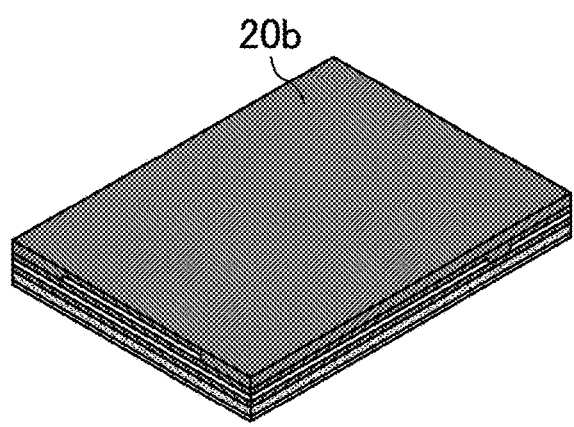
Figure 22G:
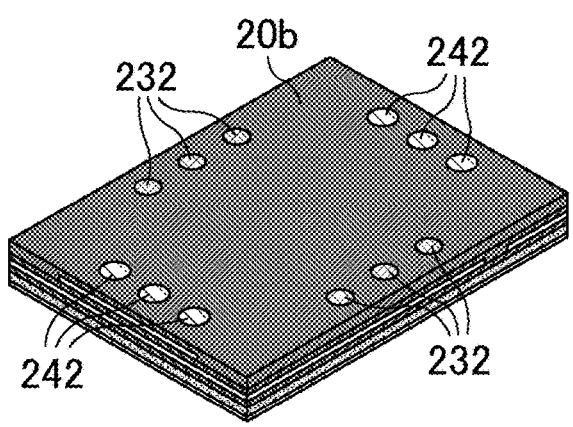
Figure 22H:
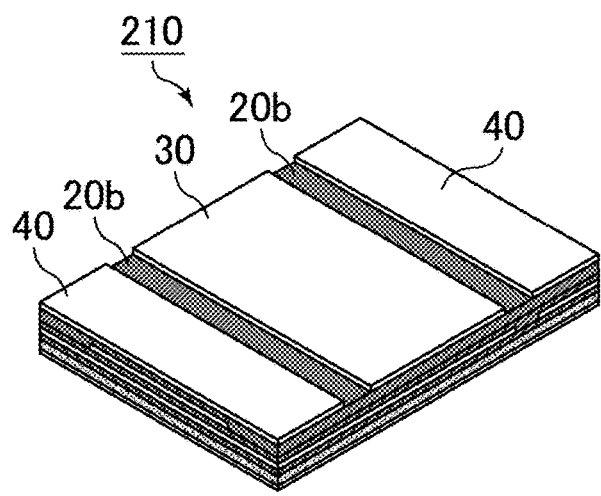

As illustrated in FIG. 22(h), the anode outer electrode 40 that is connected to the second anode through-electrode 242 that is exposed from the surface of the second sealing layer 20b and the cathode outer electrode 30 that is connected to the second cathode through-electrode 232 that is exposed from the surface of the second sealing layer 20b are formed on the second sealing layer 20b. The anode outer electrode 40 is electrically connected to the core portion with the first anode through-electrode 241, the first anode inner electrode 60a, the third anode through-electrode 243, the second anode inner electrode 60b, and the second anode through-electrode 242 interposed therebetween. The cathode outer electrode 30 is electrically connected to the conductor layer with the first cathode through-electrodes 231, the first cathode inner electrode 50a, the third cathode through-electrode 233, and the second cathode through-electrode 232 interposed therebetween. For example, a metal electrode, a paste electrode, or a ball-shaped terminal may be formed as each of the anode outer electrode and the cathode outer electrode.

In the above manner, a solid electrolytic capacitor 210 is obtained.

According to the sixth embodiment, the third sealing layer is disposed between the first sealing layer and the second sealing layer. This enables the arrangement of the anode and cathode outer electrodes to be freely designed, for example, plural anode outer electrodes can be formed with a cathode outer electrode interposed therebetween. For this reason, a solid electrolytic capacitor that has a three-terminal structure that includes two anode outer electrodes and one cathode outer electrode can be manufactured, and a solid electrolytic capacitor that has a multi-terminal structure that includes two or more anode outer electrodes and one or more cathode outer electrodes can be manufactured. A solid electrolytic capacitor that has another terminal structure such as the three-terminal structure can have a further decreased ESL.

A method for manufacturing the solid electrolytic capacitor in which the conductor layer contains the metal foil is the same as the above manufacturing method except that the conductor layer that contains the metal foil is formed on the solid electrolyte layer.

In the solid electrolytic capacitor according to the sixth embodiment, the third sealing layer may include only one layer or two or more layers.

In the solid electrolytic capacitor according to the sixth embodiment, the thickness of the first sealing layer and the second sealing layer is preferably the same as in the first embodiment.

In the solid electrolytic capacitor according to the sixth embodiment, the thickness of the third sealing layer is not particularly limited. However, the thickness of each sealing layer that is included in the third sealing layer is preferably 20 μm or less, more preferably no less than 1 μm and no more than 20 μm. The thickness of each sealing layer that is included in the third sealing layer may be the same as the thickness of the first sealing layer and the second sealing layer or may differ therefrom. The thickness of the entire third sealing layer is preferably 20 μm or less, more preferably no less than 1 μm and no more than 20 μm.

In the solid electrolytic capacitor according to the sixth embodiment, the thickness of the entire solid electrolytic capacitor is preferably 500 μm or less, more preferably no less than 80 μm and no more than 400 μm.

Seventh Embodiment

According to a seventh embodiment, at least the first sealing layer, the first anode inner electrode, the second sealing layer, and the anode outer electrode are disposed in this order on the exposed portion of the core portion of the capacitor element, the first anode through-electrode is disposed in the first sealing layer on the exposed portion of the core portion, the second anode through-electrode is disposed in the second sealing layer, and the core portion is extended to the surface of the second sealing layer with the first anode through-electrode and the second anode through-electrode interposed therebetween unlike the fifth embodiment or the sixth embodiment. The design of the seventh embodiment enables the length of each through-electrode that has a tapered conductive path to be relatively decreased because the core portion is substantially near the anode outer electrode as in the second embodiment. Consequently, the resistivity can be decreased as a whole, and a large electric current can be dealt with. In particular, when a three-terminal-structure product is used as the circuit bypass capacitor, allowable electric current capacitance between anodes is preferably set to be large. Accordingly, it is advantageous to design a high conductor ratio in the conductive path as in the seventh embodiment. In addition, the anode outer electrode can be disposed on the same side as the cathode outer electrode, and a solid electrolytic capacitor can be designed to be thin.

The solid electrolytic capacitor according to the seventh embodiment has the same structure as the solid electrolytic capacitor according to the fifth embodiment or the sixth embodiment except that the insulating layer is not disposed on the exposed portion of the core portion of the capacitor element.

Figure 23A:
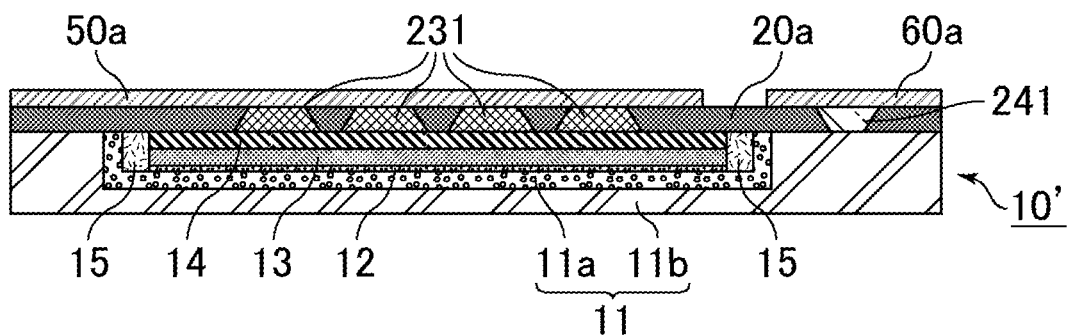
FIG. 23(*a*) schematically illustrates a sectional view of a part of the structure of an example of a solid electrolytic capacitor according to a seventh embodiment.
Figure 23B:
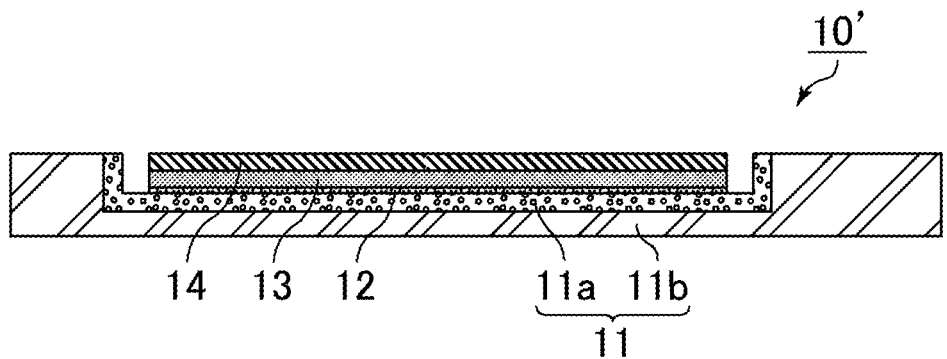

FIG. 23(a) schematically illustrates a sectional view of a part of the structure of an example of the solid electrolytic capacitor according to the seventh embodiment. FIG. 23(b) schematically illustrates a sectional view of an example of a capacitor element that is included in the solid electrolytic capacitor illustrated in FIG. 23(a). In FIG. 23(a), a description of components located at positions higher than those of the first anode inner electrode 60a and the first cathode inner electrode 50a is omitted as in FIG. 19(a) and FIG. 20.

As illustrated in FIG. 23(a) and FIG. 23(b), the capacitor element 10' includes the valve action metal base 11 that includes the porous portion 11a on the first main surface of the core portion 11b, the dielectric layer 12 that is formed on the surface of the porous portion 11a, the solid electrolyte layer 13 that is disposed on the dielectric layer 12, and the conductor layer 14 that is disposed on the solid electrolyte layer 13, and includes the exposed portion of the core portion 11b along the first main surface of the valve action metal base 11. As illustrated in FIG. 23(a), the insulating layer 15 that insulates the conductor layer 14 and the valve action metal base 11 from each other is disposed on the first main surface of the valve action metal base 11.

In the capacitor element 10' illustrated in FIG. 23(b), regarding the first main surface of the valve action metal base 11, the position of the part of the surface of the core portion 11b on which the porous portion 11a is not formed is higher than that of the part of the porous portion 11a nearest to the solid electrolyte layer 13 when the capacitor element 10' is viewed in the thickness direction. The part of the surface of the core portion 11b on which the porous portion 11a is not formed may be flush with the part of the porous portion 11a near the solid electrolyte layer 13 or located at a position lower than that. As illustrated in FIG.

23(b), it is preferable that the porous portion 11a be located at the central portion of the valve action metal base 11, and that the part of the core portion 11b on which the porous portion 11a is not formed be located within the edge portion of the valve action metal base 11. In particular, it is preferable that the porous portion 11a be located on the inner surface of the recessed portion of the valve action metal base 11, and that the insulating layer 15 is disposed on the inner wall of the recessed portion.

The first sealing layer 20a covers the first main surface of the capacitor element 10'. In FIG. 23(a), the first sealing layer 20 is disposed on the conductor layer 14 and is disposed also on the core portion 11b so as to cover the first main surface of the capacitor element 10'.

The first cathode inner electrode 50a is electrically connected to the conductor layer 14. In FIG. 23(a), the first sealing layer 20a and the first cathode inner electrode 50a are disposed in this order on the conductor layer 14. The first cathode through-electrodes 231 that extend through the first sealing layer 20a are disposed in the first sealing layer 20a on the conductor layer 14. The conductor layer 14 and the first cathode inner electrode 50a are connected to each other with the first cathode through-electrodes 231 that are extended to the surface of the first sealing layer 20a interposed therebetween.

The first anode inner electrode 60a is electrically connected to the core portion 11b. In FIG. 23(a), the first sealing layer 20a and the first anode inner electrode 60a are disposed in this order on the part of the core portion 11b on which the porous portion 11a is not disposed. The first anode through-electrode 241 that extends through the first sealing layer 20a is disposed in the first sealing layer 20a on the part of the core portion 11b on which the porous portion 11a is not disposed. The first anode inner electrode 60a and the part of the core portion 11b on which the porous portion 11a is not disposed are connected to each other with the first anode through-electrode 241 that is extended to the surface of the first sealing layer 20a interposed therebetween.

The form and sectional shape of the first anode through-electrode and the second anode through-electrode, for example, are the same as in the fifth embodiment. The form and shape of the first anode inner electrode and the anode outer electrode, for example, are the same as in the fifth embodiment.

The form and sectional shape of each first cathode through-electrode and the second cathode through-electrode, for example, are the same as in the fifth embodiment. The form and shape of the first cathode inner electrode and the cathode outer electrode, for example, are the same as in the fifth embodiment.

In the solid electrolytic capacitor according to the seventh embodiment, the material of the insulating layer, the first sealing layer, and the second sealing layer that are included in the solid electrolytic capacitor is the same as in the fifth embodiment.

In the solid electrolytic capacitor according to the seventh embodiment, the material of the valve action metal base that is included in the capacitor element, for example, is preferably the same as in the first embodiment. The stress-relaxing portion may be disposed on the surface of the valve action metal base as in the first embodiment.

In the solid electrolytic capacitor according to the seventh embodiment, the material of the dielectric layer, the solid electrolyte layer, and the conductor layer that are included in the capacitor element, for example, is the same as in the fifth embodiment.

As described according to the fifth embodiment, the conductor layer preferably contains the metal foil. Preferred structures of the conductor layer are the same as in the fifth embodiment. Preferred structures of the metal foil are the same as in the fifth embodiment as well.

A method for manufacturing the solid electrolytic capacitor according to the seventh embodiment will now be described. The method for manufacturing the solid electrolytic capacitor according to the seventh embodiment has the same feature as the method for manufacturing the solid electrolytic capacitor according to the fifth embodiment or the sixth embodiment except that the capacitor element with no insulating layer formed on the exposed portion of the core portion is prepared.

FIG. 24(a) to FIG. 24(h) schematically illustrate some features of an example of the method for manufacturing the solid electrolytic capacitor according to the seventh embodiment with perspective views.

The capacitor element is first prepared.

FIG. 24(a) to FIG. 24(d) are common to FIG. 8(a) to FIG. 8(d), and a detailed description thereof is omitted.

Figure 24A:
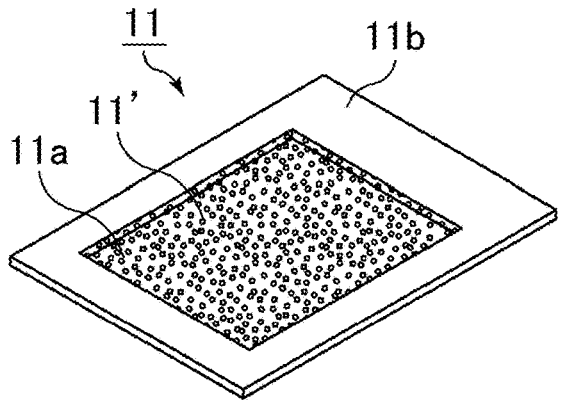
FIGS. 24(*a*) to 24(*h*) schematically illustrate an example of a method for manufacturing the solid electrolytic capacitor according to the seventh embodiment with perspective views of parts thereof.
Figure 24B:
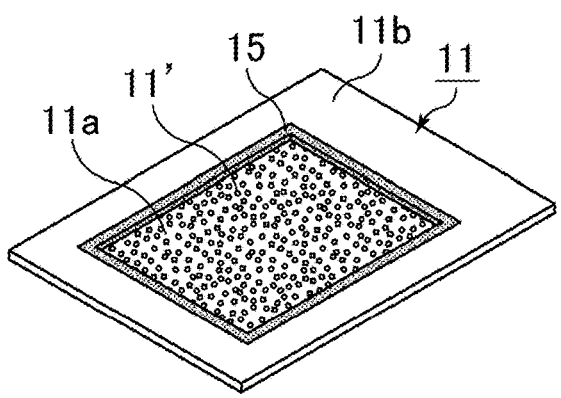
Figure 24C:
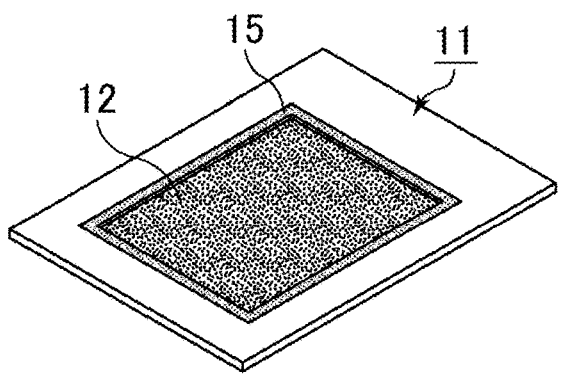
Figure 24D:
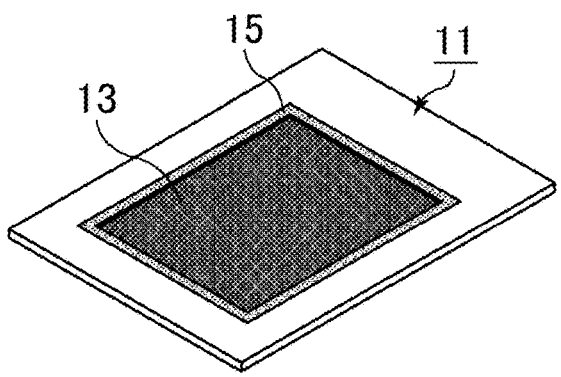
Figure 24E:
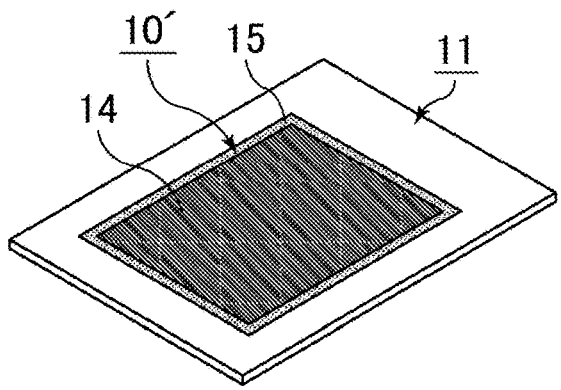

Moreover, FIG. 24(e) is common to FIG. 15(e), and a detailed description thereof is omitted.

Figure 24F:
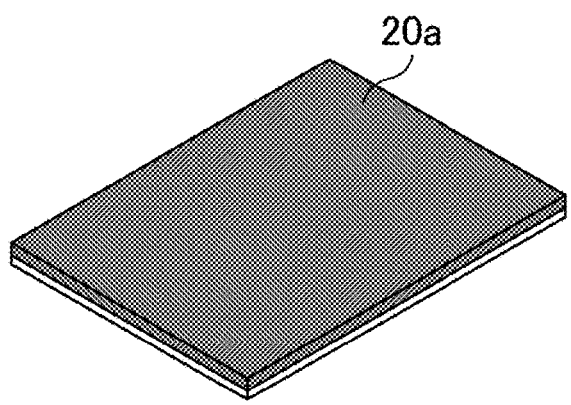

As illustrated in FIG. 24(f), the first sealing layer 20a is formed on the conductor layer 14 and the exposed portion of the core portion 11b of the capacitor element 10' so as to cover the first main surface of the capacitor element 10'. The first sealing layer can be formed by, for example, the resin molding method.

Figure 24G:
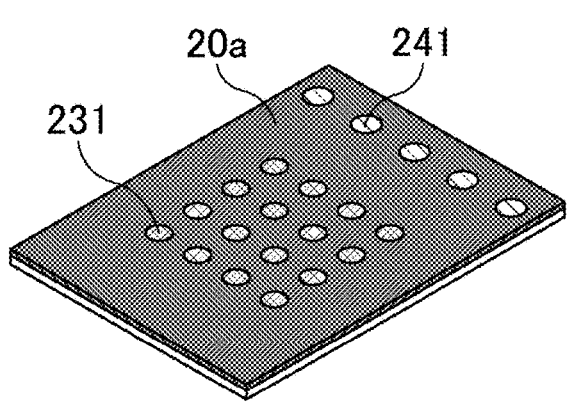

As illustrated in FIG. 24(g), the first anode through-electrode 241 that is disposed in the first sealing layer 20a is formed so as to extend through the first sealing layer 20a on the exposed portion of the core portion 11b of the capacitor element 10', and the first cathode through-electrodes 231 that are disposed in the first sealing layer 20a are formed so as to extend through the first sealing layer 20a on the conductor layer 14 of the capacitor element 10'. The first anode through-electrode 241 is connected to the core portion 11b of the capacitor element 10'. The first cathode through-electrodes 231 are connected to the conductor layer 14 of the capacitor element 10'.

A method of forming the first anode through-electrode will be described later. A method of forming the first cathode through-electrodes is the same as in fifth embodiment. The first anode through-electrode and the first cathode through-electrodes may be formed after the first sealing layer is formed or may be formed before the first sealing layer is formed. The shape of the first anode through-electrode and each first cathode through-electrode is not limited to a columnar shape such as a cylindrical shape and may be a wall shape.

Figure 24H:
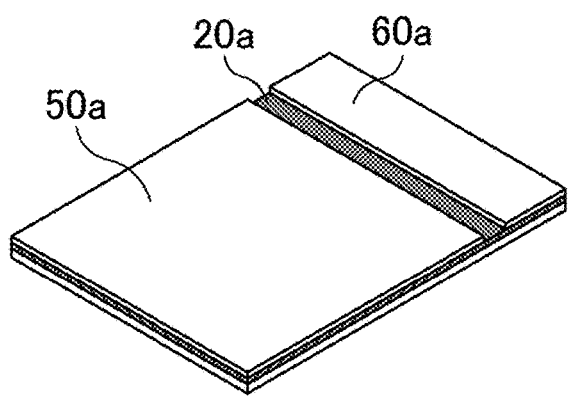

As illustrated in FIG. 24(h), the first anode inner electrode 60a that is connected to the first anode through-electrode 241 that is exposed from the surface of the first sealing layer 20a and the first cathode inner electrode 50a that is connected to the first cathode through-electrodes 231 that are exposed from the surface of the first sealing layer 20a are formed on the first sealing layer 20a. The first anode inner electrode 60a is electrically connected to the core portion 11b with the first anode through-electrode 241 interposed therebetween. The first cathode inner electrode 50a is electrically connected to the conductor layer 14 with the first cathode through-electrodes 231 interposed therebetween. For example, a metal electrode, a paste electrode, or a ball-shaped terminal may be formed as each of the first anode inner electrode and the first cathode inner electrode.

Subsequently, the method described according to the fifth embodiment or the sixth embodiment is used until the anode outer electrode and the cathode outer electrode are formed to obtain the solid electrolytic capacitor.

The first anode through-electrode can be formed in the same manner as the method of forming the anode through-electrode illustrated in FIG. 16(a), FIG. 16(b), and FIG. 16(c) described according to the fourth embodiment. For example, the anode through-hole that extends through the first sealing layer 20a on the exposed portion of the core portion 11b is formed. The anode through-hole is preferably formed by the laser process. When the anode through-hole is formed by the laser process, the anode through-hole may be formed up to a part of the core portion. Subsequently, the first anode through-electrode 241 is formed in the anode through-hole. For example, a plating electrode or a paste electrode may be formed as the first anode through-electrode. When the anode through-hole is formed by the laser process, the sectional shape of the first anode through-electrode can be a reversely tapered shape.

The method for manufacturing the solid electrolytic capacitor in which the conductor layer contains the metal foil is the same as the above manufacturing method except that the conductor layer that contains the metal foil is formed on the solid electrolyte layer.

Other Embodiments

The solid electrolytic capacitors according to the present invention and the methods for manufacturing the solid electrolytic capacitors are not limited to the above embodiments. Various applications and modifications related to, for example, the structure and manufacturing conditions of each solid electrolytic capacitor are possible within the range.

For example, a method of electrically connecting the core portion to the anode outer electrode is not limited to the methods described according to the first embodiment and the second embodiment. In the solid electrolytic capacitor 1A illustrated in FIG. 1(a), the anode outer electrode 40 and the part of the core portion 11b on which the porous portion 11a is not disposed are connected to each other with the second anode through-electrode 42 and the first anode through-electrode 41 interposed therebetween. In the solid electrolytic capacitor 2A illustrated in FIG. 7(a), the anode outer electrode 40 and the part of the core portion 11b on which the porous portion 11a is not disposed are connected to each other with the first anode through-electrode 41 interposed therebetween. However, the anode through-electrode such as the first anode through-electrode may not be provided. For example, a lead frame may be located on the lower surface of the capacitor element 10A or 10A'. When no anode through-electrode is provided, the sealing layer may not be disposed on the core portion in which the cathode is not formed.

In the solid electrolytic capacitors according to the present invention and the methods for manufacturing the solid electrolytic capacitors, the anode is not limited to one terminal but may include two or more terminals as described according to the first embodiment. Similarly, the cathode is not limited to one terminal but may include two or more terminals.

According to each embodiment described above, the method for manufacturing the single solid electrolytic capacitor is described. However, plural solid electrolytic capacitors may be manufactured and may be subsequently divided into individual solid electrolytic capacitors.

REFERENCE SIGNS LIST 1A, 1B, 2A, 100, 110, 200, 210 solid electrolytic capacitor
10A, 10A', 10B, 10, 10' capacitor element
11, 11A, 11B valve action metal base
11' recessed portion
11a porous portion
11b core portion
11c, 11d stress-relaxing portion
12 dielectric layer
13 solid electrolyte layer
14A, 14 conductor layer
15 insulating layer
20 sealing layer
20a first sealing layer
20b second sealing layer
20c third sealing layer
30 cathode outer electrode
31, 31', 131, 131A cathode through-electrode
31α, 31α', 131α cathode through-hole
40 anode outer electrode
41, 41' first anode through-electrode
41α, 41α', 141α anode through-hole
42 second anode through-electrode
131' cathode bump
131β metal-containing layer
141 anode through-electrode
50a first cathode inner electrode
60a first anode inner electrode
60b second anode inner electrode
231 first cathode through-electrode
232 second cathode through-electrode
233 third cathode through-electrode
241 first anode through-electrode
242 second anode through-electrode
243 third anode through-electrode

The invention claimed is:

1. A solid electrolytic capacitor comprising:
a capacitor element that includes a valve action metal base with a porous portion disposed on a first main surface of a core portion, a dielectric layer disposed on the porous portion, a solid electrolyte layer disposed on the dielectric layer, and a conductor layer comprising a metal foil and disposed on the solid electrolyte layer;
a sealing layer that seals a first main surface of the capacitor element;
a cathode outer electrode electrically connected to the conductor layer of the capacitor element, with the cathode outer electrode disposed on the sealing layer opposite the conductor layer;
an anode outer electrode electrically connected to the valve action metal base; and
a cathode through-electrode extending through the sealing layer to connect the conductor layer to the cathode outer electrode,
wherein a surface of the metal foil is coated with carbon and is in direct contact with the solid electrolyte layer.

2. The solid electrolytic capacitor according to claim 1, wherein the conductor layer comprises a conductive resin layer that is disposed on the solid electrolyte layer with the metal foil disposed on the conductive resin layer.

3. The solid electrolytic capacitor according to claim 1, wherein the conductor layer comprises a conductive resin layer disposed on the solid electrolyte layer, and a silver layer is disposed on the conductive resin layer with the metal foil disposed on the silver layer.

4. The solid electrolytic capacitor according to claim 1, wherein a surface of the metal foil comprises a roughened surface.

5. The solid electrolytic capacitor according to claim 1, wherein the metal foil includes a coat layer that comprises an anchor coat agent on a surface thereof.

6. The solid electrolytic capacitor according to claim 1, wherein the metal foil is composed of at least a metal that is selected from a group consisting of aluminum, copper, silver, and an alloy having a main component that is one of aluminum, copper, and silver.

7. The solid electrolytic capacitor according to claim 1, wherein the metal foil has at least one through-hole.

8. The solid electrolytic capacitor according to claim 1, wherein the cathode through-electrode comprises an area that is larger than an area of the porous portion.

9. A solid electrolytic capacitor comprising:
a capacitor element that includes a valve action metal base with a porous portion disposed on a first main surface of a core portion, a dielectric layer disposed on the porous portion, a solid electrolyte layer disposed on the dielectric layer, and a conductor layer comprising a metal foil and disposed on the solid electrolyte layer;
a sealing layer that seals a first main surface of the capacitor element;
a cathode outer electrode electrically connected to the conductor layer of the capacitor element, with the cathode outer electrode disposed on the sealing layer opposite the conductor layer;
an anode outer electrode electrically connected to the valve action metal base;
cathode through-electrode extending through the sealing layer to connect the conductor layer to the cathode outer electrode; and
an insulating layer disposed between the core portion of the valve action metal base and the sealing layer,
wherein the insulating layer, the sealing layer, and the anode outer electrode are disposed in this order on the core portion, and a first anode through-electrode that extends through the sealing layer is disposed in the sealing layer on the insulating layer, and a second anode through-electrode that extends through the insulating layer is disposed in the insulating layer on the core portion, and
wherein the core portion of the valve action metal base is connected to the anode outer electrode with the second anode through-electrode and the first anode through-electrode interposed therebetween.

10. A solid electrolytic capacitor comprising:
a capacitor element that includes a valve action metal base with a porous portion disposed on a first main surface of a core portion, a dielectric layer disposed on the porous portion, a solid electrolyte layer disposed on the dielectric layer, and a conductor layer comprising a metal foil and disposed on the solid electrolyte layer;
a sealing layer that seals a first main surface of the capacitor element;
a cathode outer electrode electrically connected to the conductor layer of the capacitor element, with the cathode outer electrode disposed on the sealing layer opposite the conductor layer;
an anode outer electrode electrically connected to the valve action metal base; and
cathode through-electrode extending through the sealing layer to connect the conductor layer to the cathode outer electrode;
wherein the sealing layer is disposed between the anode outer electrode and the core portion,
wherein a first anode through-electrode that extends through the sealing layer is disposed in the sealing layer on the core portion and directly contacting the core portion, and
wherein the first anode through-electrode connects the core portion to the anode outer electrode.

11. A solid electrolytic capacitor comprising:
a capacitor element that includes a valve action metal base with a porous portion disposed on a first main surface of a core portion, a dielectric layer disposed on the porous portion, a solid electrolyte layer disposed on the dielectric layer, and a conductor layer comprising a metal foil and disposed on the solid electrolyte layer;
a sealing layer that seals a first main surface of the capacitor element;
a cathode outer electrode electrically connected to the conductor layer of the capacitor element, with the cathode outer electrode disposed on the sealing layer opposite the conductor layer;
an anode outer electrode electrically connected to the valve action metal base;
cathode through-electrode extending through the sealing layer to connect the conductor layer to the cathode outer electrode; and
a stress-relaxing portion that does not include the porous portion and is disposed at a central portion of a surface of the valve action metal base in a plan view of the valve action metal base.

12. The solid electrolytic capacitor according to claim 11, wherein the stress-relaxing portion comprises an area in the plan view that is between 5% and 20% of a corresponding area of the first main surface of the valve action metal base.

13. A solid electrolytic capacitor comprising:
a capacitor element that includes a valve action metal base with a porous portion disposed on a first main surface of a core portion, a dielectric layer disposed on the porous portion, a solid electrolyte layer disposed on the dielectric layer, and a conductor layer disposed on the solid electrolyte layer, with the core portion including an exposed portion that extends along the first main surface;
an insulating layer disposed on the exposed portion of the core portion;
a first sealing layer disposed on the insulating layer and the conductor layer, such that the first sealing layer covers the first main surface of the capacitor element;
a first anode through-electrode disposed in the first sealing layer and the insulating layer, such that the first anode through-electrode extends through the first sealing layer and the insulating layer on the exposed portion of the core portion of the capacitor element and is connected to the core portion of the capacitor element;
a first cathode through-electrode disposed in the first sealing layer, such that the first cathode through-electrode extends through the first sealing layer on the conductor layer of the capacitor element and is connected to the conductor layer of the capacitor element;
a first anode inner electrode disposed on the first sealing layer and connected to the first anode through-electrode that is exposed from a surface of the first sealing layer;

a first cathode inner electrode disposed on the first sealing layer and connected to the first cathode through-electrode that is exposed from the surface of the first sealing layer;

a second sealing layer disposed above the first sealing layer to cover the first anode inner electrode and the first cathode inner electrode;

a second anode through-electrode disposed in the second sealing layer, such that the second anode through-electrode extends through the second sealing layer and is connected to the first anode inner electrode;

a second cathode through-electrode disposed in the second sealing layer, such that the second cathode through-electrode extends through the second sealing layer and is connected to the first cathode inner electrode;

an anode outer electrode disposed on the second sealing layer and connected to the second anode through-electrode that is exposed from a surface of the second sealing layer; and a cathode outer electrode disposed on the second sealing layer and connected to the second cathode through-electrode that is exposed from the surface of the second sealing layer.

14. The solid electrolytic capacitor according to claim 13, wherein the second sealing layer is directly disposed on the first sealing layer, the second anode through-electrode is directly connected to the first anode inner electrode, and the second cathode through-electrode is directly connected to the first cathode inner electrode.

15. The solid electrolytic capacitor according to claim 14, wherein a value of $S_A/S_B$ is between 0.3 and 3.5, where $S_A$ is an area of the anode outer electrode and $S_B$ is an area of the cathode outer electrode in a plan view in a direction normal to the first main surface.

16. The solid electrolytic capacitor according to claim 13, further comprising:

at least one third sealing layer disposed between the first and second sealing layers, wherein a third anode through-electrode is connected to the first anode inner electrode and a third cathode through-electrode is connected to the first cathode inner electrode, with third anode and cathode through-electrodes both disposed in the at least one third sealing layer, such that the third anode and cathode through-electrodes extend through the sealing layers, and wherein a second anode inner electrode is connected to the third anode through-electrode that is exposed from a surface of the at least one third sealing layer, or a second cathode inner electrode is connected to the third cathode through-electrode that is exposed from the surface of the at least one third sealing layer, or both the second anode and cathode inner electrodes are disposed on the at least one third sealing layer.

17. The solid electrolytic capacitor according to claim 16 further comprising a three-terminal structure that includes two of the anode outer electrodes and the cathode outer electrode.

18. The solid electrolytic capacitor according to claim 16 further comprising a multi-terminal structure that includes two or more of the anode outer electrodes and one or more of the cathode outer electrodes.

19. The solid electrolytic capacitor according to claim 13, wherein the first anode through-electrode, the first anode inner electrode, the second anode through-electrode, and the anode outer electrode each comprise plating films having a same composition, and wherein the first cathode through-electrode, the first cathode inner electrode, the second cathode through-electrode, and the cathode outer electrode each comprise plating films having a same composition.

20. The solid electrolytic capacitor according to claim 13, wherein the first anode through-electrode, the first anode inner electrode, the second anode through-electrode, and the anode outer electrode each comprise conductive paste solidifications having a same composition, and wherein the first cathode through-electrode, the first cathode inner electrode, the second cathode through-electrode, and the cathode outer electrode each comprise conductive paste solidifications having a same composition.

21. The solid electrolytic capacitor according to claim 20, further comprising:

unsintered or partly sintered conductive particles that are in contact with each other in the respective conductive paste solidifications, wherein a resin component remains in the conductive paste solidifications, and wherein a ratio of a content of the resin component to a weight of the conductive particles is at least 1% by weight in the conductive paste solidifications.

22. The solid electrolytic capacitor according to claim 13, wherein the first anode through-electrode, the first anode inner electrode, the second anode through-electrode, and the anode outer electrode each comprise solder compounds having a same composition, and wherein the first cathode through-electrode, the first cathode inner electrode, the second cathode through-electrode, and the cathode outer electrode each comprise solder compounds having a same composition.

23. The solid electrolytic capacitor according to claim 13, wherein the first anode through-electrode and the first anode inner electrode are integrally formed, and wherein the first cathode through-electrode and the first cathode inner electrode are integrally formed.

24. The solid electrolytic capacitor according to claim 13, wherein a thickness of the first sealing layer and a thickness of the second sealing layer are 20 μm or less, and wherein a thickness of the entire solid electrolytic capacitor is 500 μm or less.

25. The solid electrolytic capacitor according to claim 13, wherein the conductor layer contains metal foil that is composed of at least a metal that is selected from a group consisting of aluminum, copper, silver, and an alloy with a main component which is one of aluminum, copper and silver.

26. A solid electrolytic capacitor comprising:

a capacitor element that includes a valve action metal base with a porous portion disposed on a first main surface of a core portion, a dielectric layer disposed on the porous portion, a solid electrolyte layer disposed on the dielectric layer, and a conductor layer disposed on the solid electrolyte layer, with the core portion including an exposed portion extending along the first main surface;

a first sealing layer disposed on the conductor layer and the exposed portion of the core portion, such that the first sealing layer covers the first main surface;

a first anode through-electrode disposed in the first sealing layer, such that the first anode through-electrode extends through the first sealing layer on the exposed portion of the core portion and is connected to the core portion of the capacitor element;

a first cathode through-electrode disposed in the first sealing layer, such that the first cathode through-electrode extends through the first sealing layer on the conductor layer of the capacitor element and is connected to the conductor layer of the capacitor element;

a first anode inner electrode disposed on the first sealing layer and connected to the first anode through-electrode that is exposed from a surface of the first sealing layer;

a first cathode inner electrode disposed on the first sealing layer and connected to the first cathode through-electrode that is exposed from the surface of the first sealing layer;

a second sealing layer disposed above the first sealing layer to cover the first anode inner electrode and the first cathode inner electrode;

a second anode through-electrode disposed in the second sealing layer, such that the second anode through-electrode extends through the second sealing layer and is connected to the first anode inner electrode;

a second cathode through-electrode disposed in the second sealing layer, such that the second cathode through-electrode extends through the second sealing layer and is connected to the first cathode inner electrode;

an anode outer electrode disposed on the second sealing layer and connected to the second anode through-electrode that is exposed from a surface of the second sealing layer; and a cathode outer electrode disposed on the second sealing layer and connected to the second cathode through-electrode that is exposed from the surface of the second sealing layer.

* * * * *